US00RE37397B1

(19) United States
(12) Reissued Patent
Lloyd

(10) Patent Number: US RE37,397 E
(45) Date of Reissued Patent: Oct. 2, 2001

(54) COLLET

(76) Inventor: Don R. Lloyd, 8970 Clinton River Rd., Sterling Heights, MI (US) 48314

(21) Appl. No.: 09/276,837

(22) Filed: Mar. 25, 1999

Related U.S. Patent Documents

Reissue of:
(64) Patent No.: 5,613,692
Issued: Mar. 25, 1997
Appl. No.: 08/519,484
Filed: Aug. 25, 1995

(51) Int. Cl.[7] ..... B23B 31/20; B23B 31/40
(52) U.S. Cl. ..... 279/2.03; 279/2.22; 279/2.12; 279/4.09; 279/46.9; 279/57; 279/46.5
(58) Field of Search ..... 242/571–573, 242/573.1; 279/2.02–2.04, 2.11, 2.12, 2.22, 4.07–4.09, 46.1–46.5, 46.7–46.9, 49, 50, 54–57

(56) References Cited

U.S. PATENT DOCUMENTS

| | | | | |
|---|---|---|---|---|
| 493,231 | * | 3/1893 | Muir | 279/49 |
| 696,745 | * | 4/1902 | O'Brien | 279/49 |
| 1,900,934 | * | 3/1933 | Hudson | 279/137 |
| 2,177,979 | * | 10/1939 | Davis | 279/49 |
| 2,198,693 | * | 4/1940 | Alexander | 279/49 |
| 2,372,592 | | 3/1945 | Lovely . | |
| 2,449,887 | * | 9/1948 | Edel et al. | 279/49 |
| 2,576,350 | * | 11/1951 | Mazzola | 279/145 |
| 2,585,510 | * | 2/1952 | Smith | 279/137 |
| 2,739,818 | * | 3/1956 | Benjamin et al. | 279/2.03 |
| 2,877,022 | * | 3/1959 | Parker et al. | 279/2.03 |
| 2,985,454 | * | 5/1961 | Stoner | 279/2.03 |
| 2,996,301 | * | 8/1961 | Cox | 279/2.02 |
| 3,009,747 | * | 11/1961 | Pitzer | 279/137 |
| 3,353,833 | * | 11/1967 | Marini, Sr. | 279/49 |
| 3,411,796 | * | 11/1968 | Decker | 279/46.6 |
| 3,434,730 | | 3/1969 | Smrekar . | |
| 3,437,342 | * | 4/1969 | Mann | 279/2.03 |
| 3,451,686 | * | 6/1969 | Hammond | 279/51 |
| 3,659,863 | | 5/1972 | Buttner . | |
| 3,701,537 | * | 10/1972 | Rossman et al. | 279/145 |
| 3,889,962 | * | 6/1975 | Parsons | 279/46.9 |
| 3,900,913 | * | 8/1975 | Drumm | 279/2.03 |
| 4,032,162 | * | 6/1977 | Flinchbaugh | 279/4.09 |
| 4,094,521 | | 6/1978 | Piotrowski . | |
| 4,121,847 | * | 10/1978 | Morawski | 279/137 |
| 4,296,658 | | 10/1981 | Champeau et al. . | |
| 4,432,559 | * | 2/1984 | Rasmussen | 279/4.07 |
| 4,566,705 | | 1/1986 | Jenny . | |
| 4,657,454 | * | 4/1987 | Migita et al. | 279/157 |
| 4,722,645 | | 2/1988 | Regan . | |
| 4,791,841 | | 12/1988 | Pruvot et al. . | |
| 4,808,049 | * | 2/1989 | Cook | 279/46.2 |
| 5,002,291 | | 3/1991 | Reed et al. . | |
| 5,149,111 | * | 9/1992 | Han | 279/2.03 |
| 5,340,127 | | 8/1994 | Martin . | |

FOREIGN PATENT DOCUMENTS

| | | | | |
|---|---|---|---|---|
| 891245 | * | 12/1981 | (SU) | 279/46.2 |

OTHER PUBLICATIONS

Product Brochure: "Ringfeder Shaft–Hub Locking Devices W–200–3"; Ringfeder Corporation; date unknown.

* cited by examiner

*Primary Examiner*—Steven C. Bishop
(74) *Attorney, Agent, or Firm*—Barnes & Thornburg

(57) ABSTRACT

A circular flexible collet that provides a 360 degree gripping engagement with a cylindrical workpiece and which is operable by an actuator member incorporated in a workpiece chuck. The collet may be constructed as an internal collet for gripping engagement with a workpiece internal periphery, or as an external collet for gripping engagement with a workpiece external periphery. The flexible collet may be used for single, or plural workpiece gripping actions. The collet includes a *split* spring steel body having a [radial opening] *split space* and an outer and an inner circular periphery. One circular periphery is a workpiece gripping surface, and the other circular periphery has a tapered cam surface engageable by a workpiece chuck actuator member. The tapered cam surface has a plurality of circumferentially spaced apart slots, having an open outer end. In an internal collet the tapered cam surface is formed around the collet body inner periphery. In an external collet the tapered cam surface is formed around the collet body outer periphery.

44 Claims, 32 Drawing Sheets

FIG. 19
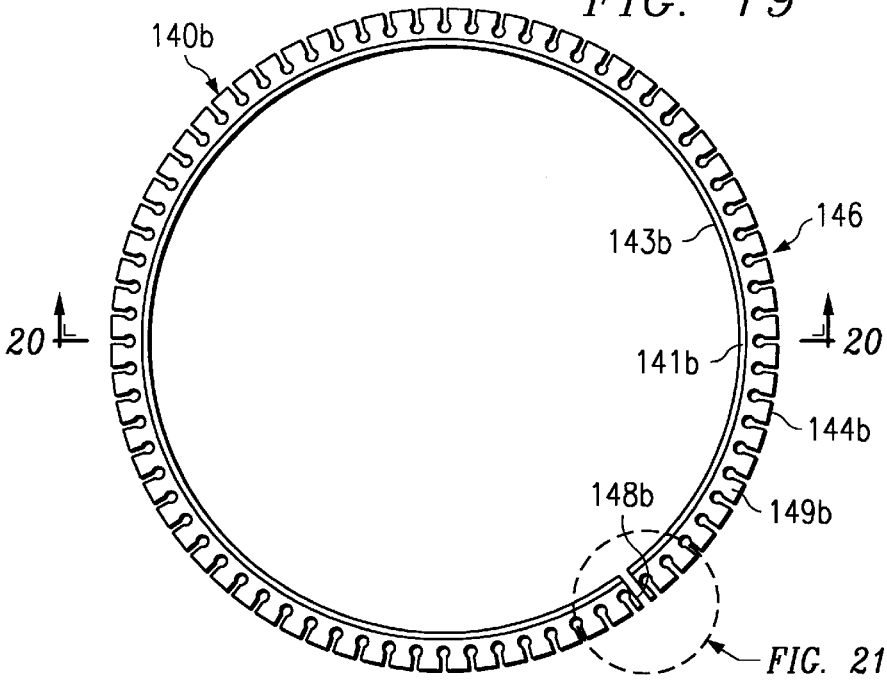
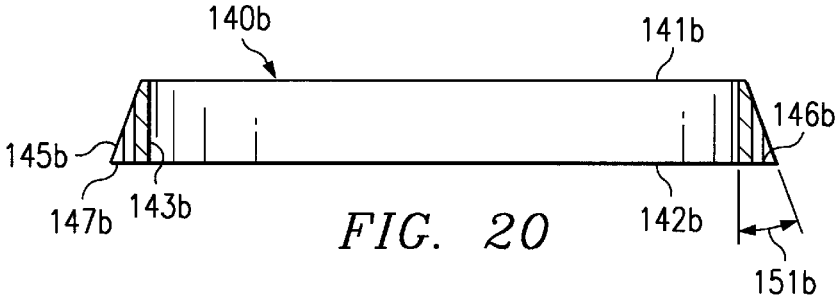
FIG. 20
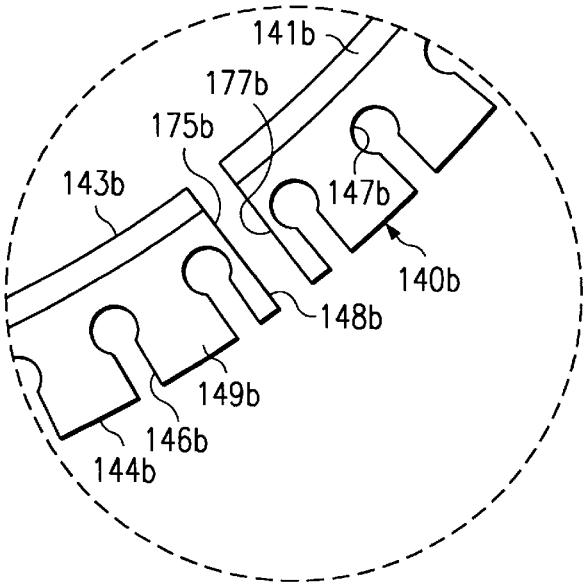
FIG. 21

FIG. 25
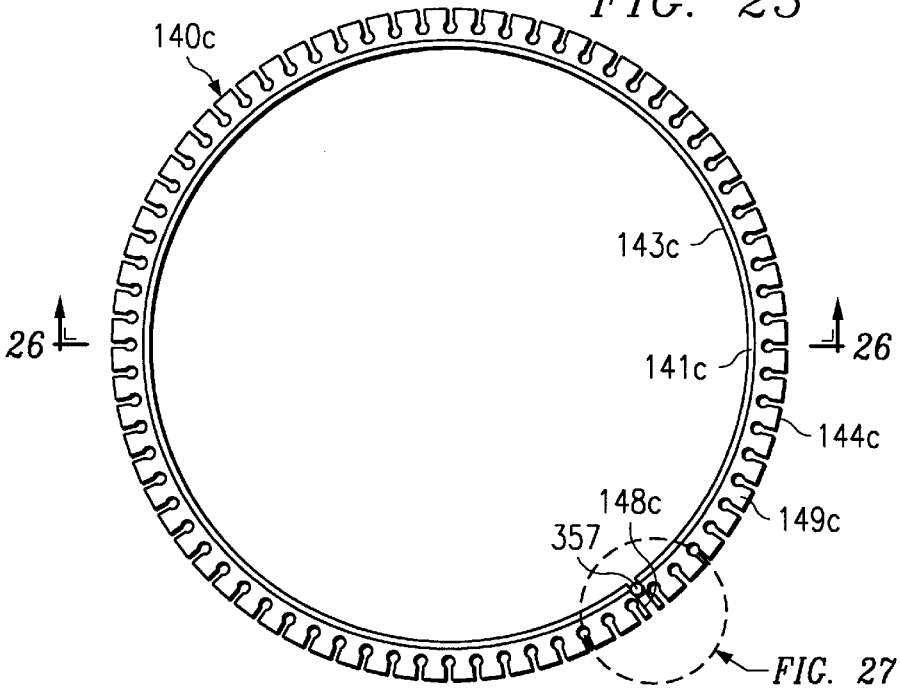
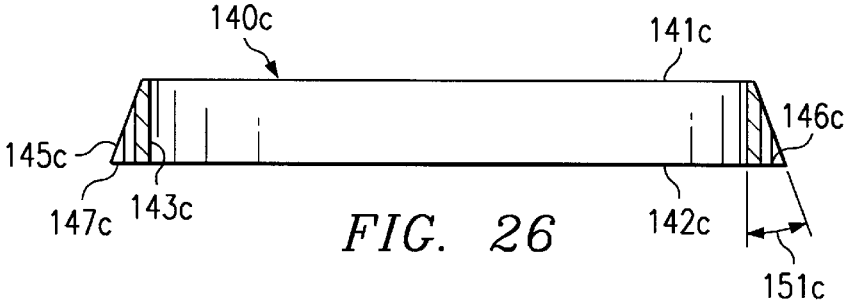
FIG. 26
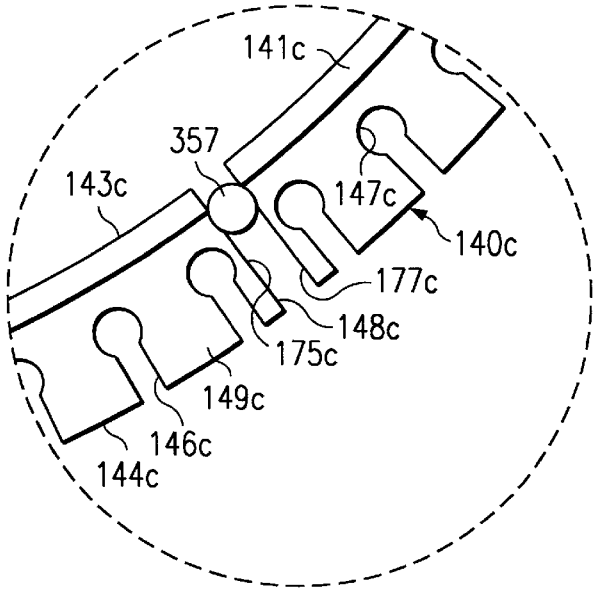
FIG. 27

FIG. 28
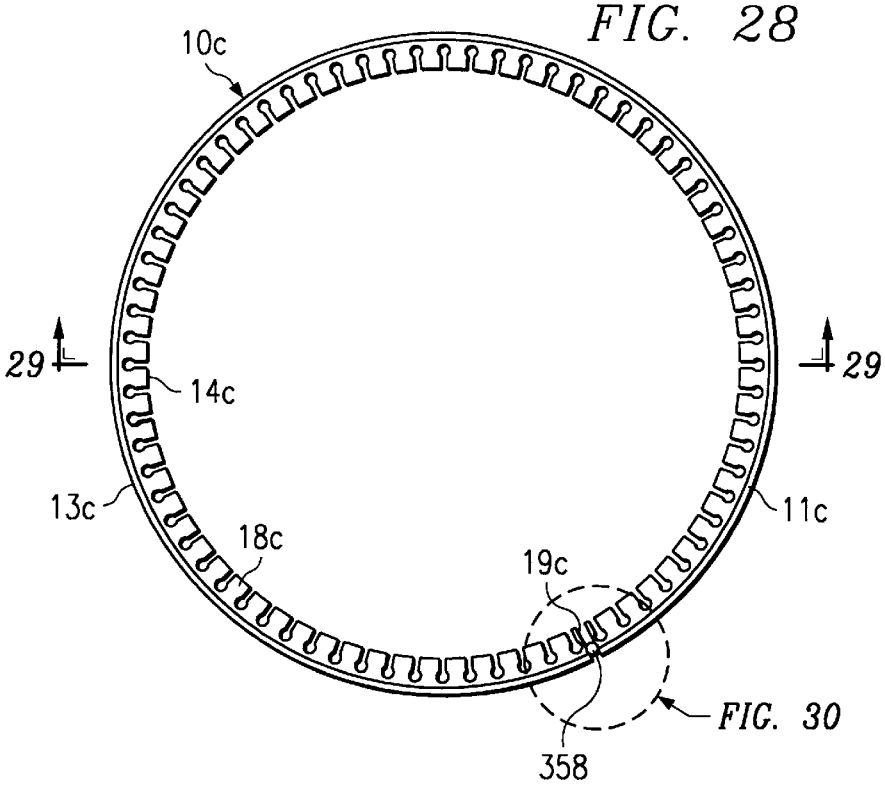
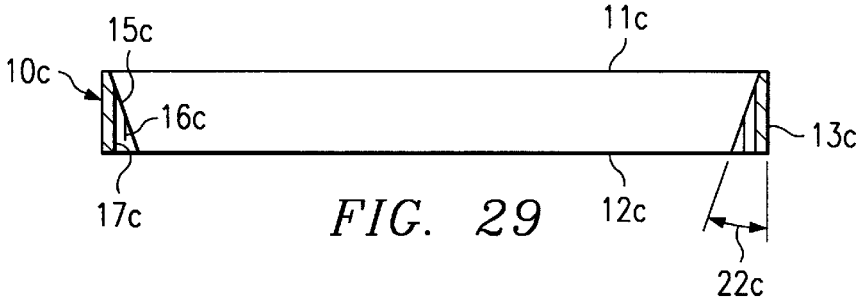
FIG. 29
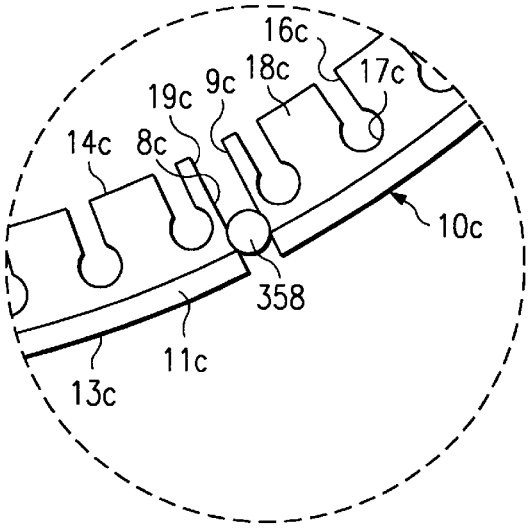
FIG. 30

COLLET

Matter enclosed in heavy brackets [ ] appears in the original patent but forms no part of this reissue specification; matter printed in italics indicates the additions made by reissue.

BACKGROUND OF THE INVENTION

1. Field of the Invention

The field of art to which this invention pertains may be generally located in the class of devices relating to workpiece holding collets. Class 279 Chucks or Sockets, United States Patent Office Classification, appears to be the applicable general area of art to which the subject matter similar to this invention has been classified in the past.

2. Description of the Prior Art

This invention relates to collet mechanisms used in the machining, inspection and grinding industry, where high accuracy workpiece holding devices are required. U.S. Pat. Nos. 3,434,730 and 4,432,559 are illustrative of the prior art collet mechanisms which employ a plurality of flexible fingers mounted on a support sleeve, and which flexible fingers are adapted to be laterally spaced apart and around the outer periphery of a cylindrical workpiece. The prior art collet fingers are adapted to be cammed or compressed radially inward, into gripping engagement with the peripheral surface of a workpiece. A disadvantage of the prior art collet mechanisms employing flexible gripping fingers is that they do not provide a complete 360 degree gripping engagement with the circumference of a cylindrical workpiece. The lack of a 360 degree gripping engagement ability of the prior art collet mechanisms limits the use thereof for gripping a thin walled tubular workpiece close to an end thereof, without causing deflection of the workpiece. Other disadvantages of the prior art collet mechanisms that employ finger members, that are radially expanded and contracted, is that they are inefficient relative to concentricity and repeatability functions for gripping a workpiece, they are true at only one size, and the collet fingers have very minimal travel radially inward, as for example, seven or eight thousandths of an inch.

SUMMARY OF THE INVENTION

The present invention solves the aforedescribed problems of the prior art collet mechanisms by providing a circular collet structure that incorporates a 360 degree gripping engagement with a workpiece with no collet finger gripping action. The circular collet structure allows the holding of a thin wall workpiece with no distortion of the workpiece. The circular collet is constructed and arranged to hold workpieces with as little as 0.050 inch gripping surface with no deflection, which function is not achievable with the prior art collet mechanisms that employ finger action. The circular collet of the present invention provides efficient contraction and expansion during a workpiece gripping operation, with optimum concentricity and repeatability for all sizes of workpieces.

The collet of the present invention comprises a circular collet which is constructed and arranged for operation with a workpiece chuck. The circular collet is operable for contraction and expansion movements into a 360 degree gripping engagement with a cylindrical workpiece surface. The circular collet may be constructed for internal gripping of a workpiece, or for an external gripping of a workpiece. The expansion and contraction of the flexible circular collet is carried out by an actuator means incorporated in a workpiece chuck. The circular collet may be used for single, or plural workpiece gripping actions. The circular collet may be constructed and arranged for gripping engagement with an internal periphery or an external of a workpiece. The flexible circular collet may be provided for internal workpiece gripping actions with an outer periphery shaped in accordance with the internal workpiece surface which is to be gripped, and with an inner sloping cam surface for engagement by an actuator means to expand the collet into an internal workpiece gripping operation. Alternatively, the collet may be provided for external workpiece gripping actions with an inner periphery shaped in accordance with the external workpiece surface which is to be gripped, and with an external sloping cam surface for engagement by an actuator means to contract the collet into an external workpiece gripping operation. The collet of the present invention is contracted or expanded in a rotary movement that effects a peripheral sliding engagement with a workpiece as compared to the flexible fingers of prior art collet mechanisms which are contracted in straight radial line movements.

BRIEF DESCRIPTION OF THE DRAWINGS

FIG. 19 is a top view of a one-piece circular external collet which is constructed the same as the external collet shown in FIGS. 9 and 10, but which is not provided with an integral split closure tang.

FIG. 20 is an elevation section view of the external collet illustrated in FIG. 19, taken along the line 20—20 thereof, and looking in the direction of the arrows.

FIG. 21 is a fragmentary, enlarged view of a portion of the external collet illustrated in FIG. 19, taken within the circle marked by the numeral "21" in FIG. 19, and showing the split in the external collet body but which is not provided with an integral split closure tang.

FIG. 25 is a top view of a one-piece circular external collet which is constructed the same as the external collet shown in FIGS. 19 and 20, and which is provided with a rubber seal positioned in the split in the body of the external collet to prevent dirt from entering into the interior of the collet body and contaminating the actuating surface of the external collet.

FIG. 26 is an elevation section view of the external collet illustrated in FIG. 25, taken along the line 26—26 thereof, and looking in the direction of the arrows.

FIG. 27 is a fragmentary, enlarged view of a portion of the external collet illustrated in FIG. 25, taken within the circle marked by the numeral "27" in FIG. 25, and showing the rubber seal positioned in the split in the external collet body.

FIG. 28 is a top view of a one-piece circular internal collet which is constructed the same as the internal collet shown in FIGS. 22 and 23, and which is provided with a split in the collet body, and a rubber seal positioned in the split to prevent dirt from contaminating the actuating surfaces of the internal collet by passage of dirt outwardly through the split.

FIG. 29 is an elevation section view of the internal collet illustrated in FIG. 28, taken along the line 29—29 thereof, and looking in the direction of the arrows.

FIG. 30 is a fragmentary, enlarged view of a portion of the internal collet illustrated in FIG. 28, taken within the circle marked by the numeral "30" in FIG. 28, and showing the split in the internal collet body in which is positioned a rubber seal.

DESCRIPTION OF THE PREFERRED EMBODIMENTS

Figure 1:
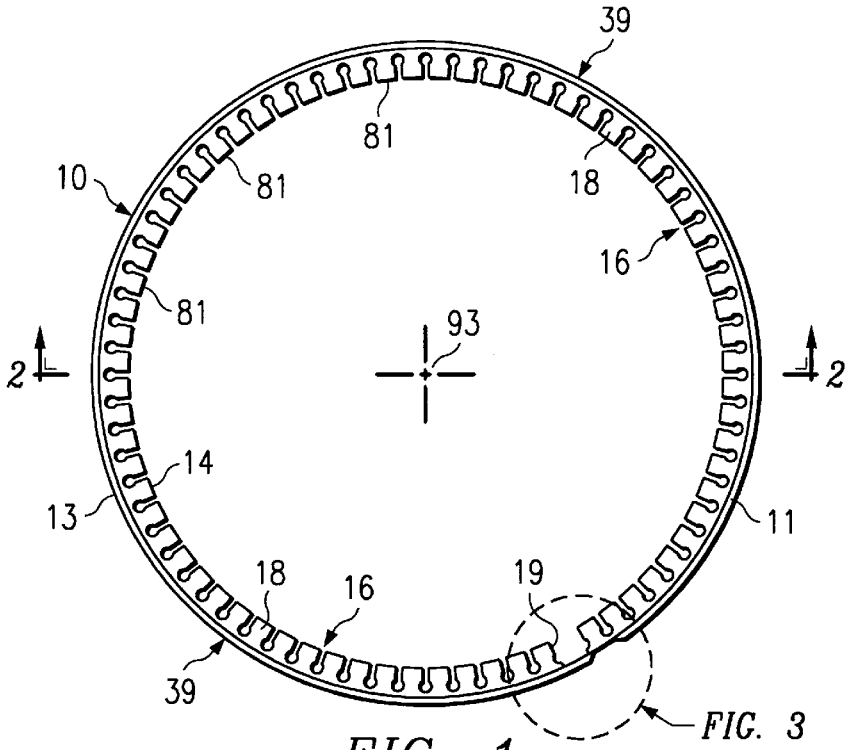
FIG. 1 is a top view of a preloaded, expanded one-piece circular internal collet made in accordance with the principles of the present invention, and which is constructed and arranged for internal workpiece holding operations.
Figure 2:
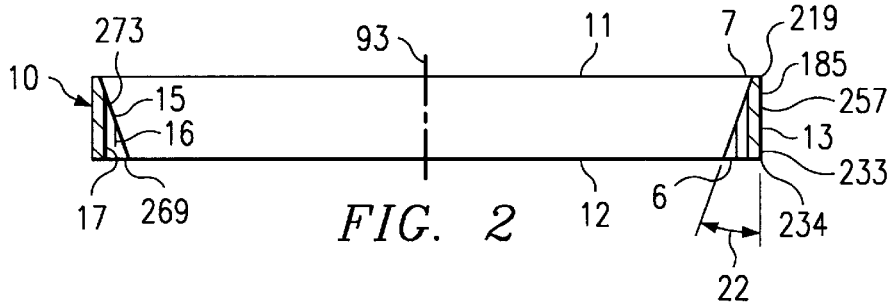
FIG. 2 is an elevation section view of the internal collet illustrated in FIG. 1, taken along the line 2—2 thereof, and looking in the direction of the arrows.

Referring now to the drawings, and in particular to FIGS. 1 and 2, the numeral 10 generally designates the ring shaped or circular body of an internal collet, made in accordance with the principles of the present invention, and which is constructed and arranged for internal holding actions on a workpiece. The numeral 11 designates the upper end of the circular internal collet body 10 and the numeral 12 designates the bottom end thereof. The numeral 13 designates the cylindrical outer workpiece gripping surface of the collet. The collet body 10 has a circular inner periphery 14 as shown in FIG. 1. The ring shaped collet body 10 is provided with a downwardly tapered or sloping inner cam face 15.

Figure 3:
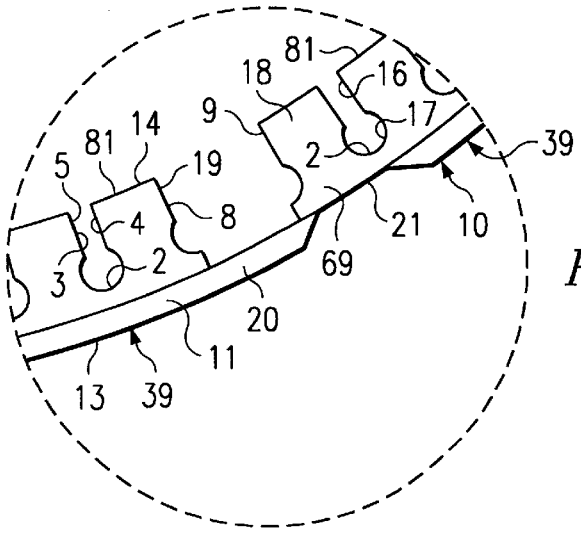
FIG. 3 is a fragmentary, enlarged view of a portion of the internal collet illustrated in FIG. 1, taken within the circle marked by the numeral "3" in FIG. 1, and showing a split in the collet body, and an integral split closure tang.

As best seen in FIG. 3, the internal collet body 10 is provided with a plurality of radially disposed slots 16 which extend radially outward from the inner circular periphery 14 of the collet body to communication with a vertical hole 17 which is formed vertically through the internal collet body 10. The radial slots 16 divide the inner portion of the internal collet body 10 into a plurality of inwardly extended radial arms 18. As best seen in FIG. 3, the internal collet body 10 is provided with *first and second ends 8,9 cooperating to define* a split [or opening] *space* designated by the numeral 19. *The first end 8 is positioned to lie in spaced-apart relation to the second end 9 to define the split space 19 therebetween as shown in FIGS. 1 and 3 to provide a split collet body 10.*

*The collet body 10 includes a central axis 93, an annular base 39 including the workpiece gripping surface 13, and radial arms 18 appended to the annular base 39 as shown in FIG. 3. Each radial arm 18 is arranged to extend in radial directions away from the workpiece gripping surface 13 and includes a root 69 appended to annular base 39, and a distal tip 81 arranged to lie in spaced-apart relation from the annular base 39. Each radial arm 18 further includes an axially inner end 6 and an axially outer end 7 spaced apart from the axially inner end 6 in a direction parallel to the central axis 93. The distal tips 81 cooperate to define the cam face 15 as shown in FIGS. 1 and 3. Each slot 16 extends from axially inner ends 6 of the radial arms 18 defining such slot 16 to the axially outer ends 7 of respective radial arms 18 defining such slot 16 as shown in FIG. 2.*

*The collet body 10 further includes internal walls 5 including first and second flat slot surfaces 3, 4 and an arcuate slot surface 2 which surfaces cooperate to define a boundary of each slot 16 as shown in FIG. 3. Each set of solt-defining surfaces 3,4,2 cooperate to define a slot 16 having a keyhole-shaped cross section as shown in FIG. 3.*

*As shown in FIG. 2, workpiece gripping surface 13 includes an axially outer portion 185 positioned to lie adjacent to a radial edge 219 of upper end 11 of collet body 10, an axially inner portion 233 positioned to lie adjacent to a radial 234 edge of bottom end 12 of collet body 10, and a middle portion 257 positioned to lie between axially outer and axially inner portions 185, 233. Axially outer, axially inner, and middle portions 185, 233, 257 are annular and continuous from first end 8 of collet body 10 to second end 9 of collet body 10.* The split [or opening] *space* 19 permits the internal collet body 10 to be expanded and contracted through the necessary rotary movements involved in engaging the internal cylindrical bore in a workpiece and disengaging therefrom. The internal collet body 10 shown in FIGS. 1 and 3 is in a preloaded or expanded position for a gripping engagement in an internal bore of a workpiece. As shown in FIG. 3, an integral closure lip or tang 20 is provided on the one side of the [opening] *split space* 19 to prevent dirt from passing from the center of the internal collet body 10 and outward into injurious engagement with the outer periphery 11 of the internal collet body 10. The integral closure lip or tang 20 extends peripherally from one side of the [opening] *split space* 19 and across the [opening] *split space* and into sliding engagement with the outer surface of a notch 21 formed in the outer surface 13 of the collet body 10. The notch 21 permits the closure lip or tang 20 to slide into the notch 21 when the load is released from the collet and the internal collet body 10 contracts to a position released from engagement with an internal bore in a workpiece.

As shown in FIG. 2, the angle 22 of the cam surface 15 relative to the vertical axis of the collet body 10 is preferably selected from a range of from one degree to 45 degrees, depending on the holding force required. The holding force is normally a designated requirement of the customer or ultimate user of a workpiece holding chuck in which the collet of the present invention is employed. The required holding force is calculated by multiplying the pounds per square inch (PSI) input pressure exerted on the piston area of a chuck fluid power operated motor to obtain the force exerted by the fluid operated motor. The exerted force is multiplied by the cotangent of the cam surface angle 22 to determine the desired holding force. For example, if the pounds per square inch input pressure for a fluid power operated chuck was 1,000 pounds per square inch, and the piston area of the fluid power operated chuck motor was 7.0686, the resulting force would be 7068.6 pounds. If the angle 22 of the cam surface was 20 degrees, then the holding force would be found by multiplying the force of 7068.6 by the cotangent of angle 22, which is 2.7475, giving a resultant holding force of 19,420,979 pounds.

The collet body 10 may be made from any suitable spring steel, hardened to a 44–46 Rockwell C scale hardness. An optimum spring steel is an S.A.E. (Society of Automotive Engineers) spring Steel No. 6150.

Figure 4:
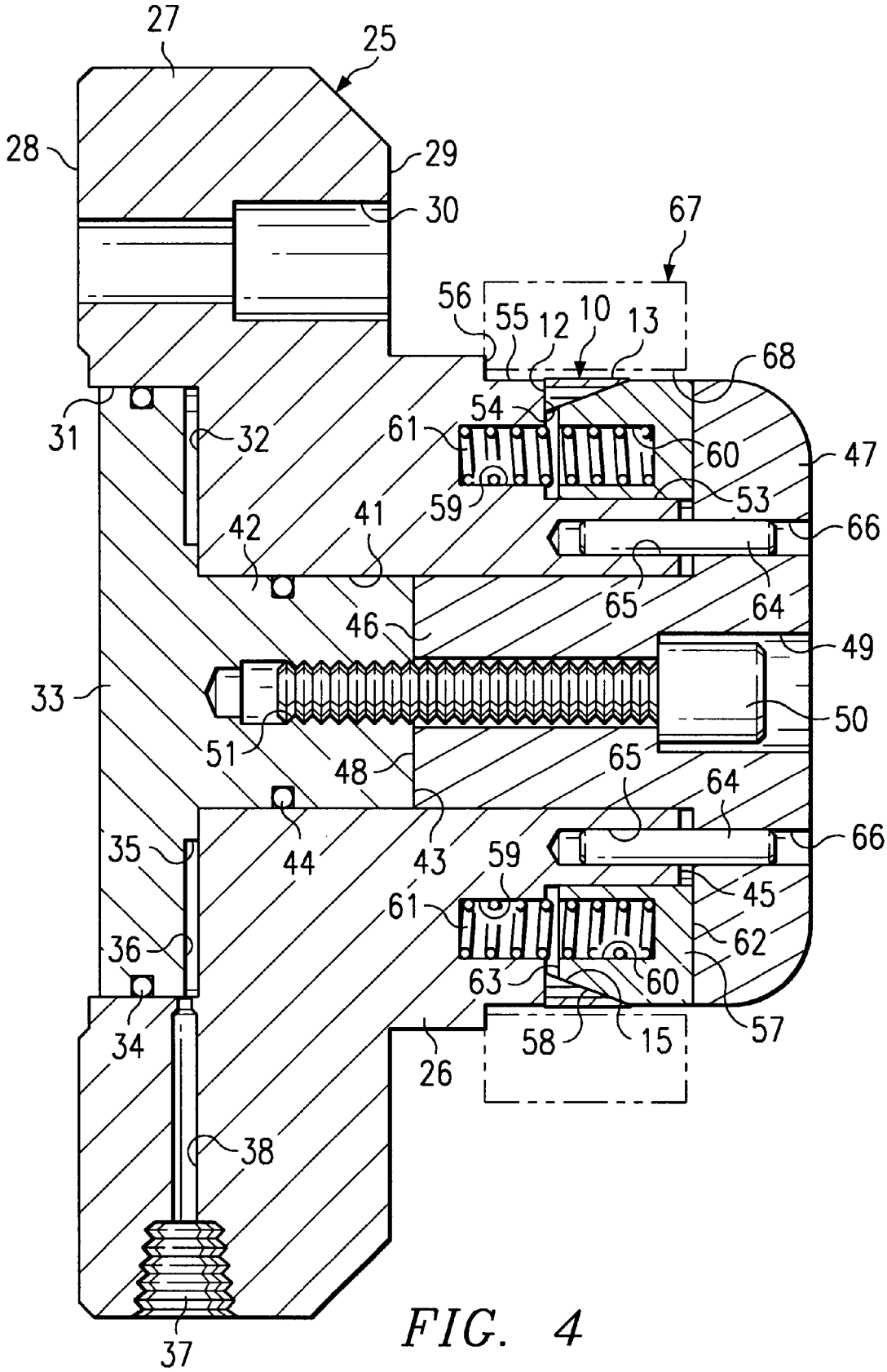
FIG. 4 is a longitudinal section view of a workpiece chuck provided with an internal collet as illustrated in FIGS. 1 and 2, and showing the internal collet in a retracted position, prior to being expanded outward toward an internal bore in a workpiece for an internal gripping engagement therewith.

FIG. 4 is a longitudinal section view of a fluid power operated workpiece chuck, which is generally designated by the numeral 25, and which is provided with an internal collet as illustrated in FIGS. 1 and 2. The internal collet is shown in a retracted position, prior to being expanded outward toward an internal bore in a workpiece for an internal gripping engagement therewith. The chuck 25 comprises a cylindrical chuck body, designated by the numeral 26, which is provided with an integral annular flange 27 at the rear end thereof. The annular chuck body flange 27 is provided with a rear surface 28 and a front surface 29. The chuck 25 is adapted to be mounted to a rotatable spindle in a machine, such as a lathe, by a plurality of suitable bolts mounted through mounting bolt holes as designated by the numeral 30. An annular piston cylinder 31 is formed in the rear end of the chuck flange 27 and it extends forwardly to an inner end wall 32. An annular piston 33 is movably mounted in the annular piston cylinder 31 and it is provided with a suitable O-ring seal 34 around the outer periphery thereof for sealing engagement with the internal surface of the annular piston cylinder 31.

The piston 33 is provided with an integral central shoulder 35 which extends axially forward from the inner side of the piston 33 and abuts the inner end wall 32 of the piston cylinder 31. The space between the inner side of the piston 33 and the inner end wall 32 of the piston cylinder 31 forms an annular pressure cavity designated by the numeral 36. A threaded inlet port 37, for the reception of pressurized fluid such as pressurized air or hydraulic fluid, formed in the outer periphery of the chuck body flange 27. The inlet port 37 is connected by a transverse cylindrical passage 38 to the annular pressure cavity 36.

The chuck body 26 is provided with an axial, forwardly extended, cylindrical piston rod chamber 41 which extends forwardly from the inner end wall 32 of the piston cylinder 31 to the front end 45 of the chuck body 26. The piston 33 is provided with an integral, axial piston rod 42 which is slidably mounted in the piston rod chamber 41 and it is provided with a transverse front end 43. The piston rod 42 is provided with a suitable O-ring seal 44 that is positioned in an annular groove formed around the outer periphery of the piston rod 42. The number 46 designates the cylindrical body of a T-shaped ram that includes an integral, transversely disposed annular ram head 47. The inner end 48 of the ram cylindrical body 46 is seated against the front end 43 of the piston rod 42 and is secured thereto by a suitable bolt 50 that is seated in a bolt hole 49 formed axially through the T-shaped ram and into a threaded engagement with an axially threaded hole 51 formed in the piston rod 42.

The front end of the cylindrical chuck body 26 is provided with a two-stepped outer periphery. The front end of the cylindrical chuck body 26 is provided with a reduced diameter periphery 53 which extends rearwardly from the front end 45 thereof to a transverse annular shoulder or collet seat 54. The outer end of the transverse annular shoulder 54 of the reduced diameter periphery 53 terminates a larger diameter outer periphery 55 that terminates axially at a transverse annular shoulder or workpiece seat 56.

A ring shaped collet actuator member 57 is mounted around the outer periphery 53 on the front end of the collet body 26. The actuator member 57 is provided around the rear outer peripheral corner with a conical or tapered periphery 58. An internal collet as illustrated in FIGS. 1 and 2 is mounted around the chuck body outer end periphery 53 and it is disposed with its bottom end 12 seated on the transverse annular shoulder 54 and with its tapered cam surface 15 seated against the tapered periphery 58 on the actuator member 57. The chuck body 26 is provided with a plurality of spring bores 59 which are disposed around the axis of the chuck body 26 and which communicate with mating longitudinally disposed spring bores 60 in the actuator member 57. A return compression spring 61 is operatively mounted with one end in each of the chuck body spring bores 59 and the other end in a mating actuator member bore 60. The outer end of the actuator member 57 is indicated by the numeral 62 and the inner end of the actuator member 57 is designated by the numeral 63. The numeral 64 designates suitable dowel pins which have the inner ends thereof seated, as by a press-fit, in longitudinally disposed dowel pin holes 65 in the chuck body 26 and disposed evenly about the axis of the chuck body 26. The outer ends of the dowel pins 64 are slidably mounted in mating dowel pin holes 66 that are formed in the ram head 47, and which are axially aligned with the dowel pin holes 65 in the chuck body 26.

Figure 5:
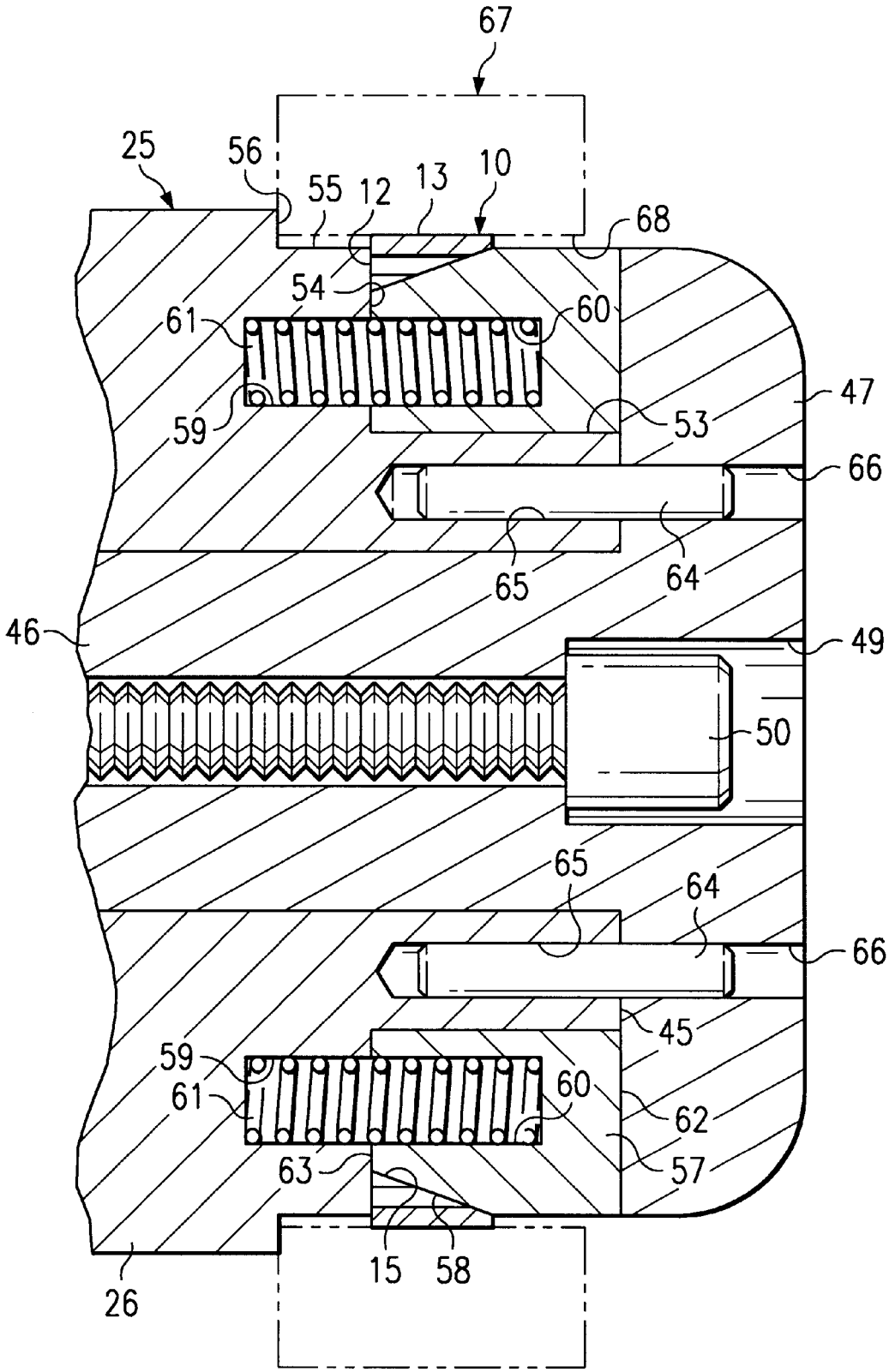
FIG. 5 is a longitudinal section view of a workpiece chuck which is identical to the workpiece chuck shown in FIG. 4, but showing only a portion thereof in an enlarged condition, and with the internal collet in a position fully expanded outward into an internal gripping engagement with an internal bore in a workpiece.

In use, the inlet port 37 would be connected to a suitable source of pressurized fluid, such as pressurized air or a pressurized hydraulic fluid. The fluid power operated chuck 25 is shown in FIG. 4 in an inoperative position with a collet body 10 in a retracted position prior to being expanded outward to a workpiece engaging position. As shown in FIGS. 4 and 5, an annular workpiece 67 is mounted around the front end of the chuck 25, and it is seated against the annular shoulder or workpiece seat 56. Pressurized fluid is then admitted into the port 37 (FIG. 4) from where the fluid flows through the fluid passage 38 and into the pressure cavity 36. The pressurized fluid moves the piston 33 outwardly, or to the left as viewed in FIG. 4, to create a pulling force on the ram head 47. The inner surface of the ram head 47 is seated against the outer surface 62 of the actuator member 57 and moves the annular actuator member 57 inwardly, or to the left as viewed in FIG. 4. The tapered periphery 58 on the actuator member 57 then slides inwardly along the internal cam surface 15 on the collet body 10 to expand the collet body 10 radially and circumferentially, and move the outer periphery 13 thereof into a gripping engagement with the internal periphery 68 of the workpiece 67.

FIG. 5 shows the collet body 10 in an expanded internal gripping engagement with the internal periphery 68 in the workpiece 67. FIG. 5 shows the inner end 63 of the actuator member 57 in a positive stopping engagement with the transverse annular shoulder 54 on the chuck body 26. When the fluid pressure in the pressure cavity 36 is relieved, the compression springs 61 return the ram head 47 outwardly, or to the right as shown in FIGS. 4 and 5, and the piston 33 to the initial position shown in FIG. 4, to release the gripping engagement of the collet body 10 with the workpiece internal bore 68 and allow the collet body 10 to retract to its initial position shown in FIG. 4.

*First and second flat slot surfaces 3, 4 include axially inner ends 269 and spaced-apart axially outer ends 273 as shown in FIG. 2. During movement of the workpiece gripping surface 13 toward the workpiece 67, the axially inner ends 269 move apart from one another and the axially outer ends 273 move apart from one another.*

Figure 6:
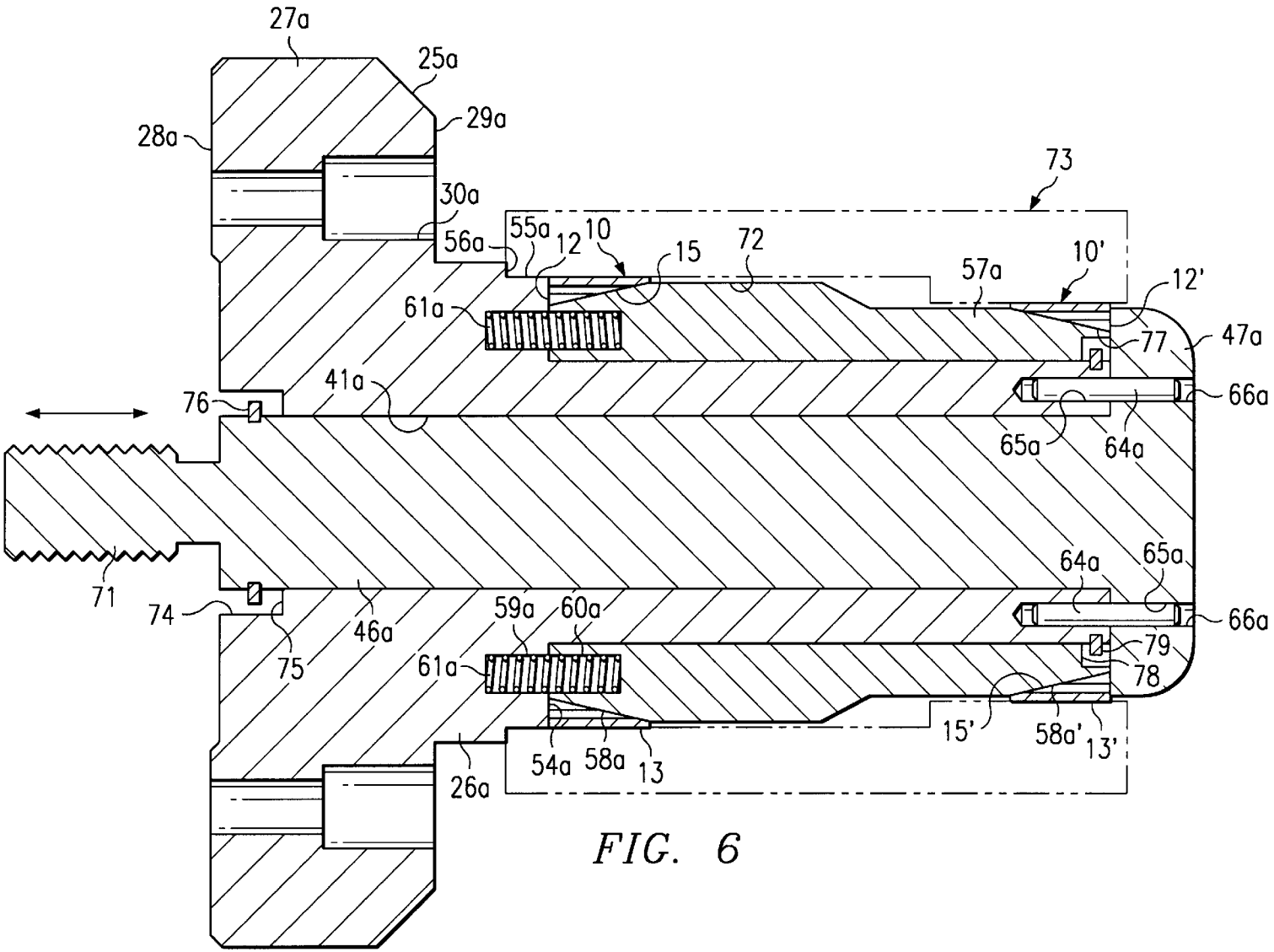
FIG. 6 is a longitudinal section view of a workpiece chuck provided with a pair of independently operable dual action internal collets, of the type shown in FIGS. 1 and 2, and in positions fully expanded outward into gripping engagement with a stepped axial bore in a workpiece.

FIG. 6 is a longitudinal section view of a workpiece chuck 25a provided with a pair of oppositely disposed, independently operable dual action internal collets, of the type shown in FIGS. 1 and 2, and in positions fully expanded radially outward into gripping engagement with a stepped axial bore 72 in a workpiece 73. The parts of the workpiece chuck 25a which are similar in structure and function to the parts of the chuck 25 illustrated in FIGS. 4 and 5 have been marked with the same reference numerals followed by the small letter "a". In the workpiece chuck 25a illustrated in FIG. 6, the T-shaped ram cylindrical body 46a extends through the cylindrical chamber 41a to the rear surface 28a of the chuck body flange 27a. A threaded shaft 71 is formed integral with the rear end of the ram body 46a and it is adapted to be connected to a suitable mechanical power means for exerting a pull to the left as viewed in FIG. 6 to move the T-shaped ram to the position shown in FIG. 6 for expanding the two collet bodies 10 and 10' into an internal gripping engagement with the stepped internal bore 72 in the workpiece 73. In order to move the ram to the right to release the expanding pressure on the two collet bodies 10 and 10', the mechanical power means attached to the threaded shaft 71 is operated to move the ram body 46a to the right until the stop ring 76 mounted around the ram body 46a engages the end wall 75 of an annular recess 74 formed in the rear surface of the chuck flange 27a.

The ring shaped collet actuator member 57a is provided on the inner end thereof with a tapered periphery 58a for sliding engagement with the internal cam surface 15 on the collet body 10. The ring shaped collet actuator 57a is also provided on the outer end thereof with a tapered periphery 58a' for sliding engagement with the internal cam surface 15' on the collet body 10'. The ring shaped collet actuator 57a is provided on the outer end thereof with an inwardly extended axial recess 77, that is formed around the bore through the actuator member 57a, and which terminates at an inner end wall 78. A stop ring 79 is fixedly mounted in the chuck body 26a, around the front end thereof, and it is positioned to extend into the adjacent annular recess 77 in the actuator member 57a. When the mechanical power means attached to the threaded shaft 71 is operated to move the ram body 46a to the right, as viewed in FIG. 6, to release the expanding pressure on the two collet bodies 10 and 10', the plurality of compression springs 61a function to move the actuator member 57a to the right, as viewed in FIG. 6, to a stop position, with the recess wall 78 in engagement with the stop ring 79 to permit the collet bodies 10 and 10' to retract them from the gripping engagement with the stepped inner periphery 72 in the workpiece 73 and permit the collet bodies 10 and 10' to retract to their initial disengaged positions.

Figure 7:
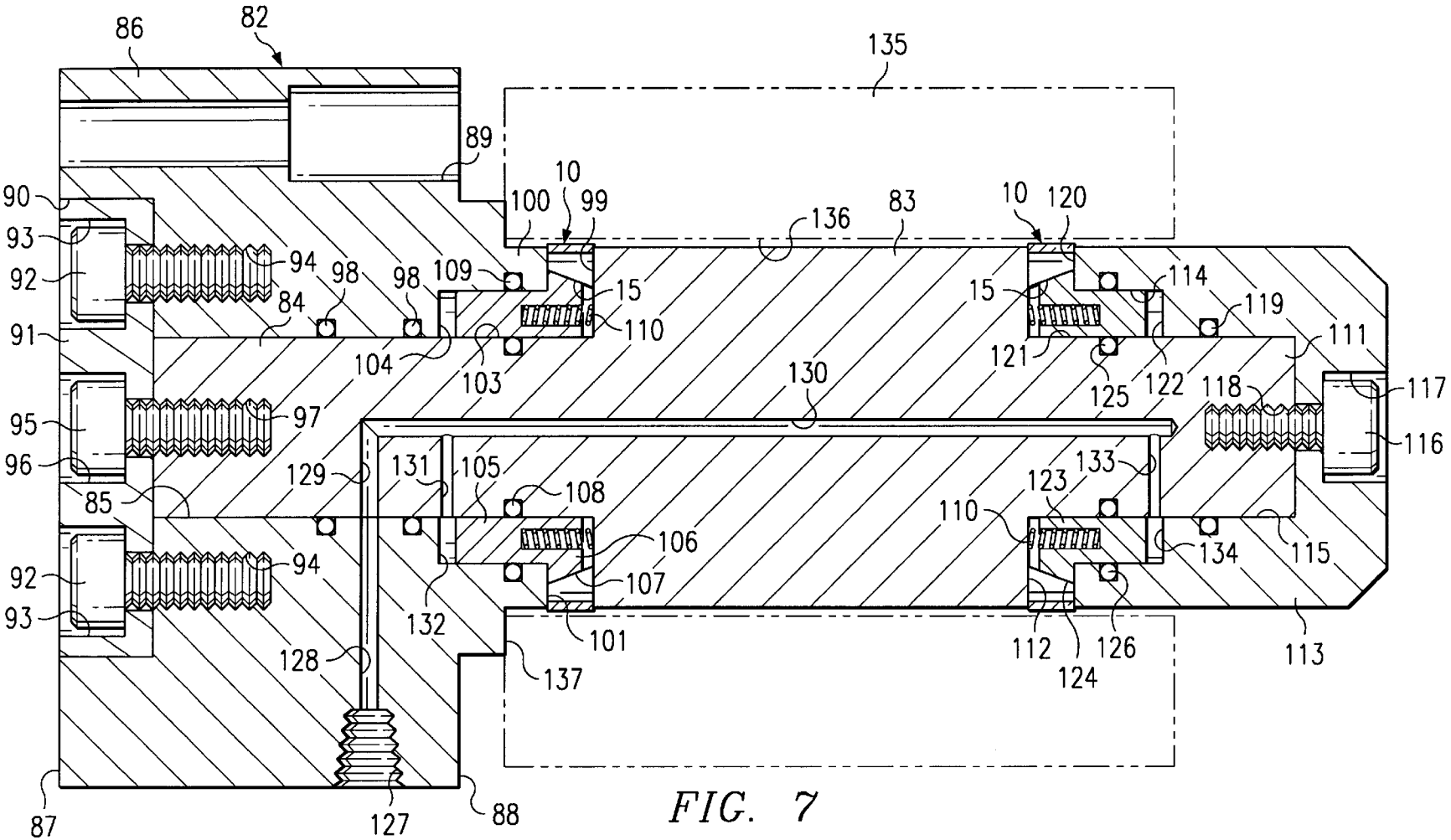
FIG. 7 is a longitudinal section view of a workpiece chuck, showing a pair of independently operable dual action internal collets, of the type illustrated in FIGS. 1 and 2, and showing the collets in a position partially expanded outward, for an internal gripping engagement with a cylindrical bore of a workpiece, and wherein each of the two collets have a separate ram system, with compression spring return means.

FIG. 7 is a longitudinal section view of a workpiece chuck, generally indicated by the numeral 82, and showing a pair of independently operable dual action internal collets, of the type illustrated in FIGS. 1 and 2, and showing the collets in position partially expanded radially outward for an internal gripping engagement with a cylindrical bore in a workpiece, and wherein each of the pair of collets have a separate ram system with compression spring return means. The chuck 82 comprises a cylindrical body 83, which has a reduced diameter cylindrical rear end portion 84 that is mounted in an axial bore 85 in an annular flange 86. The annular chuck body flange 86 is provided with a rear surface 87 and a front surface 88. The chuck 82 is adapted to be mounted to a rotatable spindle in a machine, such as a lathe, by a plurality of suitable bolts mounted through mounting holes, as designated by the numeral 89.

As shown in FIG. 7, the annular flange 86 is provided on the rear side thereof with a circular recess 90 in which is seated a circular retainer plate 91. The retainer plate 91 is releasably secured to the annular flange 86 by a plurality of suitable bolts 92 which extend through bolt holes in the retainer plate 91 and into threaded engagement with threaded holes in the annular flange 86. The chuck body reduced diameter cylindrical rear end portion 84 is secured to the flange 86 by a suitable bolt 95 which extends through a bolt hole 96 in the retainer plate 91 and into threaded engagement with a threaded hole 97 in the rear end of the reduced diameter cylindrical rear end portion 84 of the chuck body 83. A pair of suitable O-ring seals 98 are operatively mounted in the chuck flange 86, around the bore 85, and they sealingly engage the outer periphery of the chuck body reduced diameter cylindrical rear end portion 84.

As shown in FIG. 7 the front end of the reduced diameter cylindrical rear end portion 34 of the chuck body 83 terminates at an annular shoulder or wall designated by the numeral 99. The annular flange 86 is provided on the front end thereof with an integral tubular forward extension 100 which terminates at the point designated by the numeral 101, and spaced apart from the chuck body wall 99, to provide an annular groove which functions as a cylindrical collet seat for a rear collet body 10.

The numeral 103 designates an annular recess formed by the tubular flange extension 100 around the chuck body reduced diameter cylindrical rear end portion 84 and which terminates at a inner end annular wall 104. A ring shaped collet actuator member 105, having a L-shaped cross section, is slidably mounted in the annular recess 103. The collet actuator member 105 has an integral annular, radially outward extended leg which extends into the collet seat annular groove and which is provided with a conical or tapered peripheral surface 107. The actuator tapered or conical peripheral surface 107 is adapted to slidably engage the tapered cam surface 15 on the front collet body 10. A suitable O-ring seal 108 is mounted in the reduced diameter cylindrical rear end portion 84 of the chuck body 83 for sealing engagement with the inner periphery of the ring shaped collet actuator member 105. A suitable O-ring seal 109 is mounted in a groove around the inner periphery of the annular recess in the flange rearward tubular extension member 100 for sealing engagement against the outer surface of the ring shaped collet actuator member 105. The ring shaped collet actuator member 105 is provided with a plurality of compression return springs 110 mounted therein and which function in the same manner as the aforedescribed compression return springs 61 shown in the workpiece chuck illustrated in FIGS. 4 and 5.

As shown in FIG. 7, the front end of the chuck body 83 is provided with an integral, reduced diameter cylindrical front end portion 111. The rear end of the integral reduced diameter cylindrical front end chuck body portion 111 terminates at an annular shoulder or wall designated by the numeral 112. A tubular front end cap member 113 is provided with a stepped axial bore indicated by the numerals 114 and 115 that extends inwardly from the inner end thereof. The integral, reduced diameter cylindrical front end portion 111 of the chuck body 83 is slidably mounted in the inner bore portion 115 in the front end cap 113. The front end cap 113 is releasably secured to the integral, reduced diameter cylinder portion 111 of the chuck body 83 by a bolt 116 which is mounted through a bolt hole 117 formed through the transverse front end of the cap 113 and into threaded engagement with a threaded hole 118 in the integral, reduced diameter cylindrical front end portion 111 of the chuck body 83. An O-ring seal 119 is operatively mounted in an annular groove in the wall of the front end cap axial bore 115 and it sealingly engages the outer periphery of the integral, reduced diameter cylindrical front end portion 111 of the chuck body 83. The annular inner end of the front end cap 113 is designated by the numeral 120 and it is spaced forwardly apart from the shoulder or wall 112 on the chuck body 83 to provide a second annular groove which functions as a cylindrical collet seat for a front collet body 10. The numeral 121 designates an annular recess formed by the outer stepped bore portion 114 around the chuck body integral, reduced diameter cylindrical front end portion 111 which terminates at an inner end annular wall 122. A ring shaped collet actuator member 123, having an L-shaped cross section, is slidably mounted in the annular recess 121. The collet actuator member 123 has an integral annular, radially outward extended leg which extends into the collet seat annular groove and which is provided with a conical or tapered peripheral surface 124. The actuator conical or tapered peripheral surface 124 is adapted to slidably engage the tapered cam surface 15 on the front collet body 10. A suitable O-ring seal 125 is formed in a groove around the chuck body front reduced diameter cylindrical portion 111 and it is in sealing engagement with the actuator member 123. A suitable O-ring seal 126 is mounted in a groove in the front end cap 113 in the inner surface of the axial bore portion 114 and it is in sealing engagement with the actuator member 123.

A threaded inlet port 127 for the reception or pressurized fluid, such as pressurized air or hydraulic fluid, is formed in the outer periphery of the chuck body flange 86. The inlet port 127 is connected by a transverse cylindrical passage 128 which communicates with a transverse passage 129 in the integral, reduced diameter cylindrical rear end chuck body portion 84. The transverse passage 129 communicates with a longitudinal passage 130 in the chuck body 83, which in turn communicates with a transverse passage 131 in the integral, reduced diameter cylindrical rear end chuck body portion 84 that in turn communicates with an annular pressure cavity 132. The longitudinal passage 130 communicates at its forward end in the integral, reduced diameter front end chuck body portion 111 with a transverse passage 133 that in turn communicates with a second annular pressure cavity 134.

In use, the inlet port 127 would be connected to a suitable source of pressurized fluid, such as pressurized air or pressurized hydraulic fluid. The fluid power operated chuck 82 is shown in FIG. 7 with the front and rear collet bodies 10 in a partially expanded position spaced apart from the internal bore 136 in a workpiece 135 which is positioned against a workpiece seat stop member 137. In order to fully expand the collet bodies 10 into internal gripping engagement with the bore 136 in the workpiece 135, pressurized fluid would be admitted into the port 137 and it would flow through the passages 128, 129 and 130, and 131 and 133 into the pressure cavities 132 and 134. The pressurized fluid moves the actuator members 105 and 123 longitudinally toward each other, and the tapered peripheries 107 and 124 on the actuator members 105 and 123, respectively, slide on the cam surfaces 15 on the collet bodies 10 and expand them radially outward into an internal gripping engagement with the bore 136 in the workpiece 135. When the fluid pressure entering the inlet port 127 is relieved, the compression return springs 110 function to return the actuator members 105 and 123 to their retracted initial positions, in the same manner as described hereinbefore for the workpiece chucks shown in FIGS. 4 and 6.

Figure 8:
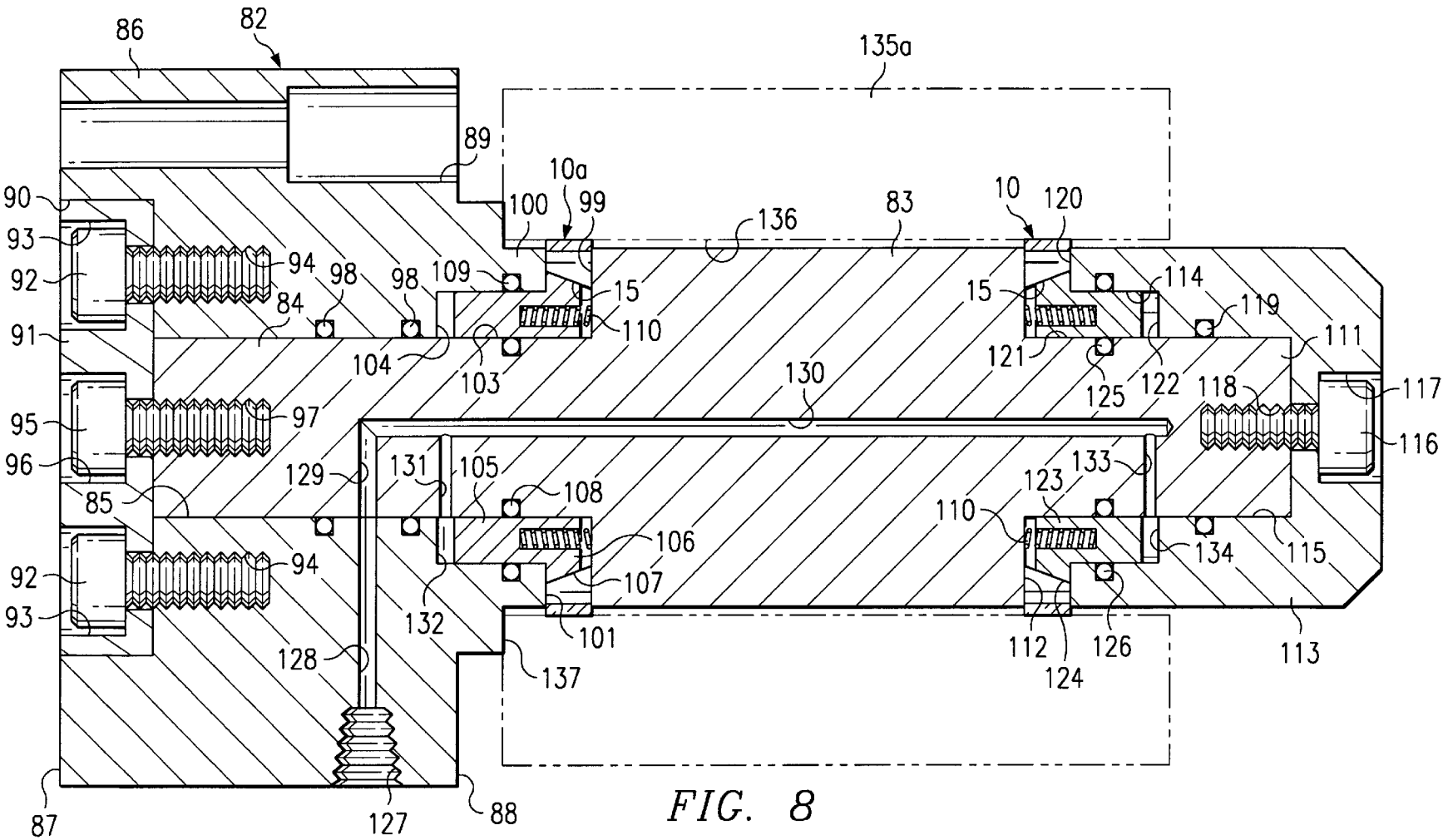
FIG. 8 is a longitudinal section view of a workpiece chuck provided with a pair of independently operable dual action internal collets of the type illustrated in FIG. 7, and wherein the outer periphery of each of the collets is ground to a different taper, for mating with and gripping an internal tapered surface of a tapered axial bore in a workpiece.

FIG. 8 is a longitudinal section view of a workpiece chuck 82 which is identical to the workpiece chuck 82 shown in FIG. 7. The parts of the workpiece chuck 82 in FIG. 8 have been marked with the same reference numerals as used in the description of the chuck 82 in FIG. 7, however the workpiece has been designated by the numeral 135a and the rear collet body has been designated by the numeral 10a. The workpiece chuck 82 shown in FIG. 8 employs the same pair of independent and operable dual action internal collets, as shown in FIG. 7, but the rear collet body 10a is ground to a different taper then the outer periphery of the front collet body 10, for mating with and gripping the internal tapered surface of the tapered axial bore 136a in the workpiece 135a. The workpiece chuck 82 shown in FIG. 8 is operated in the same manner as explained hereinbefore for the operation of the workpiece shown in FIG. 7.

Figure 9:
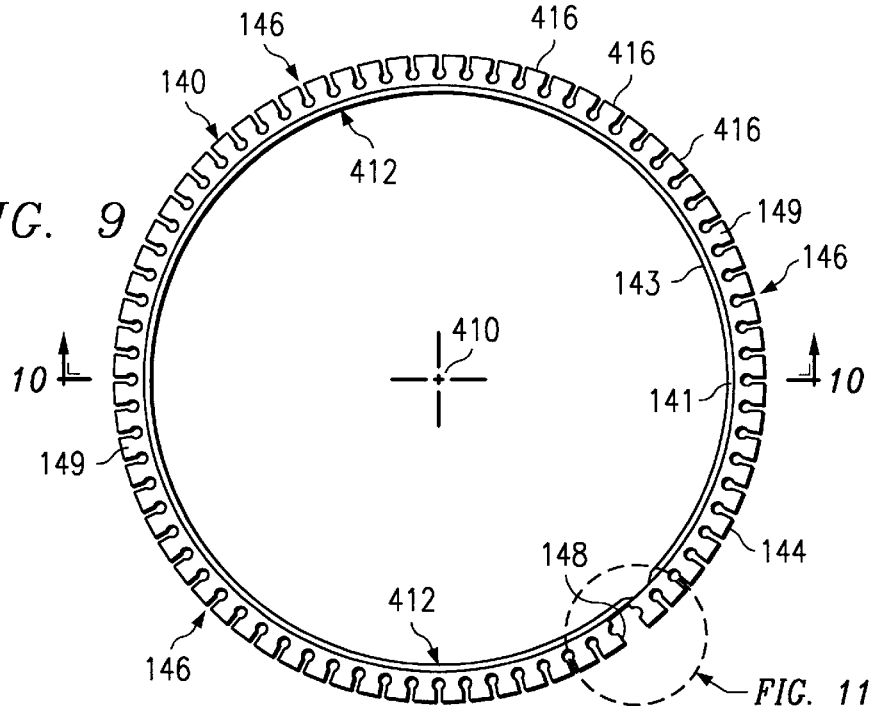
FIG. 9 is a top view of an unloaded, released one-piece circular external collet made in accordance with the principles of the present invention, and which is constructed and arranged for exterior workpiece holding operations.
Figure 10:
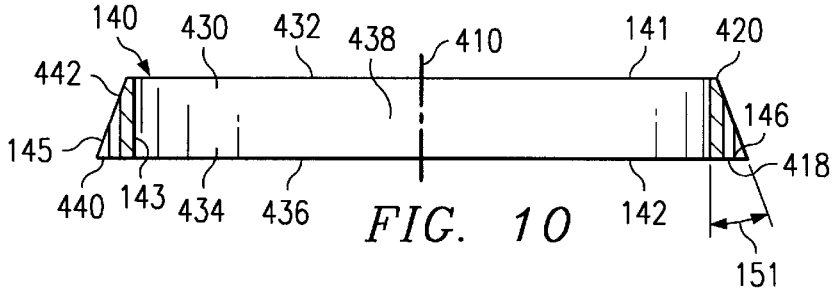
FIG. 10 is an elevation section view of the external collet illustrated in FIG. 9, taken along the line 10—10 thereof, and looking in the direction of the arrows.

FIG. 9 is a top view of an unloaded, released or retracted one-piece circular collet made in accordance with the principles of the present invention, and which is constructed and arranged for exterior workpiece holding operations. The numeral 140 generally designates the ring shaped or circular body of the external collet. The numeral 141 designates the top or upper end of the circular external collet body 140 and the numeral 142 (FIG. 10) designates the bottom end thereof. The numeral 143 designates the cylindrical internal workpiece gripping surface of the collet. The collet body 140 has a circular outer periphery designated by the numeral 144 in FIGS. 9 and 11. As shown in FIG. 10, the ring shaped collet body 140 is provided with a downwardly tapered or sloping outer cam face 145.

Figure 11:
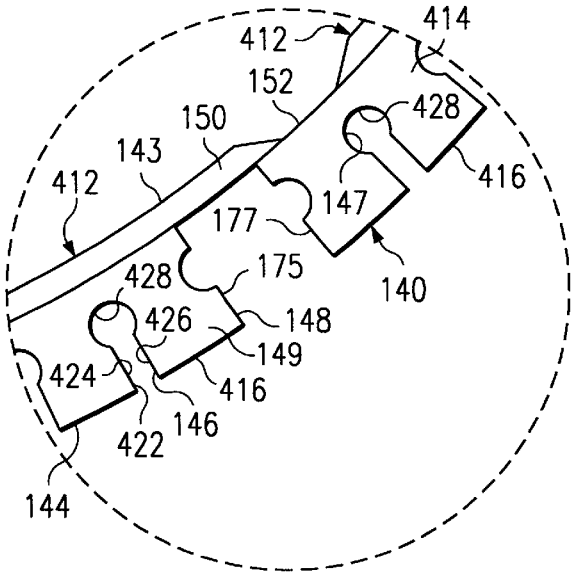
FIG. 11 is a fragmentary, enlarged view of a portion of the external collet illustrated in FIG. 9, taken within the circle marked by the numeral "11" in FIG. 9, and showing a split in the collet body, and an integral split closure tang.

As best seen in FIG. 11, the external collet body 140 is provided with a plurality of radially disposed slots 146 which extend radially inward from the outer circular periphery 144 of the collet body to communication with a vertical hole 147 which is formed vertically through the external collet body 140. The radial slots 146 divide the outer portion of the external collet body 140 into a plurality of inwardly extended radial arms 149. As best seen in FIG. 11, the external collet body 140 is provided with *first and second ends 175, 177 cooperating to define* a split [or opening] *space* designated by the numeral 148. *The first end 175 is positioned to lie in spaced-apart relation to the second end 177 to define the split space 148 therebetween as shown in FIGS. 9 and 11 to provide a split collet body 140.*

*The collet body 140 includes a central axis 410, an annular base 412 including the workpiece gripping surface 143, and radial arms 149 appended to the annular base 412 as shown in FIG. 11. Each radial arm 149 is arranged to extend in radial directions away from the workpiece gripping surface 143 and includes a root 414 appended to annular base 412 and a distal tip 416 arranged to lie in spaced-apart relation from the annular base 412. Each radial arm 149 further includes an axially inner end 418 and an axially outer end 420 spaced apart from the axially inner end 418 in a direction parallel to the central axis 410. The distal tips 416 cooperate to define the cam face 145 as shown in FIGS. 9 and 11. Each slot 146 extends from axially inner ends 418 of the radial arms 149 defining such slot 146 to the axially outer ends 420 of respective radial arms 149 defining such slot 146 as shown in FIG. 10.*

*The collet body 140 further includes internal walls 422 including first and second flat slot surfaces 424, 426 and an arcuate slot surface 428 which surfaces cooperate to define a boundary of each slot 146 as shown in FIG. 11. Each set of slot-defining surfaces 424, 426, 428 cooperate to define a slot 146 having a keyhole-shaped cross section as shown in FIG. 11.*

*As shown in FIG. 10, workpiece gripping surface 143 includes an axially outer portion 430 positioned to lie adjacent to a radial edge 432 of upper end 141 of collet body 140, an axially inner portion 434 positioned to lie adjacent to a radial 436 edge of bottom end 142 of collet body 140, and a middle portion 438 positioned to lie between axially outer and axially inner portions 430, 434. Axially outer, axially inner, and middle portions 430, 434, 438 are annular and continuous from first end 175 of collet body 140 to second end 175 of collet body 140.* The split [or opening]*space* 148 permits the external collet body 140 to be contracted and expanded through the necessary rotary movements involved in engagement the external cylindrical surface of a workpiece and disengaging therefrom. As shown in FIG. 11, an integral closure lip or tang 150 is provided on one side of the [opening] *split space* 148 to prevent dirt from passing from the inside of the external collet body 140 and inward into injurious engagement with the outer cam face 145 of the external collet body 140. The integral closure lip or tang 150 extends peripherally from one side of the [opening] *split space* 148 and across the opening and into sliding engagement with the outer surface of a notch 152 formed in the inner surface 143 of the collet body 140. The notch 152 permits the closure lip or tang 150 to slide into the notch 152 when the collet is loaded or contracted, and the external collet body 140 contracts to a position in engagement with an external surface of the cylindrical workpiece.

As shown in FIG. 10, the angle 151 of the cam surface 145 relative to the vertical axis of the collet body 140 is preferably selected from a range of from 1 degree to 45 degrees, depending on the holding force required. The holding force required is computed as set forth hereinbefore under the discussion of the internal collet disclosed in FIGS. 1, 2 and 3. The collet body 140 may be made from any suitable spring steel as set forth hereinbefore for the internal collet body 10 shown in FIGS. 1, 2 and 3.

Figure 12:
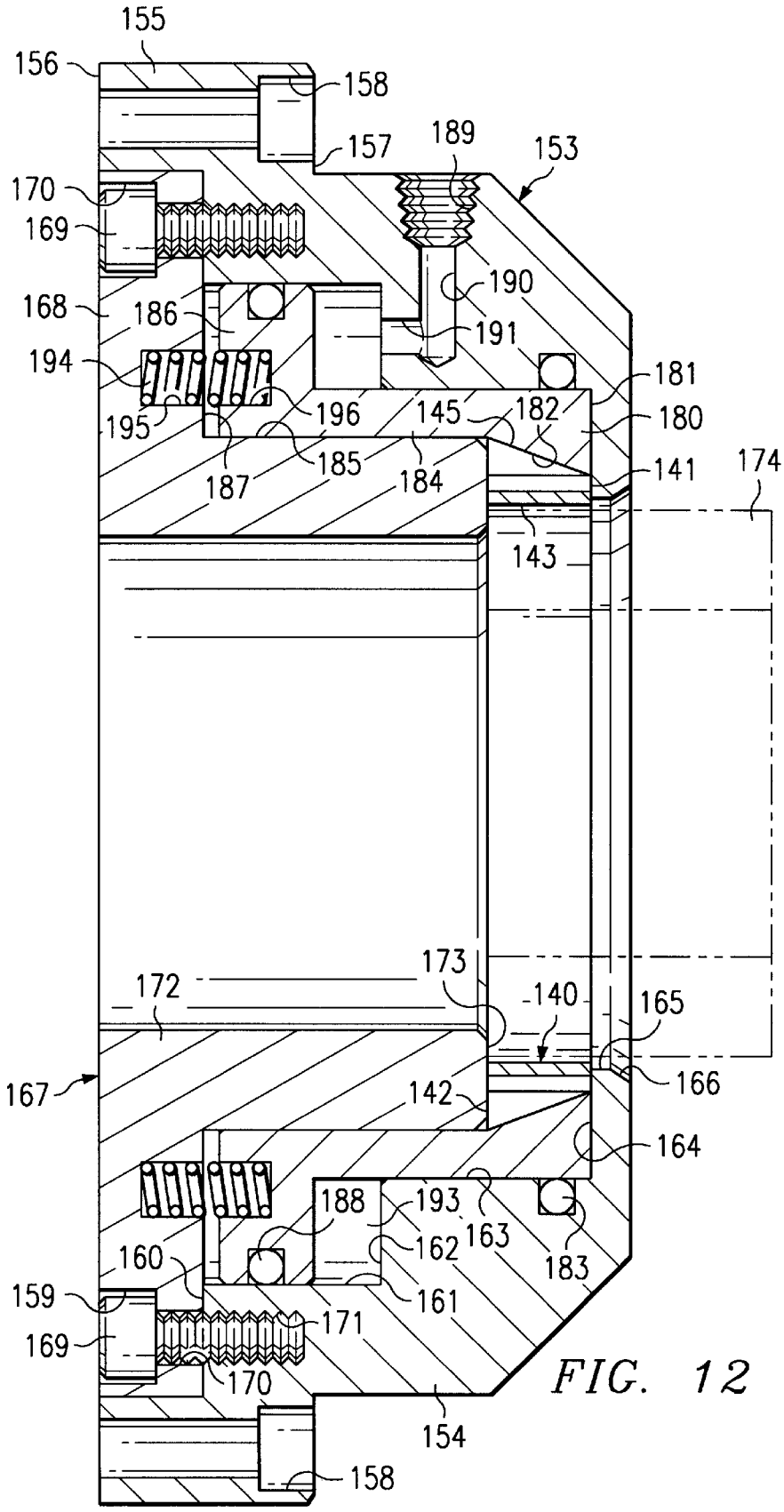
FIG. 12 is a longitudinal section view of a workpiece chuck provided with an external collet as illustrated in FIGS. 9 and 10, and showing the external collet in a released position before being contracted toward the periphery of a workpiece, for an external gripping engagement therewith.

FIG. 12 is a longitudinal section view of a fluid power operated workpiece chuck, generally indicated by the numeral 153, and provided with an external collet as illustrated in FIGS. 9 and 10, and showing the external collet body 140in a released position before being contracted toward the periphery of a cylindrical workpiece 174 for an external gripping engagement therewith. The chuck 153 comprises a cylindrical chuck body 154 which is provided with an integral annular flange 155 at the rear end thereof.

The annular chuck body flange 155 is provided with a rear surface 156 and a front surface 157. The chuck 153 is adapted to be mounted on a rotatable spindle in a machine, such as a lathe, by a plurality of suitable bolts mounted through mounting bolt holes designated by the numeral 158. The chuck body 154 has formed therethrough a four stepped axial bore comprising a first longitudinal bore portion 159 that extending into the chuck body 154 from the rear side thereof and terminates at a shoulder or wall 160. The first bore portion 159 communicates at its inner end with a reduced diameter second bore portion 161 that extends longitudinally toward the front of the chuck body 154 and terminates at a transverse shoulder or wall 162. The transverse shoulder or wall 162 terminates at its radial inner end with a further reduced axial third bore portion 163 which extends axially forward and terminates a shoulder or wall 164. The transverse shoulder or wall 164 terminates at its radial inner end at a fourth axial bore portion 165 which is provided on its outer periphery with a chamfered edge 166 that communicates with the exterior of the chuck body 154.

A workpiece stop or seat and collet retainer member, generally indicated by the numeral 167, is mounted in a stepped bore portions 159, 161 and 163, and it is provided with an integral, transverse annular flange 168 that is seated in the stepped bore portion 159 against the shoulder or wall 160, and secured thereto by a plurality of bolts 169 which are mounted through-bolt holes 170 in the flange 168 and into threaded engagement in threaded holes 171 in the chuck body 154. A workpiece stop or seat, and collet retainer 167 includes a tubular integral, axially disposed member 172 which extends from the flange 168 forwardly toward the front of the chuck body 154, and which terminates with a transverse annular front end 173 that functions as a seat and stop for the inner end of a cylindrical workpiece 174. The transverse annular front end 173 of the tubular member 172 also functions as a seat or retainer for the lower end 142 of an external collet body 140 of the external collet type illustrated in FIGS. 9 and 10.

A ring shaped actuator member 180 is mounted in the stepped bore portion 163 with its outer periphery in slidable engagement with the wall of the bore portion 163 and with its outer end 181 seated against the bore wall 164 when the actuator is in an initial inactive position. The inner periphery 182 of the actuator member 180 is formed with a tapered periphery 182 which mates with and seats on the conical tapered outer periphery 145 of the external collet body 140. An O-ring seal 183 is mounted in a groove in the wall of the axial third bore portion 163 and it sealingly engages the outer cylindrical periphery of the actuator member 180.

The actuator member 180 is integrally connected at its inner end to an annular piston rod 184, which in turn is integrally connected at its inner end to an annular fluid operated piston 186. The annular piston 186 is mounted in a annular piston chamber bounded by the outer periphery of the tubular member 172, the stepped bore portion 161, the wall 162, and the inner side 187 of the annular flange 168. An O-ring 188 is operatively mounted in a groove formed around the outer periphery of the annular piston 186 and it sealingly engages the stepped bore portion 161.

The numeral 189 designates an inlet port, for pressurized air or pressurized hydraulic fluid, and it communicates with a transverse passage 190 which in turn communicates with an axial passage 191 that is connected to an annular fluid pressure cavity 193. The annular piston 186, together with the integral cylindrical piston rod 184 and actuator 180 member, is returned to the initial position shown in FIG. 12 by a plurality of compression return springs 194 which each has their outer end mounted in a suitable bore 195 in the flange 155 and the other end mounted in an aligned bore 196 in the piston 186.

Figure 13:
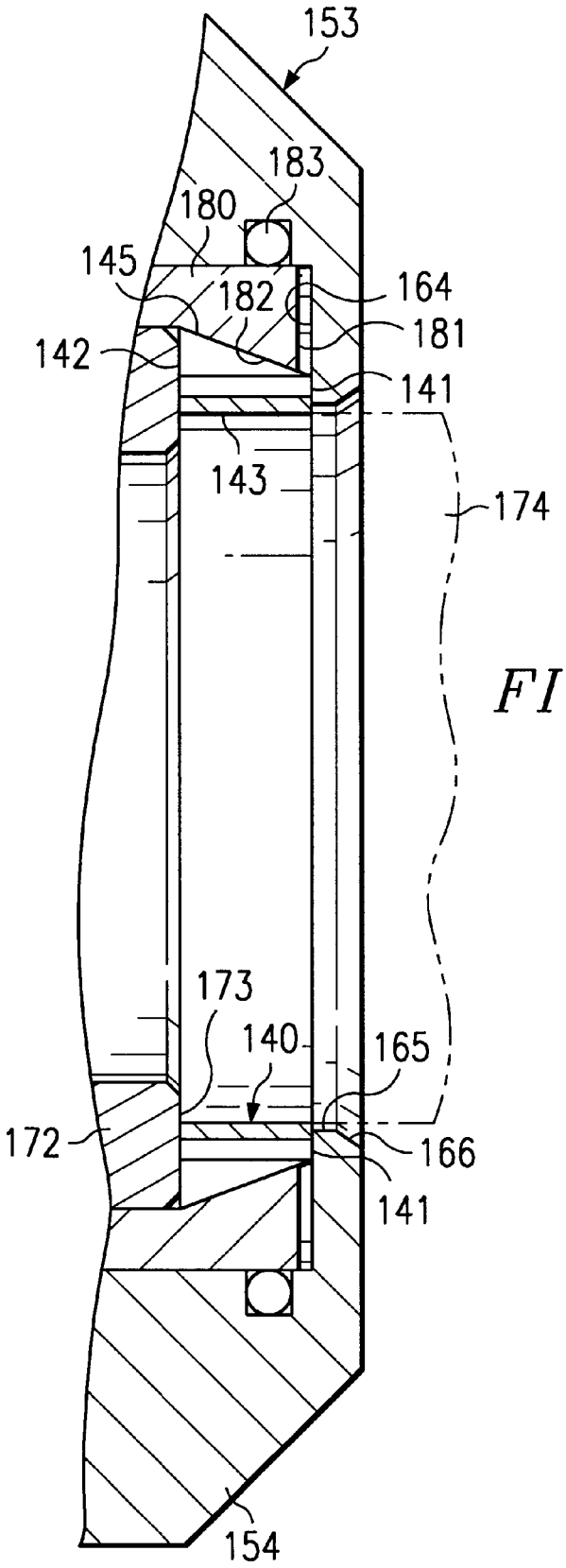
FIG. 13 is a longitudinal section view of a workpiece chuck which is identical to the workpiece chuck shown in FIG. 12, but showing only a portion thereof in an enlarged condition, and showing the external collet of FIG. 13 in a position fully contracted inward into an external gripping engagement with the periphery of a cylindrical workpiece.

In use, the inlet port 189 would be connected to a suitable source of pressurized fluid, such as pressurized air or pressurized hydraulic fluid. The fluid power operated chuck 153 is shown in FIG. 12 in an inoperative position with the collet body 140 in a retracted or expanded position prior to being contracted inward to a workpiece engaging position. As shown in FIGS. 12 and 13 (which shows only a portion of FIG. 12), a tubular workpiece 174 is mounted in the internal periphery 143 of the collet body 140, with its inner end seated on the transverse workpiece seat 173. The seat 173 also functions as a collet seat for the lower end 142 of the collet body 140. Pressurized fluid is then admitted into the inlet port 189 (FIG. 12) from where the fluid flows through the fluid passages 190 and 191 and into the pressure cavity 193. The pressurized fluid moves the piston 186 inwardly or to the left as viewed in FIG. 12, to create a pulling or ram force on the actuator member 180. The inner tapered surface 182 on the actuator member 180 then slides inwardly, or the left as viewed in FIG. 12, along the external cam surface 145 on the collet body 140 to contract the collet body 140 radially and circumferentially, and move the collet inner periphery 143 into a gripping engagement with the external periphery of the cylindrical workpiece 174, as shown in FIG. 13. When the fluid pressure entering the inlet port 189 is released or relieved, the plurality of compression springs 194 move the annular piston 186 and the actuator member 180 to the right, as viewed in FIG. 12, to permit the collet body 140 to expand back to its initial expanded position shown in FIG. 12.

*First and second flat slot surfaces 424, 426 include axially inner ends 440 and spaced-apart axially outer ends 442 as shown in FIG. 10. During movement of the workpiece gripping surface 143 toward the workpiece 174, the axially inner ends 440 move apart from one another and the axially outer ends 442 move apart from one another.*

Figure 14:
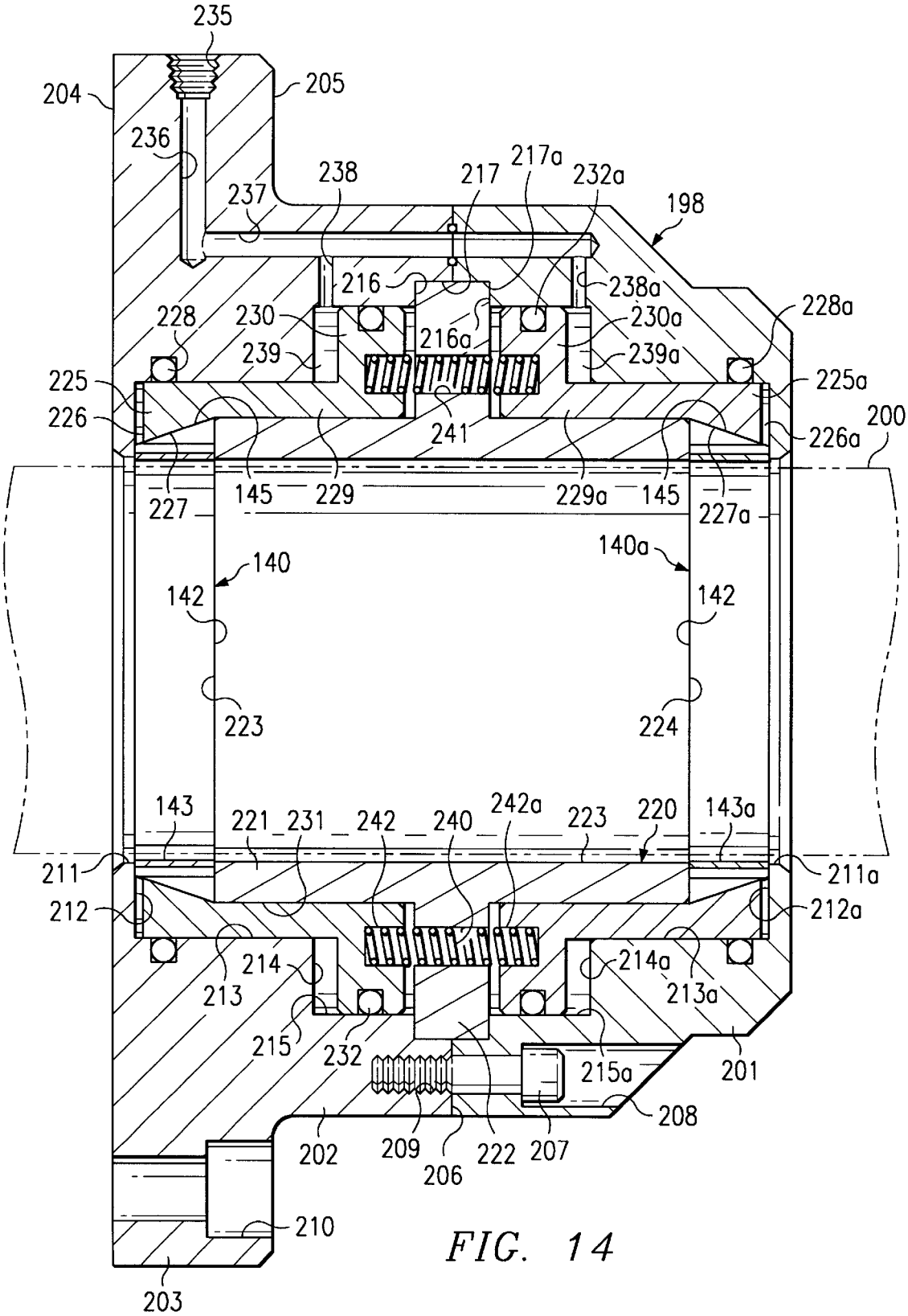
FIG. 14 is a longitudinal section view of a workpiece chuck, showing a pair of independently operable dual action collets of the type illustrated in FIGS. 9 and 10, and showing the collets in a position partially contracted inward for an external gripping engagement with the periphery of a cylindrical workpiece, and wherein each of the collets has a separate ram system, with compression spring return means.

FIG. 14 is a longitudinal section view of a fluid power operated workpiece chuck, generally indicated by the numeral 198, and showing a pair of independently operable dual action collets of the type illustrated in FIGS. 9 and 10, in positions partially contracted inward for an external gripping engagement with the periphery of a cylindrical workpiece 200. Each of the collets has a separate actuation or ram system, with compression spring return means. The chuck 198 comprises an annular front chuck body portion 201 and an annular rear chuck body portion 202. The cylindrical rear chuck body portion 202 is provided with an integral annular flange 203 which has a rear surface 204 and a front surface 205. The annular or cylindrical front and rear chuck body portions 201 and 202 are secured together along a parting line 206 by a plurality of suitable bolts 207 which are mounted in bolt holes 208 in the front chuck body portion 201, and which have their threaded ends mounted in threaded bores 209 in the rear chuck body portion 202. The annular chuck body flange 203 is adapted to be mounted to a rotatable spindle in a machine, such as a lathe, by a plurality of suitable bolts mounted through mounting bolt holes designated by the numeral 210.

The chuck body rear portion 202 has formed therethrough, from the rear end thereof, a four stepped axial bore comprising a first bore portion 211 which commences at the rear surface 204 of the annular flange 203 and extends inward longitudinally to a meeting point with a radially, outwardly extended transverse shoulder or wall 212. An enlarged diameter second bore portion 213 commences at the outer end of the shoulder or wall 212 and extends inward longitudinally to a junction point with a radially, outwardly extended transverse shoulder or wall 214. A further enlarged diameter third bore portion 215 extends inward longitudinally from the outer end of the shoulder or wall 214 to a transverse shoulder or wall 216. A still further enlarged diameter fourth bore portion 217 extends inward longitudinally from the outer end of the shoulder or wall 216 to the joining line 206 between the front and rear chuck body portions 201 and 202. The front chuck body portion 201 is provided with an identical four stepped bore structure commencing at the front end thereof and extending to the joining line 206, and the four bore portions thereof and shoulders and walls communicating therewith have been marked with the same reference numerals as used for the four bore portions in the rear chuck body portion 202, followed by the small letter "a".

A collet seat and retainer member, generally indicated by the the numeral 220, is mounted within the aforedescribed stepped bores in the front and rear chuck body portions 201 and 202. The cylindrical collet seat and retainer member 220 is provided with a tubular body 221 and an integral, central, annular mounting flange 222 which is seated in a peripheral internal recess formed by the fourth bore portions 217 and 217a, and the shoulders or walls 216 and 216a. The mounting flange 222 is held fixed in the last described position by the function of the bolts 207 securing the front chuck body portion 201 to the rear chuck body portion 202. The tubular body 221 of the collet seat and retainer member 220 has an internal periphery 223 which is of a larger diameter then the outer periphery of the workpiece 200, so that the workpiece 200 may be mounted therethrough. The annular ends 223 and 224 of the tubular body 221 comprise annular seats for the bottom ends 142 of a pair of external collets of the type shown in FIGS. 9 and 10. As shown in FIG. 14, the collet bodies 140 of the two external collets carried in the workpiece chuck 198 have their bottom ends 142 mounted on the seats 223 and 224 formed by the ends of the collet retainer member tubular body 221.

As shown in FIG. 14, a ring shaped actuator member 225 is mounted in the stepped bore portion 213 of the rear chuck body portion 202, with its outer periphery in slidable engagement with the wall of the second bore portion 213. The actuator member 225 is shown in FIG. 14 in a partially actuated position. However, when the workpiece chuck 198 is in an initial or inoperative position the outer periphery of the actuator member 225 has its outer end 226 seated against the bore wall 212. The inner periphery 227 of the actuator member 225 is formed with a tapered surface which matches with and seats on the conical tapered outer periphery 145 of the adjacently positioned external collet body 140. An O-ring seal 228 is mounted in a groove in the wall of the second bore portion 213 and it sealingly engages the outer cylindrical periphery of the actuator member 225.

The actuator member 225 is integrally connected at its inner end to an annular piston rod 229, which in turn is integrally connected at its inner end to an annular fluid operated piston 230. The annular piston rod 229 has its inner periphery slidably mounted on the outer periphery 231 of the tubular body 221 of the collet seat and retainer member 220.

The annular piston 230 is mounted in an annular piston chamber bounded by an outer periphery 231 of the tubular body 221, the side wall 214, the bore 215, and the adjacent side wall of the mounting flange 222 for the cylindrical retainer member 220. An O-ring seal 232 is operatively mounted in a groove formed around the outer periphery of the annular piston 230 and it sealingly engages the stepped bore third portion 215. An identical actuator member 225a and associated annular fluid operated piston 230a is mounted in the chuck body front portion 201, and the parts thereof have been marked with similar reference numerals followed by the small letter "a".

The numeral 235 designates an inlet port, for pressurized air or pressurized hydraulic fluid, and it communicates with a transverse passage 236 which in turn communicates with an axial passage 237 that extends through both of the front and rear chuck body portions 201 and 202. The axial passage 237 communicates with two transverse passages 238 and 238a in the front and rear chuck body portions 201 and 202, respectively, which in turn are each connected to an annular fluid pressure cavity, indicated as cavities 239 and 239a, in the front and rear chuck body portions 201 and 202, respectively. The annular pistons 230 and 230a, together with the integral cylindrical piston rods 229 and 229a, and integral actuator members 225 and 225a, are returned to their initial positions by a plurality of annularly disposed compression bore 241 formed through the mounting flange 222, and which have their ends seated in the bores 242 and 242a in the pistons 230 and 230a, respectively.

In use, the inlet port 235 would be connected to a suitable source of pressurized fluid, such as pressurized air or pressurized hydraulic fluid. As shown in FIG. 14, pressurized fluid has been admitted to the fluid operated chuck 198, to move the actuator members 225 and 225a inwardly a slight distance, to partially contract the collet bodies 140. The inner peripheries 143 of the two collet bodies 140 are shown in positions adjacent the outer periphery of the workpiece 200 but not in gripping engagement therewith. Further pressurized fluid admitted into the inlet port 235 would flow through the passages 236, 237, 238 and 238a into the pressure cavities 239 and 239a. The pistons 230 and 230a would then be further moved toward each other to move the two actuator members 225 and 225a inwardly and cam the collet bodies 140 into a further radial and peripheral contraction movement to move each of the collet inner peripheries 143 into a gripping engagement with the external surface of the workpiece 200. The actuator members 225 and 225a function in the same manner as described hereinbefore under the discussion of the fluid operated workpiece chuck 153.

Figure 15:
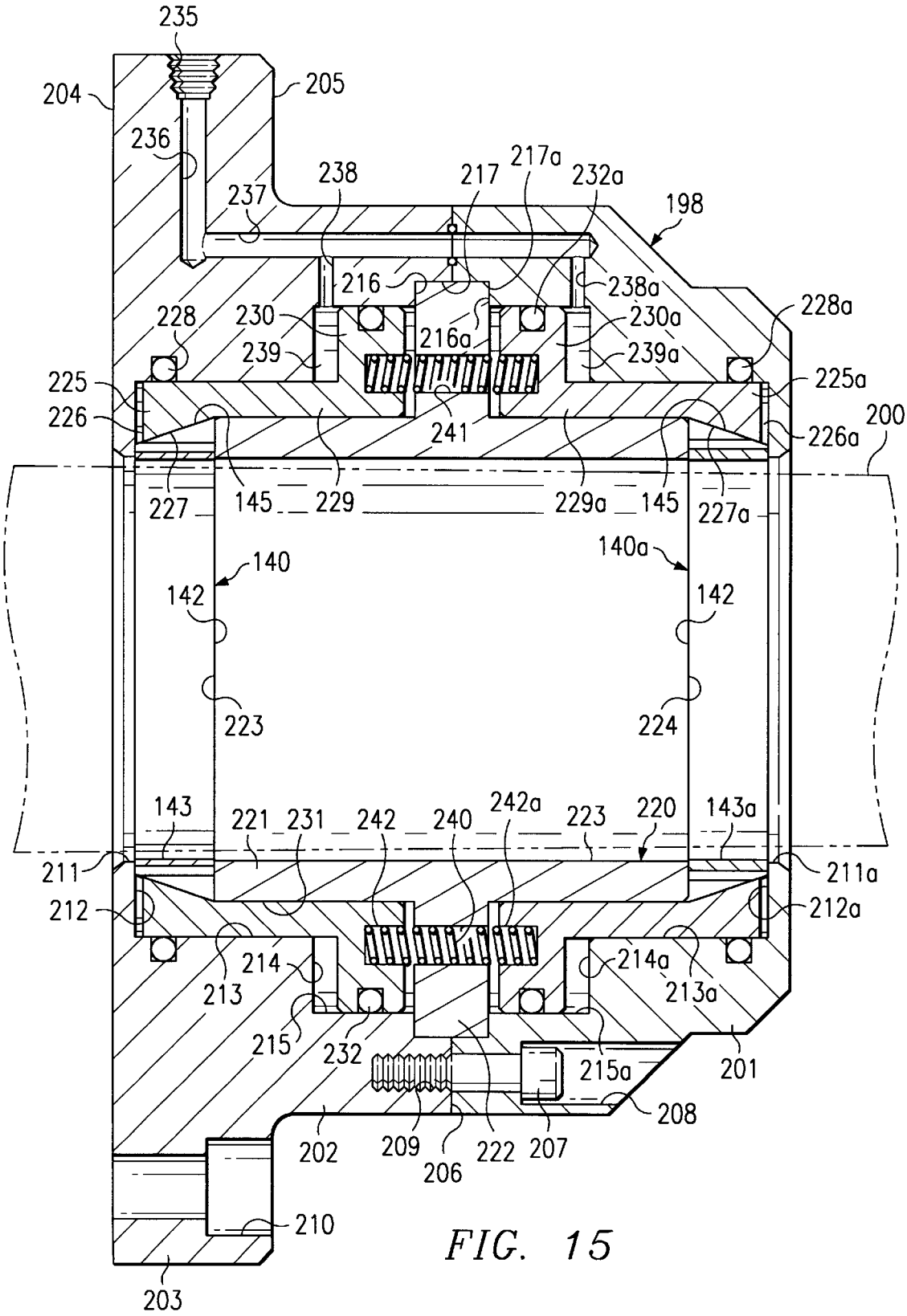
FIG. 15 is a longitudinal section view of a workpiece chuck provided with a pair of independently operable dual action collets of the type illustrated in FIGS. 9 and 10, and showing the collets in a position partially contracted inward, wherein the inner periphery of each of the collets is ground to a different taper, for mating with and gripping an external surface of a workpiece having a longitudinally tapered periphery.

FIG. 15 is a longitudinal section view or a workpiece chuck 198 which is identical to the workpiece chuck 198 shown in FIG. 14. The parts of the workpiece chuck 198 in FIG. 15 have been marked with the same reference numerals as used in the description of the workpiece chuck 198 in FIG. 14, however, the workpiece has been designated by the numeral 200a and the right collet body, as viewed in FIG. 15, has been designated by the numeral 140a. The workpiece chuck 198 shown in FIG. 15 employs the same pair of independent and operable dual action internal collets, as shown in FIG. 14 but the inner periphery 143a of the right collet body 140a is ground to a different taper, then the inner periphery 143 of the left collet body 140, for mating with and gripping an external surface of a workpiece 200a that has a longitudinally tapered periphery. The workpiece chuck 198 shown in FIG. 15 is operated in the same manner as explained hereinbefore for the operation of the workpiece chuck 198 shown in FIG. 14.

Figure 16:
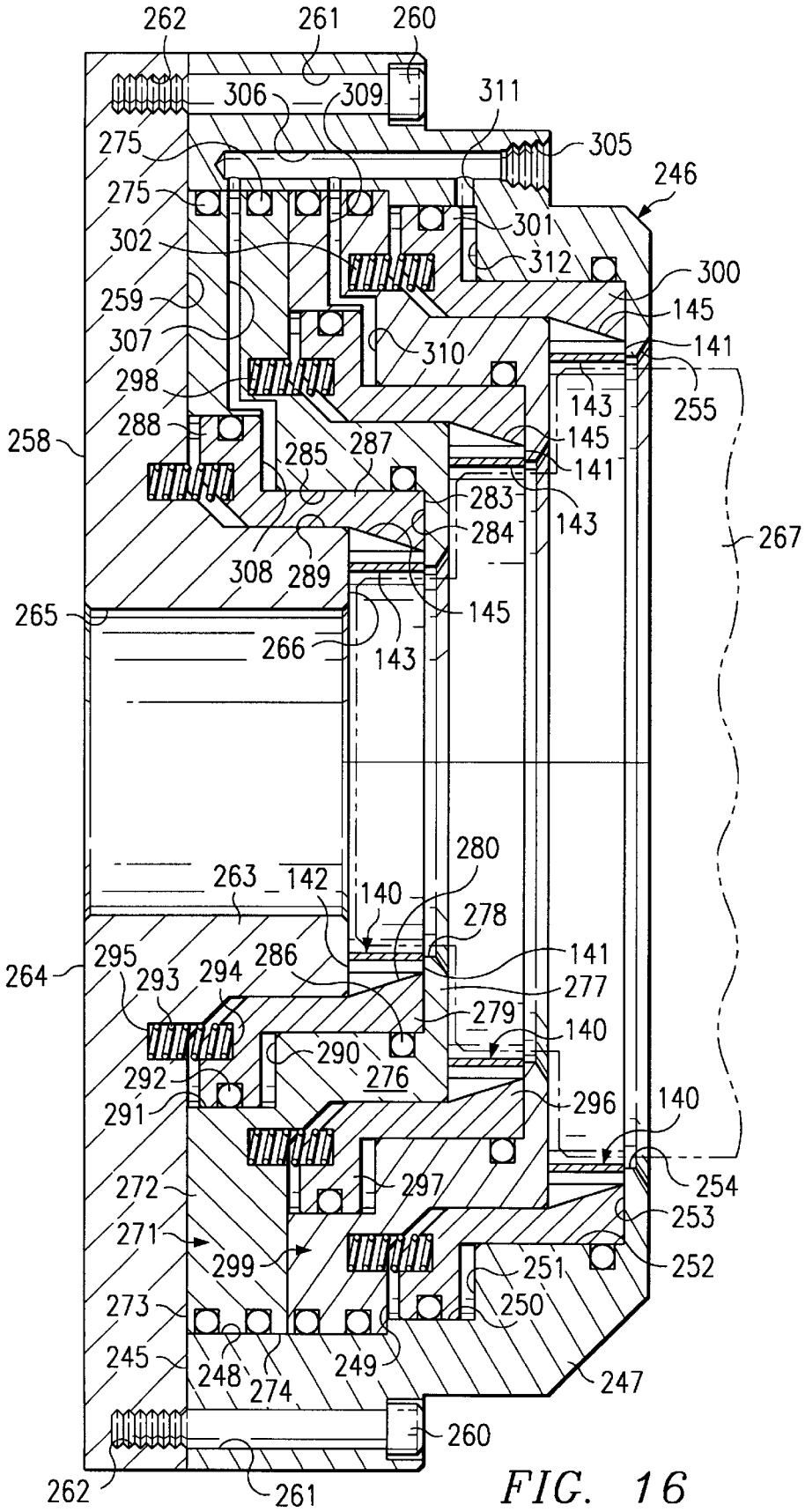
FIG. 16 is a longitudinal section view of a multiple diameter workpiece chuck provided with a plurality of multiple action external collets, of the type illustrated in FIGS. 9 and 10, for gripping engagement with the periphery of a stepped diameter workpiece and wherein the external collets are actuated independently to provide positive squaring of the workpiece in the chuck, and compensate for workpiece diameter variations, and showing the external collets in released positions.

FIG. 16 is a longitudinal section view of a fluid power operated workpiece chuck, generally indicated by the numeral 246, and provided with a plurality of multiple action external collets, of the type illustrated in FIGS. 9 and 10, for gripping engagement with the periphery of a stepped diameter workpiece, and wherein the external collets are actuated independently to provide positive squaring of the workpiece in the chuck, and compensate for workpiece diameter variations, and showing the external collet bodies in released positions before being contracted toward the periphery of the stepped diameter workpiece for an external gripping engagement therewith.

The chuck 246 comprises a cylindrical chuck body 247. The chuck body 247 has formed therethrough a four stepped axial bore comprising a first longitudinal bore portion 248 that extends into the chuck body 247 from the rear end 245 thereof and terminates at a transverse shoulder or wall 249. The first bore portion 248 communicates at its inner end with a reduced diameter second bore portion 250 that extends from the radial inner end of the transverse shoulder or wall 249 longitudinally toward the front of the chuck body 247 and terminates at a transverse shoulder or wall 251. The transverse shoulder or wall 251 terminates at its radial inner end with a further reduced diameter axial third bore portion 252 which extends axially forward and terminates at a transverse shoulder or wall 253. The transverse shoulder or wall 253 terminates at its radial inner end at a fourth axial bore portion 254 which is provided on its outer periphery with a chamfered annular edge 255 that communicates with the exterior of the chuck body 247.

An annular workpiece stop or seat, and collet retainer member, generally indicated by the numeral 258 is releasably mounted with its inner annular face 259 against the rear end 245 of the chuck body 247. The workpiece stop or seat, and collet retainer member 258 is releasably secured to the chuck body 247 by a plurality of suitable bolts 260 mounted in a plurality of annularly disposed bolts holes 261 and extended into threaded engagement with a plurality of threaded holes 262 in the work stop or seat, and collet retainer member 258. The workpiece chuck 246 is adapted to be mounted on a rotatable spindle in the machine, such as a lathe, by any suitable structure, such as suitable mounting bolts extended through the chuck body 247 and through the workpiece stop or seat, and collet retainer member 258 and into said rotatable spindle in a machine.

The workpiece stop or seat, and collet retainer member 258 includes an integral, tubular, axially disposed member 263 which extends axially forward from its rear wall surface 264, and axially forward into the four stepped bore in the chuck body 247, and it is provided with an axial bore 265 that terminates at a transverse annular front end 266 that functions as a stop or seat for the stepped diameter end of a workpiece 267.

The transverse front end 266 of the tubular member 263 functions as a seat or retainer for the lower end 142 of a first external collet body 140 of the external collet type illustrated in FIGS. 9 and 10.

As shown in FIG. 16, the chuck 246 includes a first separately formed annular internal chuck support member, generally indicated the numeral 271. The internal chuck support member 271 includes an annular base or first portion 272 which has an annular rear end face seated against the inner annular face 259 of the annular rear mounting plate 258. The chuck support member annular base portion 272 is provided an outer annular periphery 274 which is seated in the rearward portion of the first bore portion 248 in the chuck body 247. A pair of O-ring seals 275 are operatively mounted in a pair of longitudinally spaced apart grooves formed in the outer periphery 274 of the base portion 272 of the chuck support member and they sealingly engage the first bore portion 248. The chuck support member 271 includes an integral, intermediate second portion 276 which is offset radially and longitudinally from the base or first portion 272. The chuck support member 271 further includes an integral third portion 277 which has its outer end integrally connected to the intermediate chuck support member portion 276 and the outer end thereof terminating in an axial bore 278.

A ring shaped first collet actuator member 279 is mounted between the inner peripheral surface 285 of the integral second portion 276 of the intermediate chuck support member 271 with its outer axial end 283 in seating engagement against the inner or rear surface 284 of the integral third portion 277 of the intermediate chuck support member 271. The inner periphery 280 of the actuator member 279 is formed with a tapered periphery which mates with and seats on the conical tapered outer periphery 145 of an inner or first external collet body 140. An O-ring seal 286 is mounted in a groove in the inner periphery 285 of the second portion 276 of the intermediate chuck support member 271 and it sealingly engages the outer cylindrical periphery of the actuator member 279.

The actuator member 279 is integrally connected at its outer to an annular piston rod 287 which in turn is integrally connected at its outer end to an annular fluid operated piston 288. The annular piston rod 287 is slidably mounted between the inner periphery 285 of the second portion 276 of the intermediate chuck support member 271 and the outer periphery 289 of the tubular member 263. The annular piston 288 is mounted in an annular piston chamber bounded by the inner periphery 291 of the annular base portion 272 of the intermediate chuck support member 271, the rear surface 290 of the second portion 276 of the intermediate chuck support member 271, and the inner surface 259 of the annular rear mounting plate 258. An O-ring 292 is operatively mounted in a groove formed around the outer periphery of the annular piston 288 and it sealingly engages the inner peripheral surface 291 of the annular base portion 272 of the intermediate chuck support member 271.

The first collet annular actuator member 279 is moved to the inoperative or initial position shown in FIG. 16, to a position against the inner surface 284 of the integral third portion of the intermediate chuck support member 271, by a plurality of annually disposed compression return springs 293 which have one of the ends thereof seated in a suitable bore 294 in the annular fluid operated piston 288 and the other end thereof seated in a suitable bore 295 formed in the inner surface or face 259 of the annular rear mounting plate 258.

As shown in FIG. 16, a second annular actuator member 296, of a larger diameter than the first described actuator member 279, is telescopically seated around the second portion 276 of the intermediate chuck support member 271. The second annular actuator member 296 is provided with an annular fluid operated piston 297, which is constructed the same as the fluid operated piston 288, and is provided with a plurality of compression return springs 298 for moving the second annular actuator member 296 to its inoperative or initial position shown in FIG. 16. As shown in FIG. 16, the fluid power operated chuck 246 is further provided with a second internal intermediate annular chuck support member, generally indicated by the numeral 299, which is formed similar to the first internal intermediate annular chuck support member 271. The second internal intermediate annular chuck support member 299 is telescopically mounted around the second annular actuator member 296, and it functions to support the second actuator member 296 in a manner similar to the support provided by the first internal intermediate annular chuck support member 271 for the first described actuator member 279. A third annular actuator member 300 is operatively mounted around the second internal intermediate annular chuck support member 299 in a position therebetween the support member 299 and the second and third bore portions 250 and 252, respectively, in the chuck body 247. The third annular actuator member 300 is of a larger diameter than the second described annular actuator member 296, and it is provided with an annular fluid operated piston 301 which is constructed and functions in the same manner as the previously described first and second annular fluid operated piston 288 and 297. The third annular actuator member 300 is moved to an initial or inoperative position, as shown in FIG. 16 by a plurality of suitable compression return springs 302.

The numeral 305, in FIG. 16, designates an inlet port for pressurized air or pressurized hydraulic fluid and it communicates with a longitudinal passage 306 which in turn communicates with a transverse passage 307 that is connected to an annular fluid pressure cavity 308. The longitudinal passage 306 is also connected to a transverse passage 309 which in turn is connected to a second annular fluid pressure pressure cavity 310. The longitudinal passage 306 is further connected to a transverse passage 311 which is connected to a third annular fluid pressure cavity 312.

In use, the inlet port 305 would be connected to a suitable source of pressurized fluid, such as pressurized air or pressurized hydraulic fluid. The fluid power operated chuck 246 is shown in FIG. 16 in an initial or inoperative position with the three collet bodies 140 in a retracted or expanded position prior to being contracted inward to the stepped diameter end of the workpiece 267. The workpiece 267 is shown with a first diameter outer end positioned in the first or inner most collet body 140, and with its axial end in seating engagement against the workpiece stop or seat 266. The second diameter intermediate stepped end portion of the workpiece 267 is seated within the second or middle positioned collet body 140. The third diameter adjacent end of the annular periphery of the workpiece 267 is seated in the third or outer most collet body 140.

When pressurized fluid is admitted into the inlet port 305, the three fluid operated pistons 288, 297 and 301 are moved rearwardly, or to the left as viewed in FIG. 16, to create a rearwardly directed pull or ram force on the three actuator members 279, 296 and 300, and the three collet bodies 140 are contracted independently to give the positive squaring and compensating gripping action on the workpiece 267, which compensates for workpiece size variations. When the fluid pressure is released or relieved the compression return spring 293, 298 and 302 move the actuator members 279, 296 and 300 forward, or to the right as viewed in FIG. 16, to their initial and inoperative positions.

Figure 17:
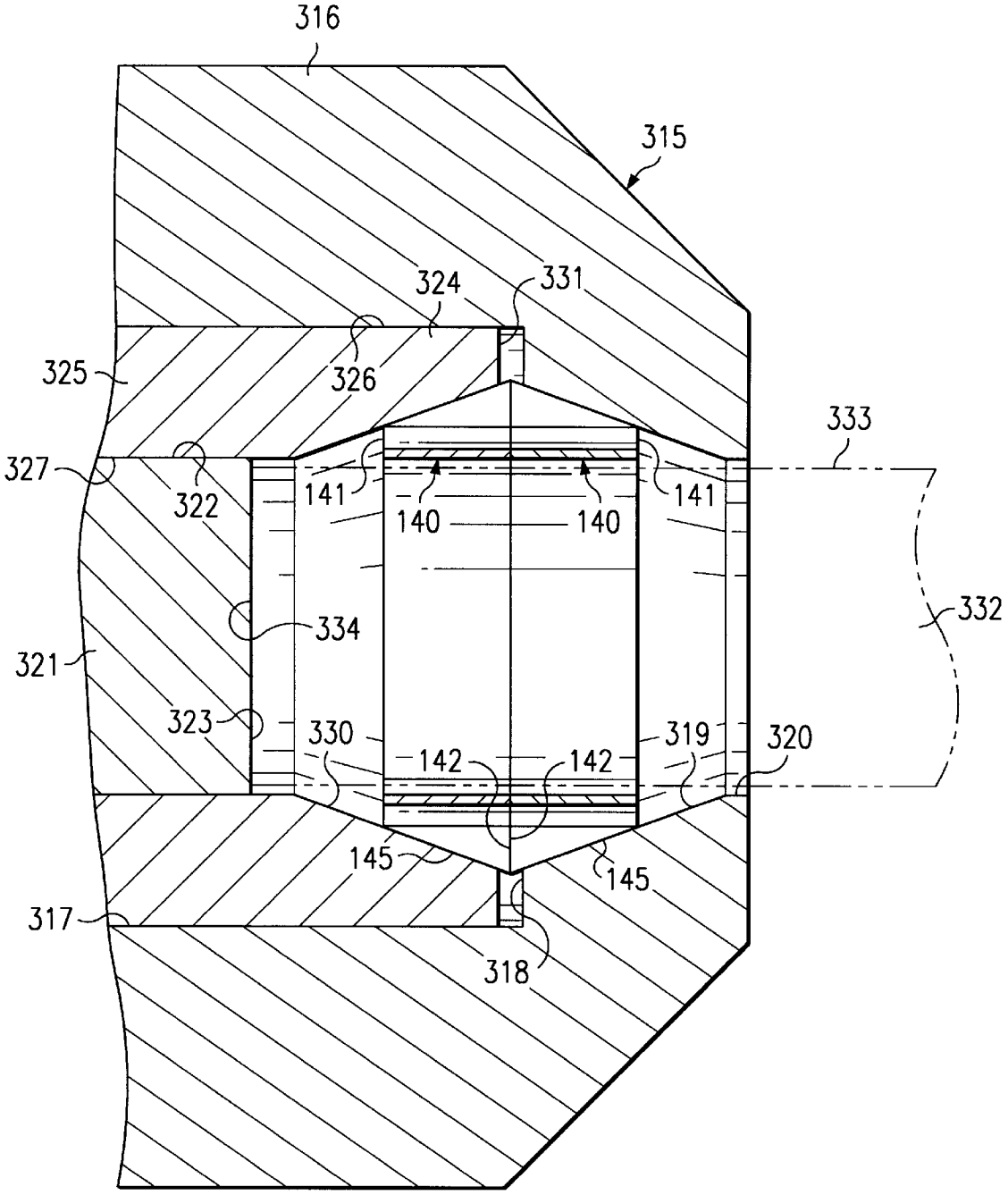
FIG. 17 is a fragmentary, longitudinal section view of a workpiece chuck provided with a pair of dual action external collets, of the type illustrated in FIGS. 9 and 10, and the external collets are mounted with their bottoms adjacent each other, and a ram contracts the external collets inwardly, to provide a positive squaring of a workpiece in the chuck, and to move the external collets into an external gripping engagement with the periphery of a cylindrical workpiece.

FIG. 17 is a fragmentary, longitudinal section view of the front end of a power operated workpiece chuck, generally indicated by the numeral 315. The numeral 316 designates an annular chuck body which has formed therein, from the rear end thereof, an axial bore 317 which terminates at its front end at a transverse shoulder or wall 318. The transverse shoulder or wall 318 extends transversely inward and terminates at its radial inner end with the inner end of a conical or tapered bore 319 that converges toward the front end of the annular chuck body 316. The front end of the tapered bore 319 terminates at the inner end of a reduced diameter axial bore 320 which opens to the exterior of the chuck body 316. The numeral 321 designates a cylindrical solid rod which is axially disposed in the chuck body axial bore 317 and which has a cylindrical outer periphery 322 and a transverse inner end 323 that functions as a workpiece stop or seat. The cylindrical rod 321 would be fixed to the chuck body 316 by any suitable means, as by a transverse flange attached to the rear end thereto and secured to the chuck body 316 by any suitable means, as illustrated In FIG. 12 by the attachment means for the flange 168 in FIG. 12.

An annular collet actuator member 324 is integrally formed on the inner or front end of an elongated annular, or tubular, power ram 325, which has an outer peripheral surface 326, and an inner cylindrical bore 327. The power ram 325 is telescopically mounted over the fixed cylindrical rod 321 in the chuck body axial bore 317.

As shown in FIG. 17, the inner end of the cylindrical bore 327 in the collet actuator power ram 325 terminates at the inner end of a tapered, diverging inner peripheral bore 330 in the annular collet actuator 324, which in turn terminates at the transverse front end 331 of the annular collet actuator 324. The tapered or conical bore 330 is a mirror image of the conical or tapered bore 319 in the chuck body 316. The power ram 325 would be operatively connected to a suitable power means, as for example a fluid power operated annular piston of the type illustrated in the previous Figures, as for example FIG. 12. The fluid power operated annular piston would be actuated forwardly or inwardly as viewed in FIG. 17, for an operative movement of the annular collet actuator 324, and returned rearwardly by suitable compression springs of the type illustrated in FIG. 12. The transverse front or inner end 331 of the annular collet actuator member 324 is of the same transverse or radial width as the radial width of the shoulder or transverse wall 318 in the chuck body 316.

The power operated chuck 315 is provided with a pair of dual action external collets of the type illustrated in FIGS. 9 and 10. As shown in FIG. 17, one of the collet bodies 140 of the pair of dual action external collets is mounted in the chuck body tapered bore 319, and the other collet body 140 is mounted in the tapered bore 330 in the annular collet actuator member 324. The collet bodies 140 are positioned with the bottom ends 142 thereof in an abutting engagement with each other.

In use, a cylindrical workpiece 332 would be mounted through the chuck body front bore 320 and moved to a position with the inner end 334 thereof in a seating position against the inner end 323 of the fixed cylindrical rod 321. The annular collet actuator power ram 325 is shown in FIG. 17 in a retracted or inactive position. The two collet bodies 140 are expanded into a seating engagement on the angled bores 319 and 330 due to the inherent outward springing action of the spring metal, from which the collet bodies 140 are made. When the collet actuator member annular power ram 325 is moved inwardly, or to the right as viewed in FIG. 17, the tapered surfaces 319 and 330, on the chuck body 316 and the collet actuator member 324, respectively, slidably engage the tapered outer peripheries 145 on the collet bodies 140, and independently cam the collet bodies 140 radially inward into a contracting gripping engagement with the external periphery 333 of the workpiece 332 and to provide a squaring action on the workpiece 332. When the power is removed from the power ram 325, it is moved backwardly, or to the left as viewed in FIG. 17, to an inoperative position, and the spring metal collet bodies 140 expand radially outward to the initial and inoperative position shown in FIG. 17.

Figure 18:
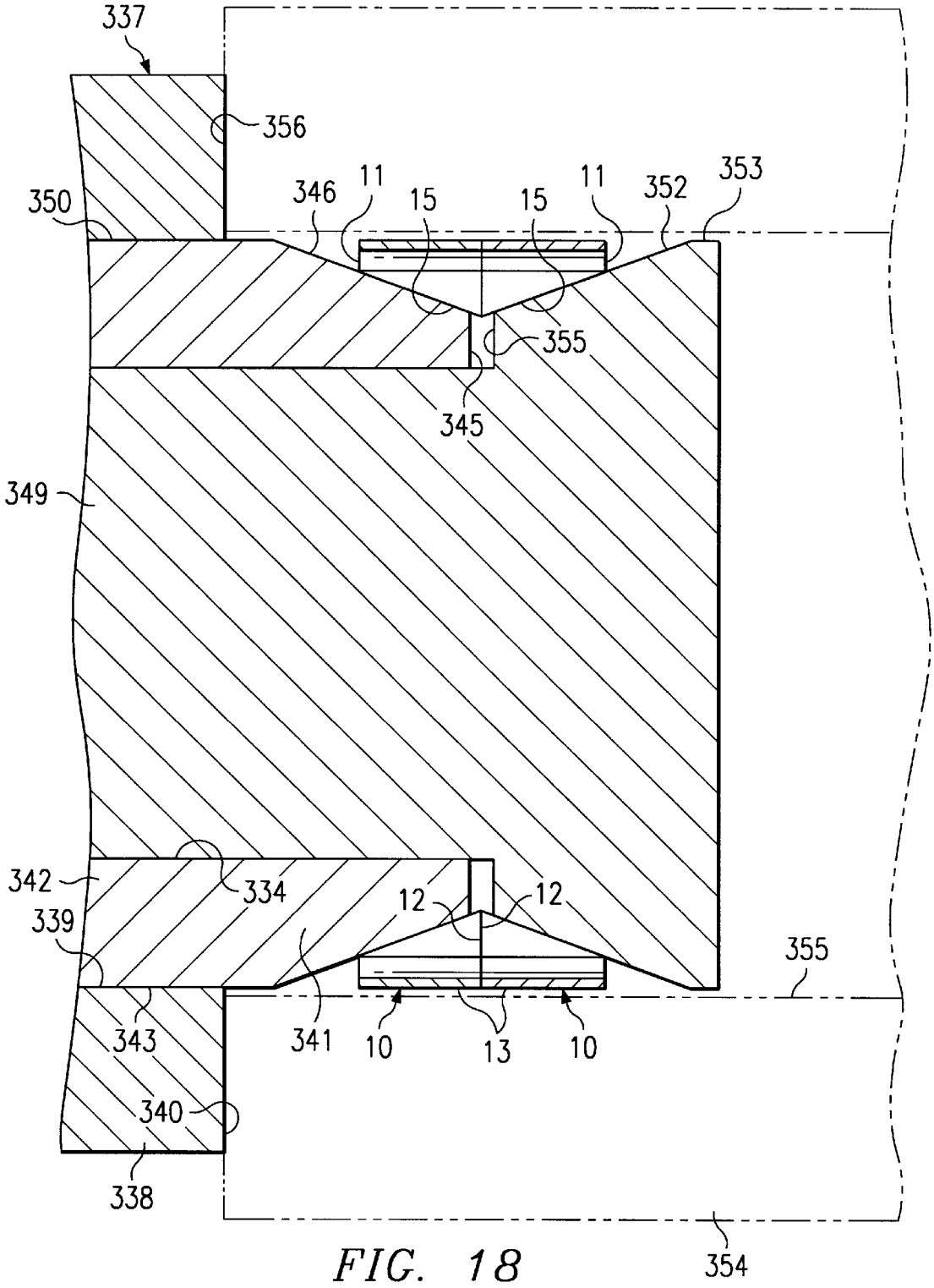
FIG. 18 is a fragmentary, longitudinal section view of a workpiece chuck provided with a pair of dual action internal collets, of the type illustrated in FIGS. 1 and 2, and the internal collets are mounted with their bottoms adjacent each other, and a ram expands the internal collets outwardly, to provide a positive squaring of a workpiece in the chuck, and to move the internal collets into an internal gripping engagement with a cylindrical bore in a workpiece.

FIG. 18 is a fragmentary, longitudinal section view of a power operated workpiece chuck, generally designated by the numeral 337, and provided with a pair of dual action internal collets of the type illustrated in FIGS. 1 and 2. The numeral 338 designates an annular chuck body which has formed therein, from the rear end thereof, an axial bore 339 which terminates at its front in an annular transverse shoulder or wall 340. An annular collet actuator member 341 is integrally formed on the inner or front end of an elongated annular, or tubular, power ram 342, which has an outer peripheral surface 343, and an inner cylindrical bore 344 which extends forwardly and terminates at a front end 345 that is also the front transverse end of the collet actuator member 341. The outer peripheral surface 343 of the power ram 342 terminates at the front end thereof in a tapered or conical periphery 346, which comprises the outer periphery of the collet actuator member 341, and terminates at the front end 345 of the collet actuator member 341.

The numeral 349 designates a cylindrical solid rod which is axially disposed in the power ram inner bore 344, and which has a cylindrical outer periphery 350 on which is slidably mounted the power ram 342. The cylindrical solid rod 349 would be fixed to the chuck body 338 in the same manner as described hereinbefore for the cylindrical solid rod 321 of the workpiece chuck body 316. The outer cylindrical periphery 350 of the fixed cylindrical solid rod 349 terminates at its front end in a transverse wall or shoulder 351, and which terminates at its radial outer end with the rear end of a conical or tapered conical periphery 352 that diverges longitudinally forward and terminates at the inner end of a cylindrical periphery 353 on the front end of the fixed cylindrical solid rod 349. The outer peripheral tapered or conical periphery 346 on the collet actuator member 341 is a mirror image of the conical or tapered periphery 352 on the fixed cylindrical solid rod 349.

The power ram 342 would be operatively connected to a suitable power means, as a fluid power operated piston of the type illustrated in the previous Figures, as for example FIG. 12. The fluid power operated annular piston would be actuated forward or inwardly, as viewed in FIG. 18, for an operative movement of the annular collet actuator 341, and returned rearward by suitable compression springs of the type illustrated in FIG. 12. The transverse front or inner end 345 of the annular collet actuator member 341 is of the same transverse or radial width as the radial width of the shoulder or transverse wall 351 on the fixed solid cylindrical rod 349.

The power operated chuck 337 is provided with a pair of dual action internal collets of the type illustrated in FIGS. 1 and 2. The collet bodies 10 are positioned with the bottom ends 12 thereof in an abutting engagement with each other, and with the tapered periphery 346 in sliding engagement with one of the tapered cam surfaces 15 of one of the collet bodies 10, and the other tapered periphery 352 in sliding engagement with the tapered cam surface 15 on the other collet body 10.

In use, a tubular workpiece 354 would be mounted around the outer periphery 343 of the power ram 342 and the outer periphery 353 of the fixed solid cylindrical rod 349. The workpiece 354 has an internal cylindrical bore 355, and the end 356 thereof is moved to a seating position against the annular front end 340 of the chuck body 338. The annular collet actuator 341 is shown in FIG. 18 in a retracted or inactive position. The two collet bodies 10 are shown in contracted seating engagements on the tapered peripheries 346 and 352, on the collet actuator member 341 and the fixed rod 349, respectively. When the collet actuator member annular power ram 342 is moved inwardyly, or to the right as viewed in FIG. 18, the tapered surfaces 352 and 346, on the fixed solid rod 349 and the annular collet actuator member 341, respectively, slidably engage the tapered inner peripheries 15 on the collet bodies 10, and independently cam the collet bodies 10 radially outward into an expanding gripping engagement with the internal periphery 355 of the workpiece 354 and to provide a squaring action on the workpiece 354. When the power is removed from the power ram 342, it is moved backwardly, or to the left as viewed in FIG. 18, to an inoperative position and the spring metal collet bodies 10 will contract radially inward to the initial inoperative position shown in FIG. 18.

FIGS. 19, 20 and 21 disclose a one-piece circular external collet which is constructed the same as the external collet shown in FIGS. 9, 10 and 11, but wherein the collet is not provided with an internal split closure tang 150 as employed in the external collet shown in FIGS. 9, 10 and 11. The parts of the external collet shown in FIGS. 19, 20 and 21 which are the same as the parts of the external collet shown in FIGS. 9, 10 and 11 have been marked with the same reference numerals followed by the small letter "b". The external collet shown in FIGS. 19, 20 and 21 include a collet body 140b. FIG. 19 is a top view of the one-piece circular external collet body 140b. FIG. 20 is an elevation section view of the external collet body 140b illustrated in FIG. 19, taken along the line 20—20 thereof, and looking in the direction of the arrows FIG. 21 is a fragmentary, enlarged view of a portion of the external collet body 140b illustrated in FIG. 19, taken within the circle marked by the numeral "21" in FIG. 19, and showing the split 148b in the external collet body 140b, but which split is not provided with an integral split closure tang, such as the closure tang 150 shown in the collet body 140 in FIG. 11. The external collet body 140b shown in FIGS. 19, 20 and 21 is adapted to be used in workpiece chucks as shown in FIGS. 12 through 17, and it is constructed and arranged to function in the same manner as the external collet bodies 140 employed in the workpiece chucks shown in FIGS. 12 through 17.

Figure 22:
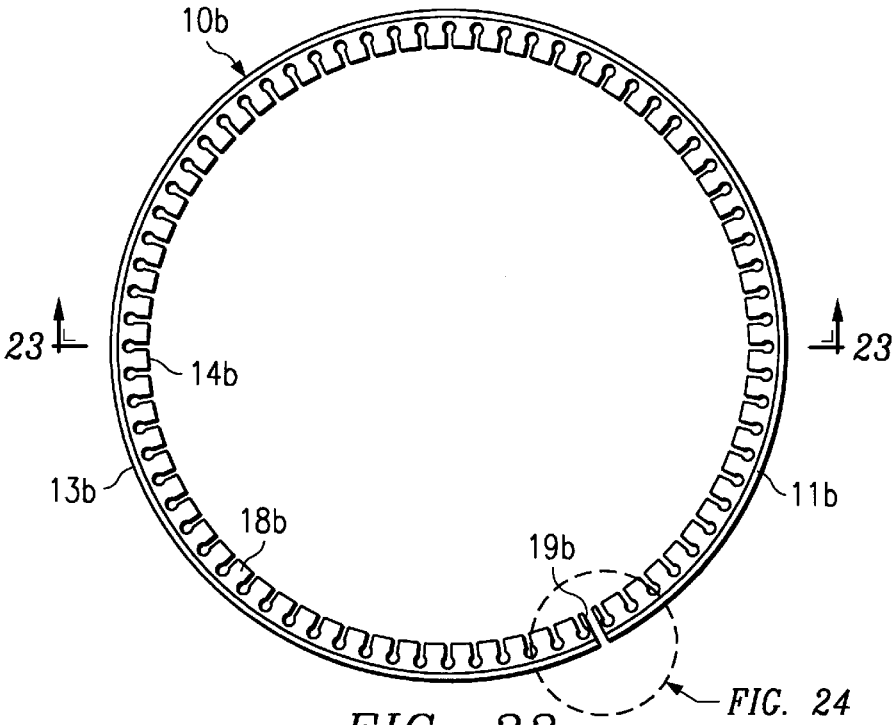
FIG. 22 is a top view of a one-piece circular internal collet which is constructed the same as the internal collet shown in FIGS. 1 and 2, but which is not provided with an integral split closure tang.
Figure 23:
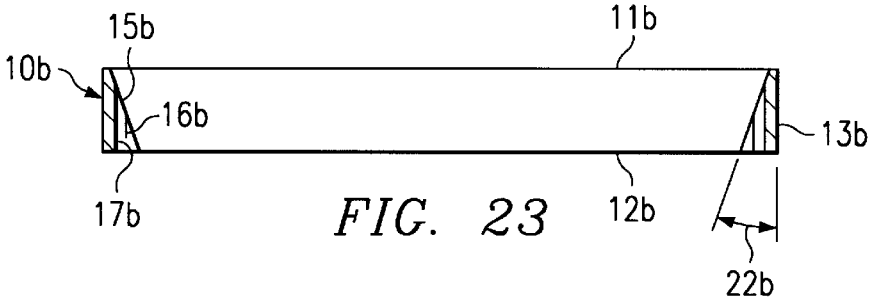
FIG. 23 is an elevation section view of the internal collet illustrated in FIG. 22, taken along the line 23—23 thereof, and looking in the direction of the arrows.
Figure 24:
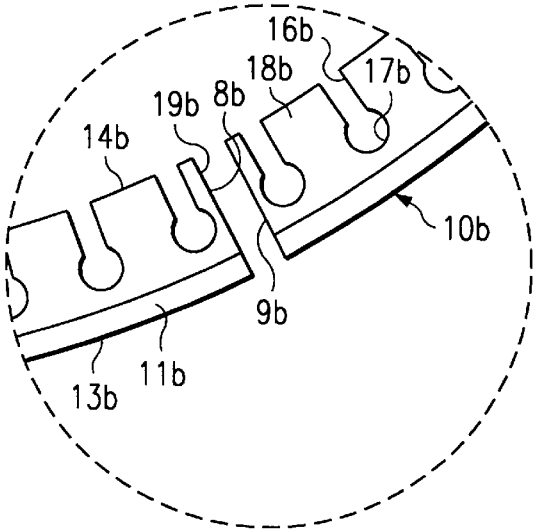
FIG. 24 is a fragmentary, enlarged view of a portion of the internal collet illustrated in FIG. 22, taken within the circle marked by the numeral "24" in FIG. 22, and showing the split in the collet body, but which is not provided with an integral split closure tang.

FIGS. 22, 23 and 24 disclose a one-piece circular internal collet which is constructed the same as the internal collet shown in FIGS. 1, 2 and 3, but wherein the collet is not provided with an external split closure tang 20 as employed in the internal collet shown in FIGS. 1, 2 and 3. The parts of the internal collet shown in FIGS. 22, 23 and 24 which are the same as the parts of the internal collet shown in FIGS. 1, 2 and 3 have been marked with the same reference numerals followed by the small letter "b". The internal collet shown in FIGS. 22, 23 and 24 includes a collet body 10b. FIG. 22 is a top view of the one-piece circular internal collet body 10b. FIG. 23 is an elevation section view of the internal collet body 10b illustrated in FIG. 22, taken along the line 23—23 thereof, and looking in the direction of the arrows. FIG. 24 is a fragmentary, enlarged view of a portion of the internal collet body 10b illustrated in FIG. 22, taken within the circle marked by the numeral 24 in FIG. 22, and showing the split [or opening] *space* 19b in the internal collet body 10b, but which split [or opening] *space* 19b is not provided with an integral split external closure tang, such as the closure tang 20 shown in the collet body 10 in FIG. 3. The internal collet body 10b shown in FIGS. 22, 23 and 24 is adapted for use in clean air work areas, and in workpiece chucks as shown in FIGS. 4 through 8, and it is constructed and arranged to function in the same manner as the internal collet bodies 10 employed in the workpiece chuck shown in FIGS. 4 through 8.

FIGS. 25, 26 and 27 disclose a one-piece circular external collet which is constructed the same as the external collet shown in FIGS. 9, 10 and 11, but wherein the collet not provided with an internal split closure tang 150 as is employed in the external collet shown in FIGS. 9, 10 and 11. The parts of the external collet shown in FIGS. 25, 26 and 27, which are the same as the parts of the external collet shown in FIGS. 9, 10 and 11, have been marked with the same reference numerals followed by the small letter "c". The external collet shown in FIGS. 25, 26 an 27 includes a collet body 140c. FIG. 25 is a top view of the one-piece circular external collet body 140c. FIG. 26 is an elevation section view of the external collet body 140c illustrated in FIG. 25, taken along the line 26—26 thereof, and looking in the direction of the arrows. FIG. 27 is a fragmentary, enlarged view of a portion of the external collet body 140c illustrated in FIG. 25, taken within the circle marked by the numeral 27 in FIG. 25, and showing the split [or opening] *space* 148c in the external collet body 140c, but which split [or opening] *space* 148c is not provided with an integral internal split closure tang, such as the closure tang 150 shown in the collet body 140 in FIG. 11.

As best seen in FIG. 27, a cylindrical rubber seal 357, made from a suitable elastomeric material, is positioned in the split [or opening] *space* 148c to prevent dirt from entering into the interior of the collet body 140c and contaminating the actuating surface of the external collet when the collet is used in a workpiece chuck in work areas having unclear air conditions. The external collet body 140c shown in FIGS. 25, 26 and 27 is adapted to be used in workpiece chucks as shown in FIGS. 12 through 17, and it is constructed and arranged to function in the same manner as the external collet bodies 140 employed in the workpiece chucks shown in FIGS. 12 through 17.

FIGS. 28, 29 and 30 disclose a one-piece circular internal collet which is constructed the same as the internal collet shown in FIGS. 1, 2 and 3, but wherein the collet is not provided with an external split closure tang 20 as is employed on the internal collet shown in FIGS. 1, 2 and 3. The parts of the internal collet shown in FIGS. 28, 29 and 30, which are the same as the parts of the internal collet shown in FIGS. 1, 2 and 3, have been marked with the same reference numerals followed by the small letter "c". The internal collet shown in FIGS. 28, 29 and 30 includes a collet body 10c. FIG. 23 is a top view of the one-piece circular internal collet body 10c. FIG. 29 is an elevation section view of the internal collet body 10c illustrated in FIG. 28, taken along the line 29—29 thereof, and looking in the direction of the arrows. FIG. 30 is a fragmentary, enlarged view of a portion of the internal collet body 10c illustrated in FIG. 28, taken within the circle by the numeral 30 in FIG. 28, and showing a split [or opening] *space* 19c in the internal collet body 10c but which split [or opening] *space* 19c is not provided with an external integral split closure tang, such as the closure tang 20 shown in the collet body 10 in FIG. 3.

As best seen in FIG. 30 a cylindrical rubber seal 358, made from a suitable elastomeric material, is positioned in the split [or opening] *space* 19c to prevent dirt from passing from the exterior of the collet body 10c and contaminating the actuating surface of the internal collet when the collet is used in a workpiece chuck in work areas having unclean air conditions. The internal collet body 10c shown in FIGS. 28, 29 and 30 is adapted for use in work chucks as shown in FIGS. 4 through 8, and it is constructed and arranged to function in the same manner as the internal collet bodies 10 employed in the workpiece chucks shown in FIGS. 4 through 8.

Figure 31:
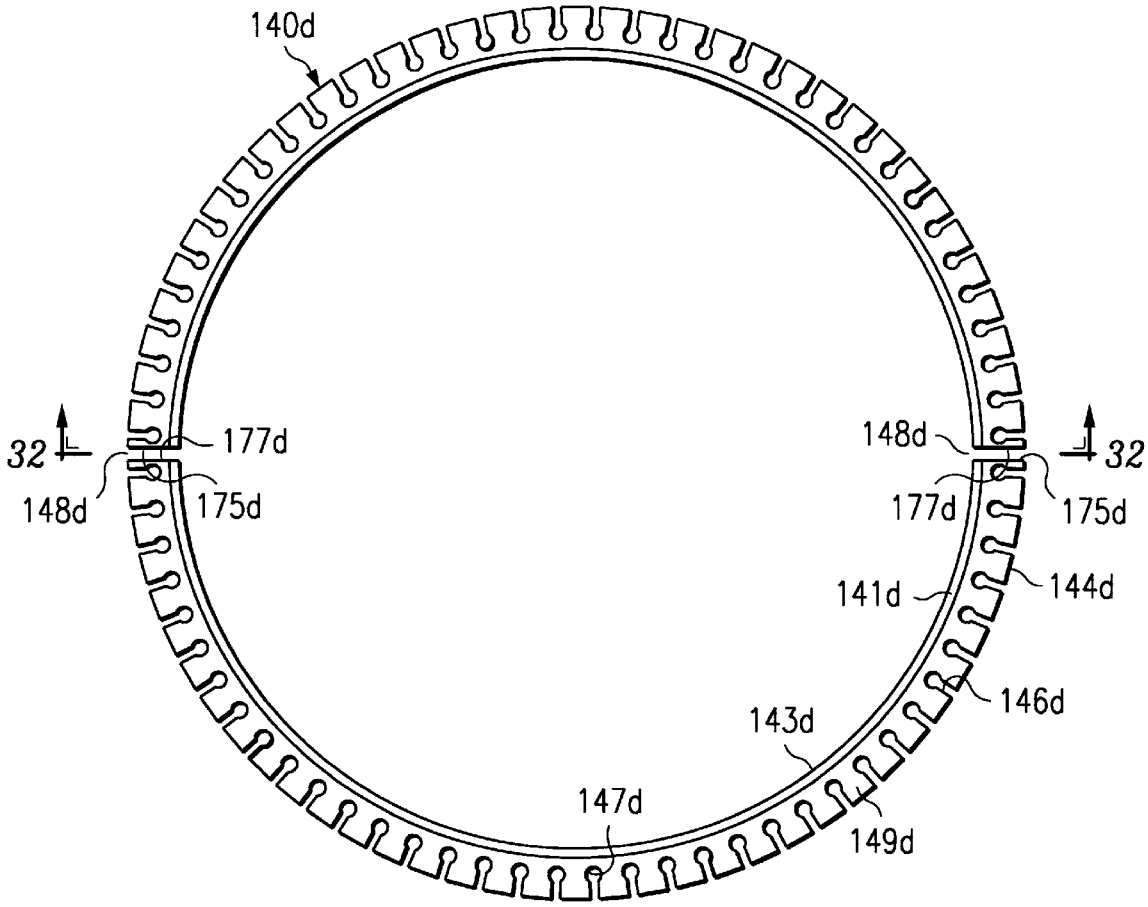
FIG. 31 is a top view of a two-piece circular external collet which is constructed the same as the external collet shown in FIGS. 9 and 10, but which is provided with a pair of splits in the external collet body which are disposed diametrically opposite each other, and which splits are not provided with integral split closure tangs.
Figure 32:
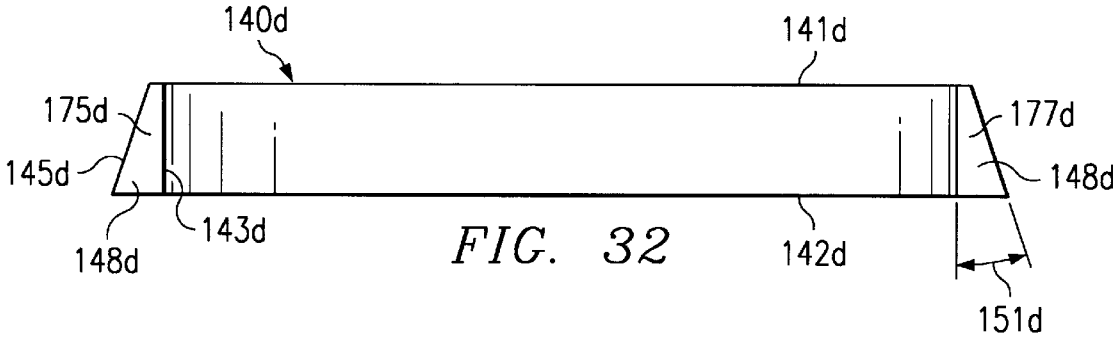
FIG. 32 is an elevation section view of the external collet illustrated in FIG. 31, taken along the line 32—32 thereof, and looking in the direction of the arrows.

FIGS. 31 and 32 disclose a multiple-piece circular external collet which is constructed the same as the external collet shown in FIGS. 9, 10 and 11. The parts of the external collet shown in FIGS. 31 and 32, which are the same as the parts of the external collet shown in FIGS. 9, 10 and 11, have been marked with the same reference numerals followed by the small letter "d". The external collet shown in FIGS. 31 and 32 includes a collet body 140d. FIG. 31 is a top view of the multiple-piece circular external collet body 140d. FIG. 32 is an elevation section view of the external collet body 140d illustrated in FIG. 31, taken along the line 32—32 thereof, and looking in the direction of the arrows.

The collet body 140d is provided with a pair of diametrically opposite disposed [splits or openings] *split spaces* 148d. The [splits or openings] *split spaces* 148d are not provided with an internal, integral split closure tangs such as the closure tangs 150 shown on the collet body 140 in FIG. 11. The provision of a pair of [splits or openings] *split spaces*148d provides an external collet which is constructed to allow additional flexibility for greater contraction movement of the collet when the collet is moved into a gripping engagement with the outer surface of a cylindrical workpiece. The provision of more than two [splits or openings] *split spaces* 148d would provide even more flexibility and contraction movement to a collet body 140d.

The external collet body 140d shown in FIGS. 31 and 32 is adapted to be used in workpiece chucks as shown in FIGS. 12 through 17, and it is constructed and arranged to function in the same manner as the external collet bodies 140 employed in the workpiece chucks shown in FIGS. 12 through 17.

Figure 33:
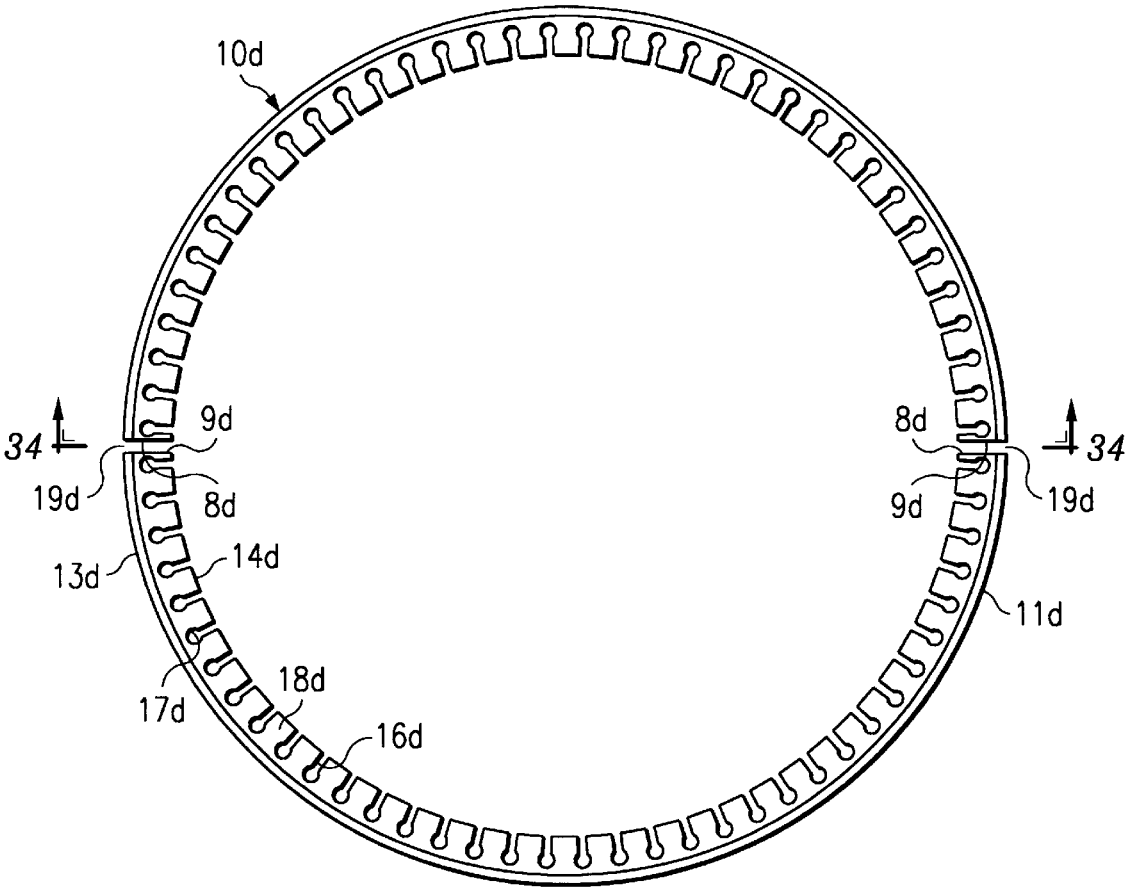
FIG. 33 is a top plan view of a two-piece circular internal collet which is constructed the same as the internal collet shown in FIGS. 1 and 2, but which is provided with a pair of splits in the internal collet body which are disposed diametrically opposite each other, and which splits are not provided with an integral split closure tang.
Figure 34:
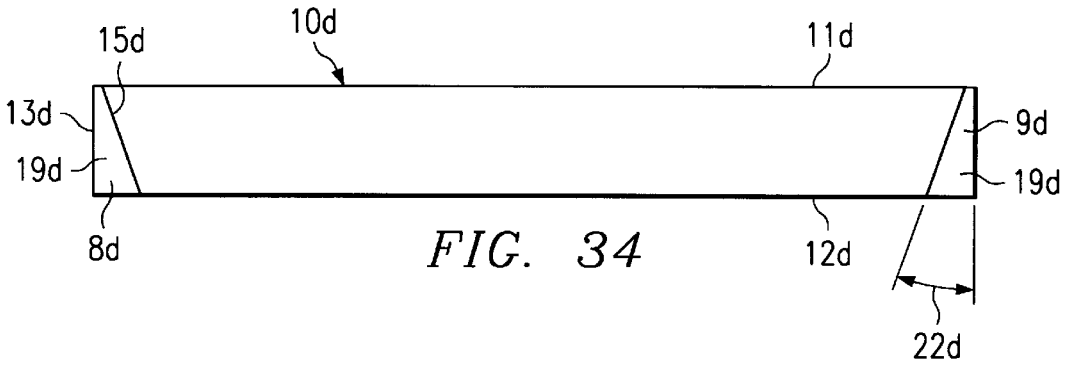
FIG. 34 is an elevation section view of the internal collet illustrated in FIG. 33, taken along the line 34—34 thereof, and looking in the direction of the arrows.

FIGS. 33 and 34 disclose a multiple-piece circular internal collet which is constructed the same as the internal collet shown in FIGS. 1, 2 and 3. The parts of the internal collet shown in FIGS. 33 and 34, which are the same as the internal collets shown in FIGS. 1, 2 and 3, have been marked with the same reference numerals followed by the small letter "d". The internal collet shown in FIGS. 33 and 34 includes a collet body 10d. FIG. 33 is a top view of the multiple-piece circular internal collet body 10d. FIG. 34 is an elevation section view of the internal collet body 10d illustrated in FIG. 33, taken along the line 34—34 thereof, and looking in the direction of the arrows.

The collet body 10d is provided with a pair of diametrically opposite disposed [splits or openings] *split spaces* 19d. The [splits or openings] *split spaces* 19d are not provided with an external, integral split closure tang, such as the closure tang 20 shown on the collet body 10 in FIG. 3. The provision of a pair of [splits or openings] *split spaces* 19d provides an internal collet which is constructed to allow additional flexibility for greater expansion movement of the collet when the collet is moved into a gripping engagement with the inner surface of a cylindrical bore in a workpiece. The provision of more than two [splits or openings] *split spaces* 19d would provide even more flexibility and contraction movement to a collet body 10d.

The internal collet body 10d shown in FIGS. 33 and 34 is adapted to be used in workpiece chucks as shown in FIGS. 4 through 8, and it is constructed and arranged to function in the same manner as the internal collet bodies 10 employed in the workpiece chucks shown in FIGS. 4 through 8.

Figure 35:
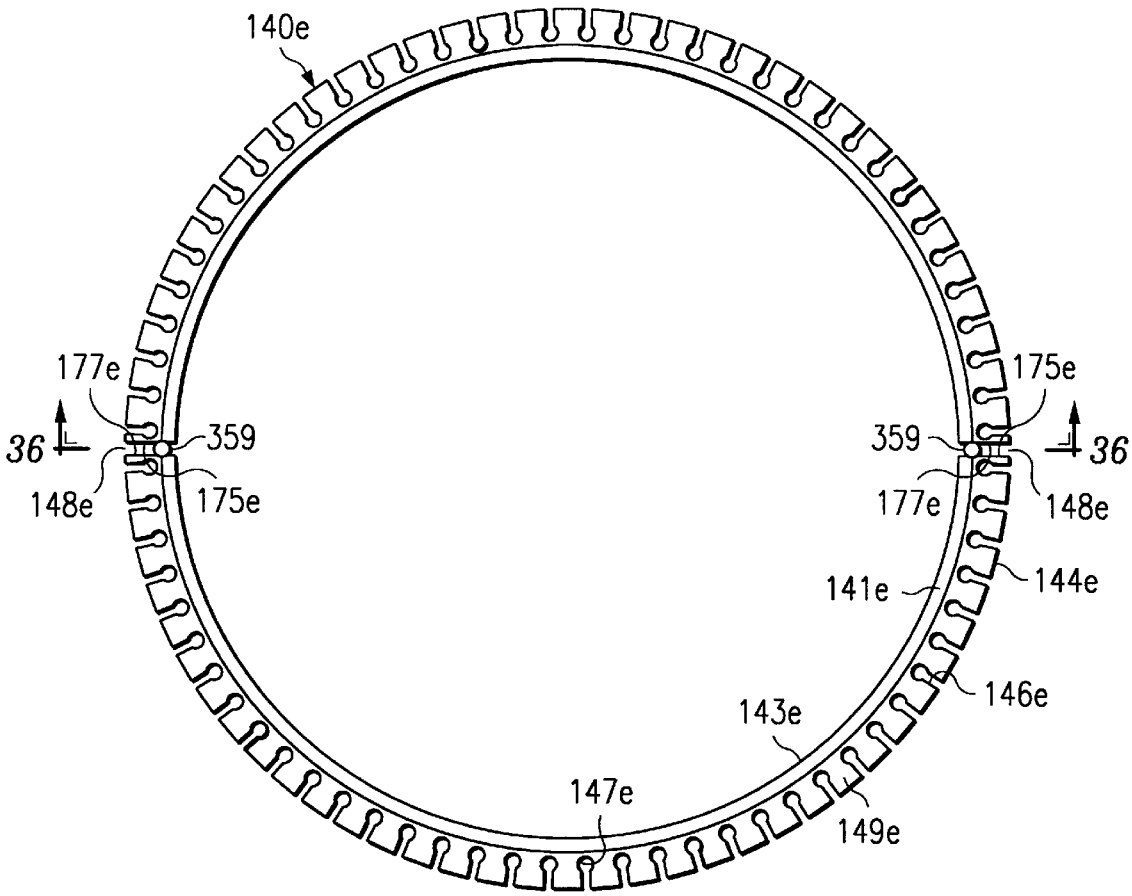
FIG. 35 is a top view of a two-piece circular external collet which is constructed the same as the external collet shown in FIGS. 9 and 10, but which is provided with a pair of splits in the external collet body which are disposed diametrically opposite each other, and in each of which splits is mounted a rubber seal to prevent dirt from passing through the splits into the external collet, and prevent contamination of the actuating surface of the external collet.
Figure 36:
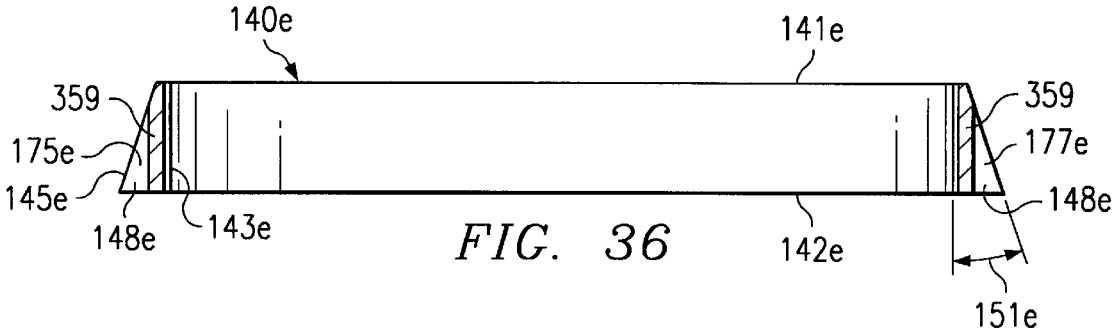
FIG. 36 is an elevation section view of the external collet illustrated in FIG. 35, taken along the line 36—36 thereof, and looking in the direction of the arrows.

FIGS. 35 and 36 disclose a multiple-piece circular external collet which is constructed the same as the external collet shown in FIGS. 9, 10 and 11. The parts of the external collet shown in FIGS. 35 and 36, which are the same as the parts of the external collet shown in FIGS. 9, 10 and 11, have been marked with the same reference numerals followed by the small letter "e". The external collet shown in FIGS. 35 and 36 includes a collet body 140e. FIG. 35 is a top view of the multiple-piece circular external collet body 140e. FIG. 36 is an elevation section view of the external collet body 140e illustrated in FIG. 35, taken along the line 36—36 thereof, and looking in the direction of the arrows.

The collet body 140e is provided with a pair of diametrically opposite disposed [splits or openings] *split spaces* 148e. The [splits or openings] *split spaces* 148e are not provided with an internal integral split closure tang, such as the closure tang 150 shown on the collet body 140 in FIG. 11.

As shown in FIGS. 35 and 36, a cylindrical rubber seal 359, made from suitable elastomeric material, is positioned in each of the [splits or openings] *split spaces* 148e to prevent dirt from passing into the interior of the collet body 140e and contaminating the actuating surface of the external collet when the collet is used in a workpiece chuck in work areas having unclear air conditions. The external collet body 140e shown in FIGS. 35 and 36 is adapted to be used in workpiece chucks as shown in FIGS. 12 through 17, and it is constructed and arranged to function in the same manner as the external collet bodies 140 employed in the workpiece chucks shown in FIGS. 12 through 17.

Figure 37:
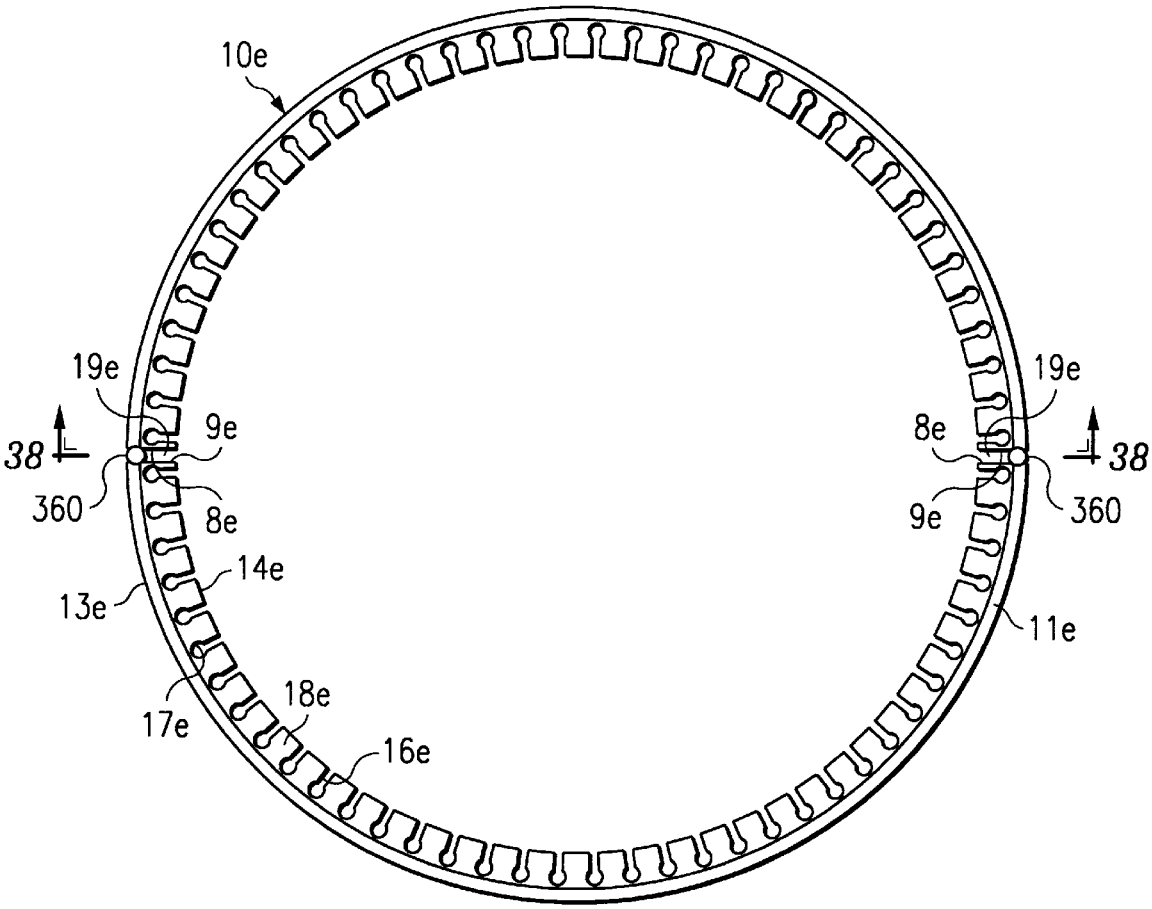
FIG. 37 is a top view of a two-piece circular internal collet which is constructed the same as the internal collet shown in FIGS. 1 and 2, but which is provided with a pair of splits in the internal collet body which are disposed diametrically opposite each other, and in each of which is positioned a rubber seal to prevent dirt from passing through the splits from the interior of the internal collet and contaminating the actuating surfaces of the collet body.
Figure 38:
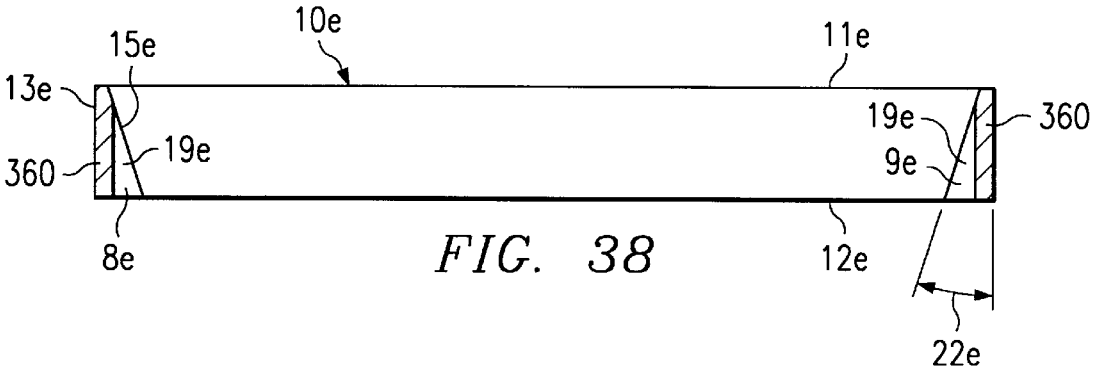
FIG. 38 is an elevation section view of the internal collet illustrated in FIG. 37, taken along the line 38—38 thereof, and looking in the direction of the arrows.

FIGS. 37 and 38 disclose a multiple-piece circular internal collet which is constructed the same as the internal collet shown in FIGS. 1, 2 and 3. The parts of the internal collet shown in FIGS. 37 and 38, which are the same as the parts of the internal collet shown in FIGS. 1, 2 and 3 have been marked with the same reference numerals followed by the small letter "e". The internal collet shown in FIGS. 37 and 38 includes a collet body 10e. FIG. 37 is a top view of the multiple-piece circular internal collet body 10e. FIG. 38 is an elevation section view of the internal collet body 10e illustrated in FIG. 37, taken along the line 38—38 thereof, and looking in the direction of the arrows.

The collet body 10e is provided with a pair of diametrically opposite disposed [splits or openings] *split spaces* 19e. The [splits or openings] *split spaces* 19e are not provided with an external integral split closure tang, such as the closure tang 20 shown on the collet body 10 in FIG. 3.

As shown in FIGS. 37 and 38, a cylindrical rubber seal 360, made from a suitable elastomeric material, is positioned in each of the [splits or openings] *split spaces* 19e to prevent dirt from passing from the interior of the collet body 10e and contaminating the acting surface of the internal collet when the collet is used in a workpiece chuck in work areas having unclean work conditions. The internal collet body 10e shown in FIG. 37 and 38 is adapted to be used in workpiece chucks as shown in FIGS. 4 through 8, and it is constructed and arranged to function in the same manner as the internal collet bodies 10 employed in the workpiece chucks shown in FIGS. 4 through 8.

Figure 39:
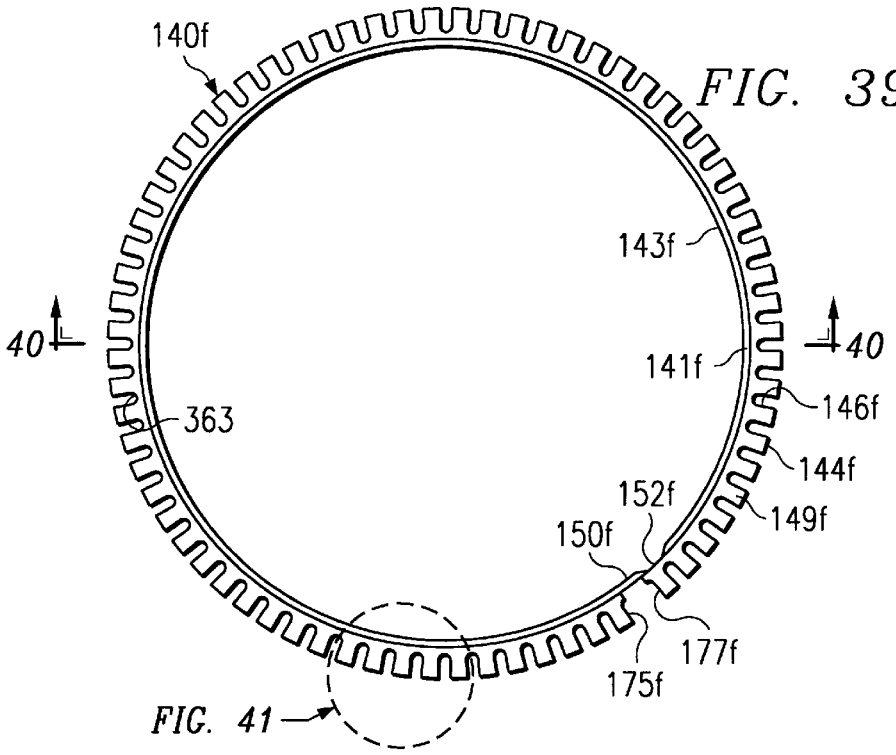
FIG. 39 is a top view of a one-piece circular external collet which is constructed the same as the external collet shown in FIGS. 9 and 10, and wherein the external collet body is provided with U-shaped slots around the periphery thereof, to provide minimal contraction of the external collet during use thereof.
Figure 40:
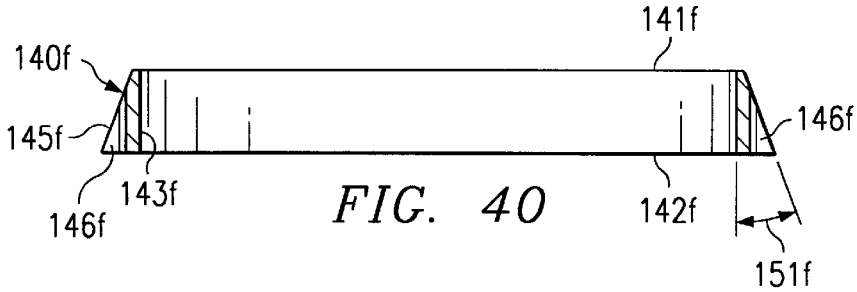
FIG. 40 is an elevation section view of the external collet illustrated in FIG. 39, taken along the line 40—40 thereof, looking in the direction of the arrows.
Figure 41:
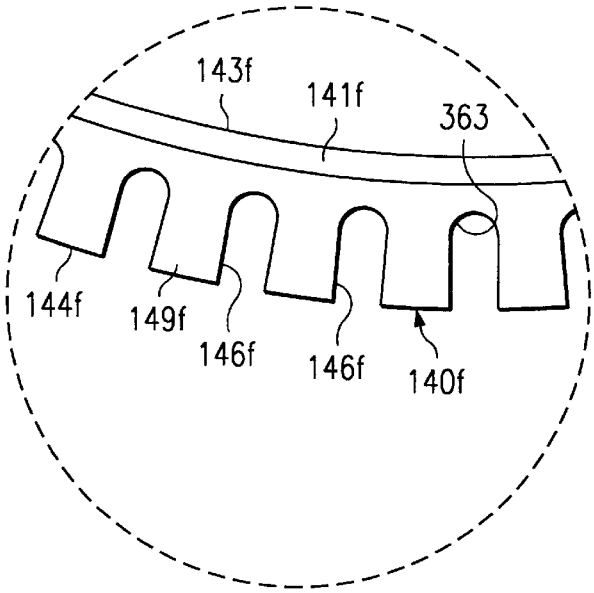
FIG. 41 is a fragmentary, enlarged view of a portion of the external collet illustrated in FIG. 39 taken within the circle marked by the numeral "41" in FIG. 39.

FIGS. 39, 40 and 41 disclose a one-piece circular external collet which is constructed the same as the external collet shown in FIGS. 9, 10 and 11, but wherein the external collet body 140f is provided with U-shaped slots around the periphery thereof, to provide minimal contraction of the external collet during use thereof. The parts of the external collet shown in FIGS. 39, 40, and 41 which are the same as the parts of the external collet shown in FIGS. 9, 10 and 11 have been marked with the same reference numerals followed by the small letter "f". FIG. 39 is a top view of the one-piece circular external collet body 140f. FIG. 40 is an elevation section view of the external collet body 140f as illustrated in FIG. 40 taken along the line 40—40 thereof, and looking in the direction of the arrows. FIG. 41 is a fragmentary, enlarged view of a portion of the external collet body 140f illustrated in FIG. 39, taken within the circle marked by the numeral 41 in FIG. 39. As best seen in FIG. 41 the slots 146f surrounding the periphery of the collet body 140 are enlarged and terminate at their inner ends in a semi-circular configuration 363. The semi-circular configurations 363 would be of a size corresponding to a semi-circular size of the holes 147 employed in the external collet body 140 shown in FIGS. 9, 10 and 11. The external collet body 140f shown in FIGS. 39, 40 and 41 is adapted to be used in workpiece chucks, as shown in FIGS. 12 through 17.

Figure 42:
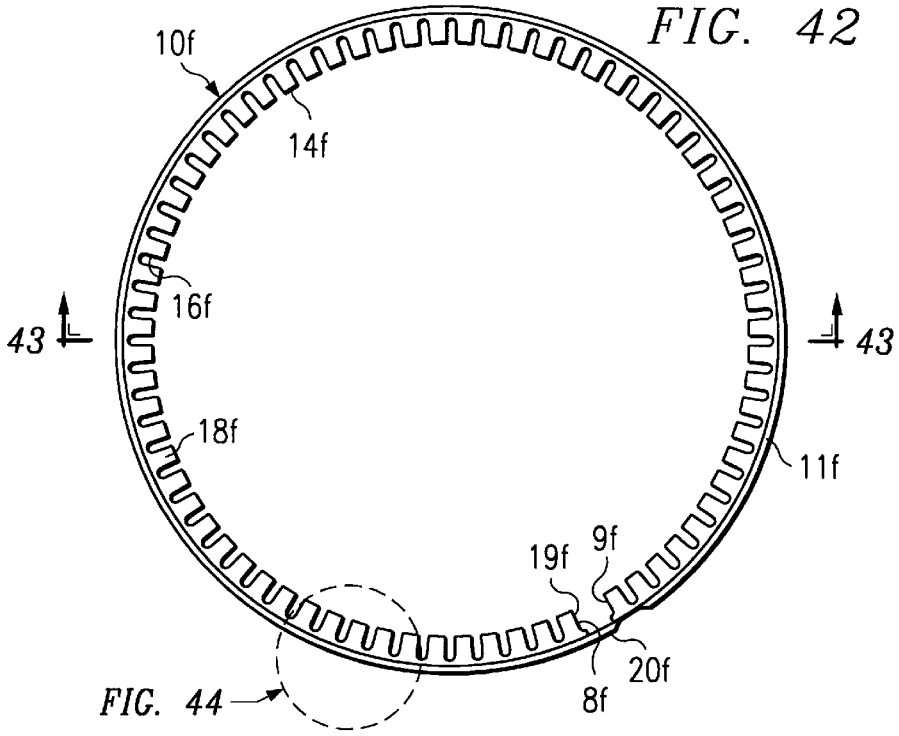
FIG. 42 is a top view of a one-piece circular internal collet which is constructed the same as the internal collet shown in FIGS. 1 and 2, and wherein the internal collet body is provided with U-shaped slots around the internal periphery thereof, to provide minimal expansion of the internal collet during use thereof.
Figure 43:
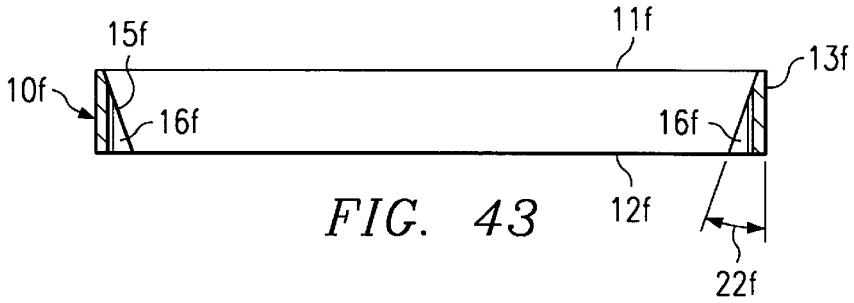
FIG. 43 is an elevation section view of the internal collet illustrated in FIG. 42, taken along the line 43—43 thereof, and looking in the direction of the arrows.
Figure 44:
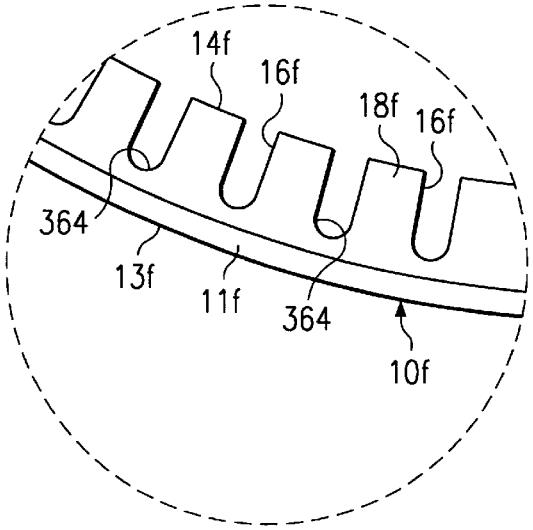
FIG. 44 is a fragmentary, enlarged view of a portion of the internal collet illustrated in FIG. 42, taken within the circle marked by the numeral "44" in FIG. 42.

FIGS. 42, 43 and 44 disclose a one-piece circular internal collet which is constructed the same as the internal collet shown in FIGS. 1, 2 and 3, but wherein the internal collet body 10f is provided with U-shaped slots around the periphery thereof, to provide minimal expansion of the internal collet during use thereof. The parts of the internal collet shown in FIGS. 42, 43 and 44 which are the same as the parts of the internal collet shown in FIGS. 1, 2 and 3 have been marked with the same reference numerals followed by the small letter "f". FIG. 42 is a top view of the one-piece circular internal collet body 10f. FIG. 43 is an elevation section view of the internal collet body 10f as illustrated in FIG. 42, taken along the line 43—43 thereof, and looking in the direction of the arrows. FIG. 44 is a fragmentary, enlarged view of a portion of the internal collet body 10f illustrated in FIG. 42, taken within the circle marked with the numeral 44 in FIG. 42. As best seen in FIG. 44, the slots 16f surrounding the periphery of the collet body 10f are enlarged and terminate at their inner ends at a semi-circular configuration 364. The semi-circular configurations 364 would be of a size corresponding to a semi-circular size of the holes 15 employed in the internal collet body 10 shown in FIGS. 1, 2 and 3. The internal collet body 10f shown in FIGS. 42, 43 and 44 is adapted to be used in workpiece chucks as shown in FIGS. 4 through 8.

Figure 45:
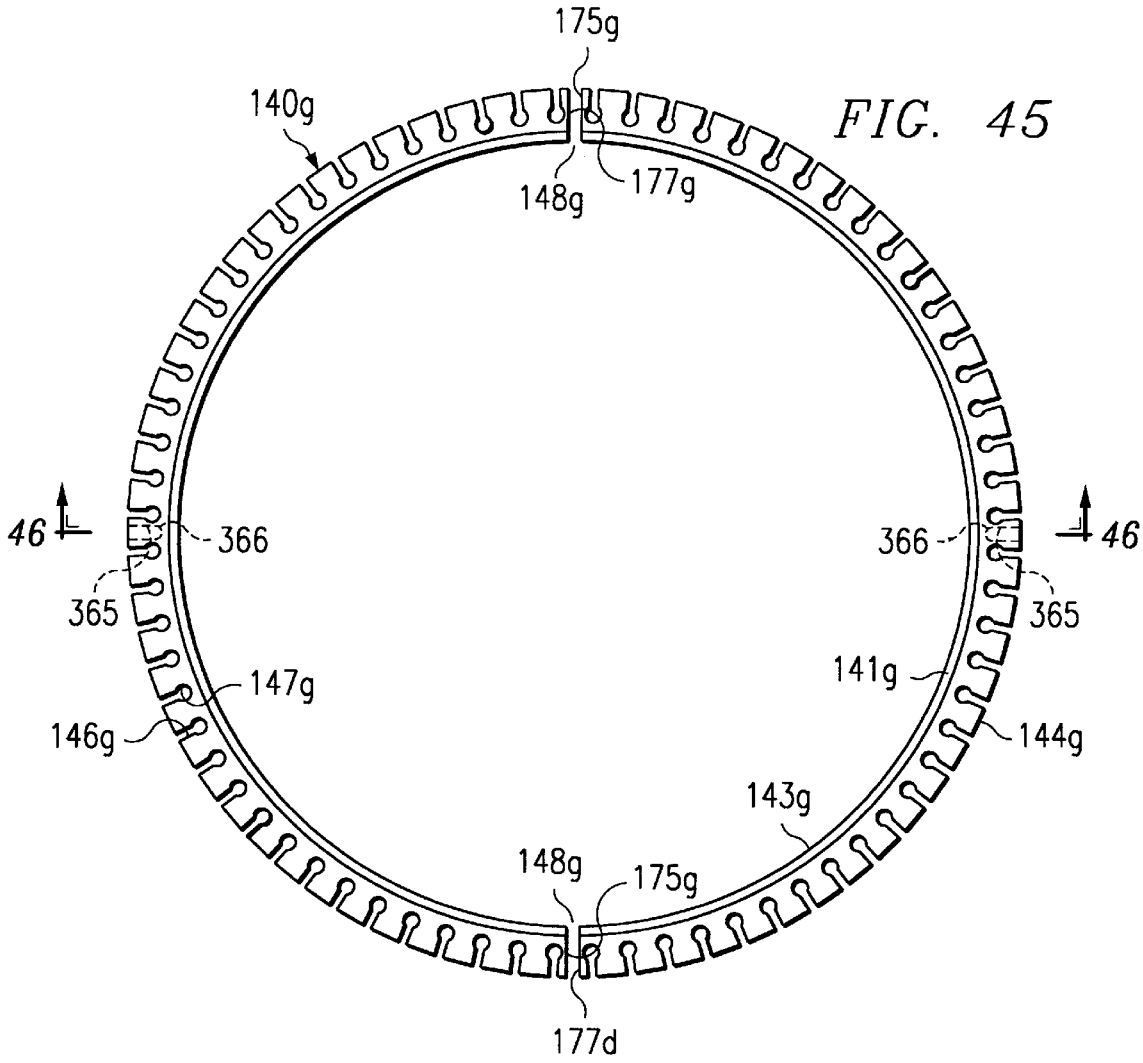
FIG. 45 is a top view of a two-piece circular external collet which is constructed the same as the external collet shown in FIGS. 9 and 10, but which is provided with a pair of diametrically opposite disposed splits in the external collet body, and which splits are not covered by integral split closure tangs, and wherein the external collet body is further provided with a pair of diametrically opposite disposed anchor slots in the bottom end of the external collet body, on a diametrical axis perpendicular to the diametrical axis of the pair of splits, and said anchor slots being adapted for the reception of anchor pins to prevent rotational slippage of the collet during heavy machining or grinding operations on a workpiece.
Figure 46:
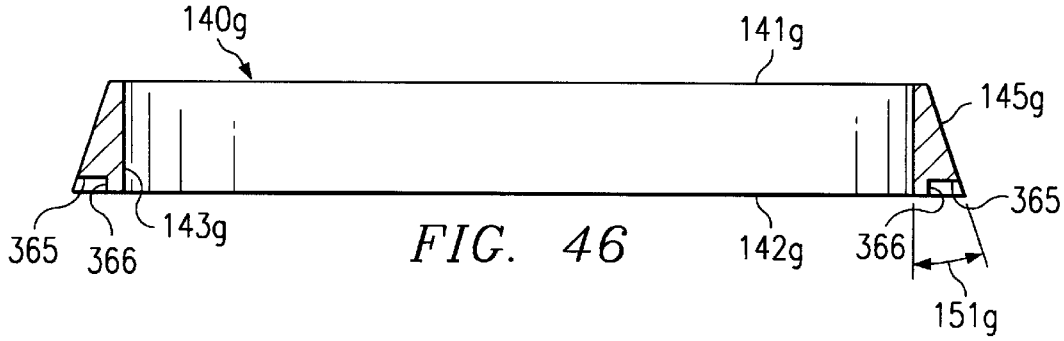
FIG. 46 is an elevation section view of the external collet illustrated in FIG. 45, taken along the line 46—46 thereof, and looking in the direction of the arrows.

FIGS. 45 and 46 disclose a two-piece circular external collet which is constructed the same as the external collet shown in FIGS. 9, 10 and 11. The parts of the external collet shown in FIGS. 45 and 46, which are the same as the parts of the external collet shown in FIGS. 9, 10 and 11, have been marked with the same reference numerals followed by the small letter "g". The external collet shown in FIGS. 45 and 46 includes a collet body 140g. FIG. 45 is a top view of the two-piece circular external collet body 140g. FIG. 46 is an elevation section view of the external collet body 140g, taken along the line 46—46 thereof, and looking in the direction of the arrows. The collet body 140g is provided with a pair of diametrically opposite disposed [splits or openings] *split spaces* 148g. The [splits or openings] *split spaces* 148g are not provided with an internal integral split closure tang, such as the closure tang 150 shown in the collet body 140 in FIG. 11. The provision of a pair of [splits or openings] *split spaces* 148g provides an external collet which is constructed to allow additional flexibility for greater contraction movement of the collet when the collet moves into a gripping engagement with the outer surface of a cylindrical workpiece.

As shown in FIG. 45 the external collet body 140g is further provided with a pair of diametrically opposite disposed anchor slots 365 in the bottom end (FIG. 46) of the external collet body 140g. The anchor slots 365 extend inwardly from the outer periphery 144g of the collet body 140g and terminate at a round shoulder 366 (FIG. 45). The anchor slots 365 are disposed on a diametrical axis perpendicular to the diametrical axis of the pair of [splits or openings] *split spaces* 148g.

Figure 47:
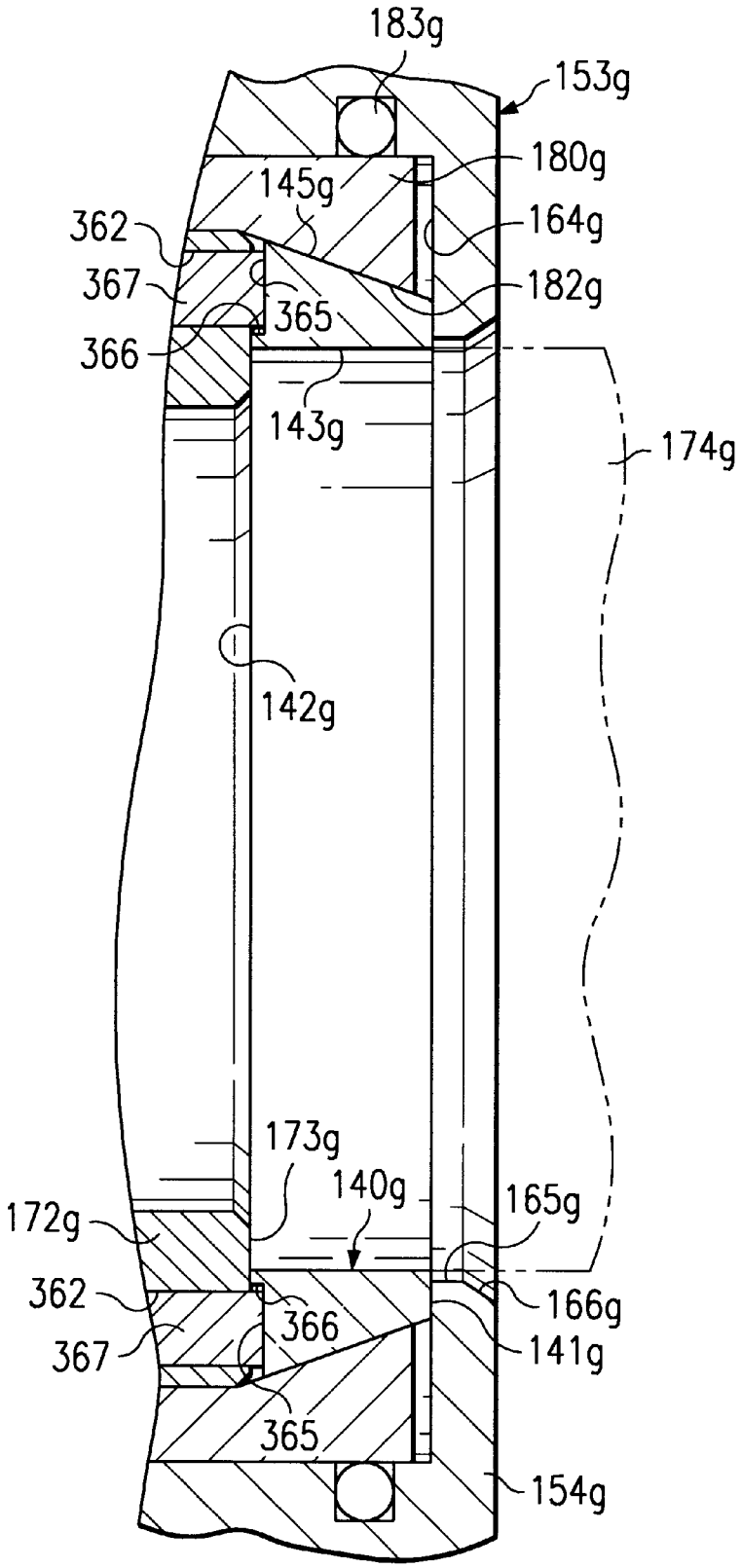
FIG. 47 is a fragmentary, longitudinal section view of a workpiece chuck as shown in FIG. 12 and provided with an external collet as illustrated in FIGS. 45 and 46, and wherein the external collet is in a position fully contracted into a gripping engagement with a workpiece, and showing a pair of anchor pins positioned in the anchor slots formed in the bottom end of the external collet body.

As shown in FIG. 47, the collet body 140g is adapted to be used in a workpiece chuck of the type shown in FIG. 13. The parts of the workpiece chuck 153g shown in FIG. 47, which are the same as the parts of the workpiece chuck 153 shown in FIG. 13, have been marked with the same reference numerals as used in the description of FIG. 13 followed by the small letter "g". As shown in FIG. 47, a pair of cylindrical anchor pins 367 are fixedly mounted in a pair of diametrically spaced apart, longitudinal bore 362 in the tubular chuck body member 172g, and their outer ends are seated in the anchor slots 365. FIG. 47 shows the external collet body 140g in a contracted, operative workpiece gripping position. When the collet actuator member 180g is returned to the inoperative position against the wall 164g, the collet body 140g expands outwardly and the anchor pins 367 then are seated against the shoulders 366. The anchor pins 367 coact with the anchor slots 365 to prevent rotational slippage of the collet body 140g during machining or grinding operations on a workpiece 174g.

Figure 48:
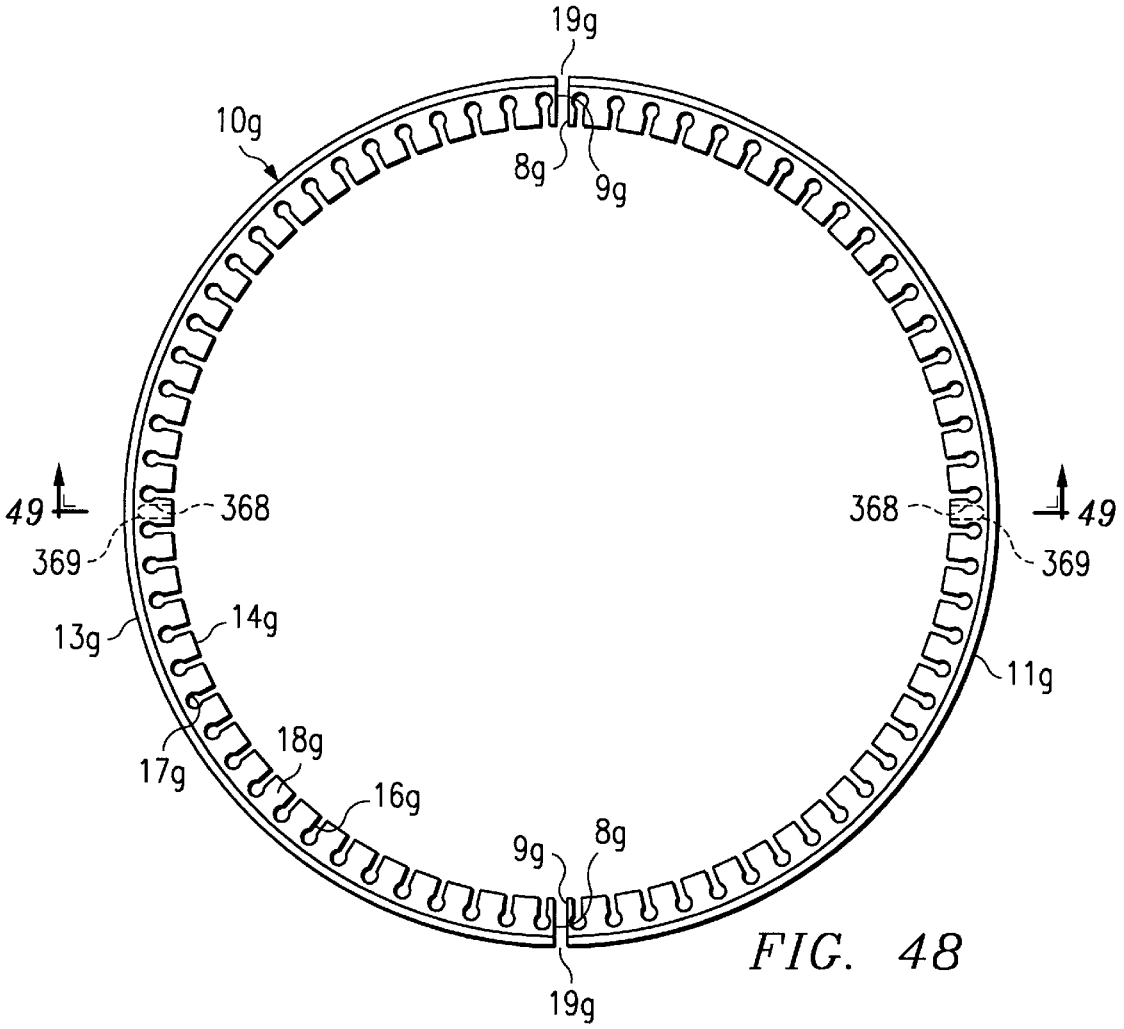
FIG. 48 is a top view of a two-piece circular internal collet which is constructed the same as the internal collet shown in FIGS. 1 and 2, but which is provided with a pair of diametrically opposite disposed splits in the internal collet body, and which splits are not covered by integral split closure tangs, and wherein the internal collet body is further provided with a pair of diametrically opposite disposed anchor slots in the bottom end of the internal collet body on a diametrical axis perpendicular to a diametrical axis of the pair of splits, and said anchor slots being adapted for the reception of anchor pins to prevent rotational slippage of the collet during heavy machining or grinding operations on a workpiece.
Figure 49:
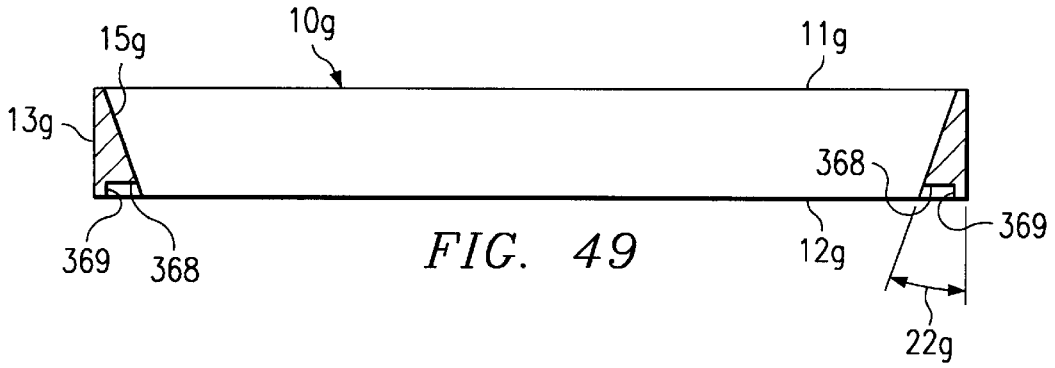
FIG. 49 is an elevation section view of the internal collet illustrated in FIG. 48, taken along the line 49—49 thereof, and looking in the direction of the arrows.

FIGS. 48 and 49 disclose a two-piece circular internal collet which is constructed the same as the internal collet shown in FIGS. 1, 2 and 3. The parts of the internal collet shown in FIGS. 48 and 49, which are the same as the parts of the internal collet shown in FIGS. 1, 2 and 3, have been marked with the same reference numerals followed by the small letter "g". The internal collet shown in FIGS. 48 and 49 includes a collet body 10g. FIG. 48 is a top view of the two-piece circular internal collet body 10g. FIG. 49 is an elevation section view of the internal collet body 10g, taken along the line 49—49 thereof, and looking in the direction of the arrows. The collet body 10g is provided with a pair of diametrically opposite disposed [splits or openings] *split spaces* 19g. The [splits or openings] *slit spaces* 19g are not provided with an external integral split closure tang, such as the closure tang 150 shown in the collet body 10 in FIG. 3. The provision of a pair of [splits or openings] *split spaces* 19g provides an internal collet which is constructed to allow additional flexibility for greater contraction movement of the collet when the collet moves into a gripping engagement with the internal surface of a cylindrical workpiece.

As shown in FIG. 48 the internal collet body 10g is provided with a pair of diametrically opposite disposed anchor slots 368 in the bottom end (FIG. 49) of the internal collet body 10g. The anchor slots 368 extend radially outward from the inner periphery 14g of the collet body 10g and terminate at a round shoulder 369 (FIG. 48). The anchor slots 368 are disposed on a diametrical axis perpendicular to the diametrical axis of the pair of [splits or openings] *split spaces* 19g.

Figure 50:
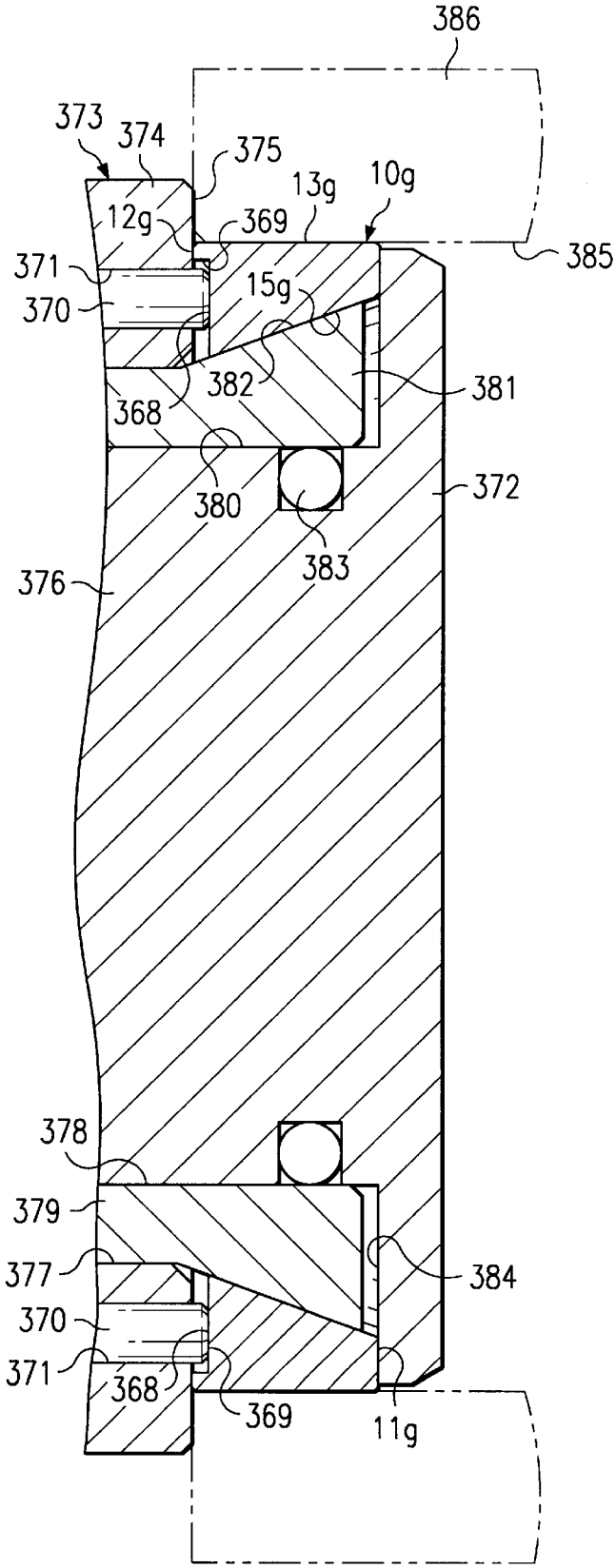
FIG. 50 is a fragmentary, longitudinal section view of a workpiece chuck similar to the chuck shown in FIG. 4, and provided with an internal collet as illustrated in FIGS. 48 and 49, and wherein the internal collet is in a position fully contracted into a gripping engagement with a workpiece, and showing a pair of anchor pins positioned in the anchor slots formed in the bottom end of the internal collet body.

As shown in FIG. 50, the collet body 10g is adapted to be used in a workpiece chuck generally designated by the numeral 373. The workpiece chuck 373 comprises a cylindrical chuck body 374 which is provided on the front end thereof with a transverse shoulder 375. The workpiece chuck 373 includes a centrally mounted, fixed solid cylindrical member 376 which is fixedly mounted within a cylindrical bore 377 in the chuck body 374. Integrally formed on the outer end of the fixed solid cylindrical member 376 is a transverse, annular flange 372. An annular, tubular fluid piston rod 379 is slidably mounted between the cylindrical bore 377 in the chuck body 374 and the cylindrical outer periphery 380 of the fixed solid cylindrical member 376. Integrally formed on the outer end of the fluid piston rod 379 is a collet actuator member 381 which is provided on the outer periphery thereof with a forward diverging, angled cam face 382. A suitable O-ring seal 383 is operatively mounted in a groove formed around the outer periphery 380 of the fixed solid cylindrical member 376 and it sealingly engages the inner cylindrical periphery 378 of the fluid piston rod 379 and integral collet actuator member 381.

As shown in FIG. 50, the collet body 10g is adapted to be used in the workpiece chuck 373 in an operative position disposed around the outer peripheral cam face 382 of the collet actuator member 381, with the bottom end 12g seated on the front end 375 of the chuck body 374, and the top end 11g seated against the inner transverse annular wall 384 formed on the inside of the annular flange 372 on the solid cylindrical member 376. A pair of anchor pins 370 are fixedly mounted in a pair of diametrically spaced apart, longitudinal bores 371 in the chuck body 374. The outer ends of the anchor pins 370 are positioned inside of the anchor slots 368 formed in the bottom end 12g of the collet body 10g. The fluid piston rod 379 would be operated into the operative position shown in FIG. 50 by a suitable fluid piston and supporting structure of the type shown in FIGS. 12 and 13. The collet body 10g is shown in an expanded workpiece engaging position with the outer periphery 13g in gripping engagement with the inner periphery 385 of a workpiece 386. The fluid operated piston 379 would be returned, to the right as viewed in FIG. 50, to an inoperative position, with the outer end of the collet actuator member 381 seated against the annular transverse wall 384 on the annular flange 377, by suitable compression return springs, as is employed in the workpiece chuck 153 shown in FIGS. 12 and 13. The anchor pins 370 coact with the anchor slots 368 to prevent rotational slippage of the collet body 10g during machining or grinding operations on the workpiece 386.

Figure 51:
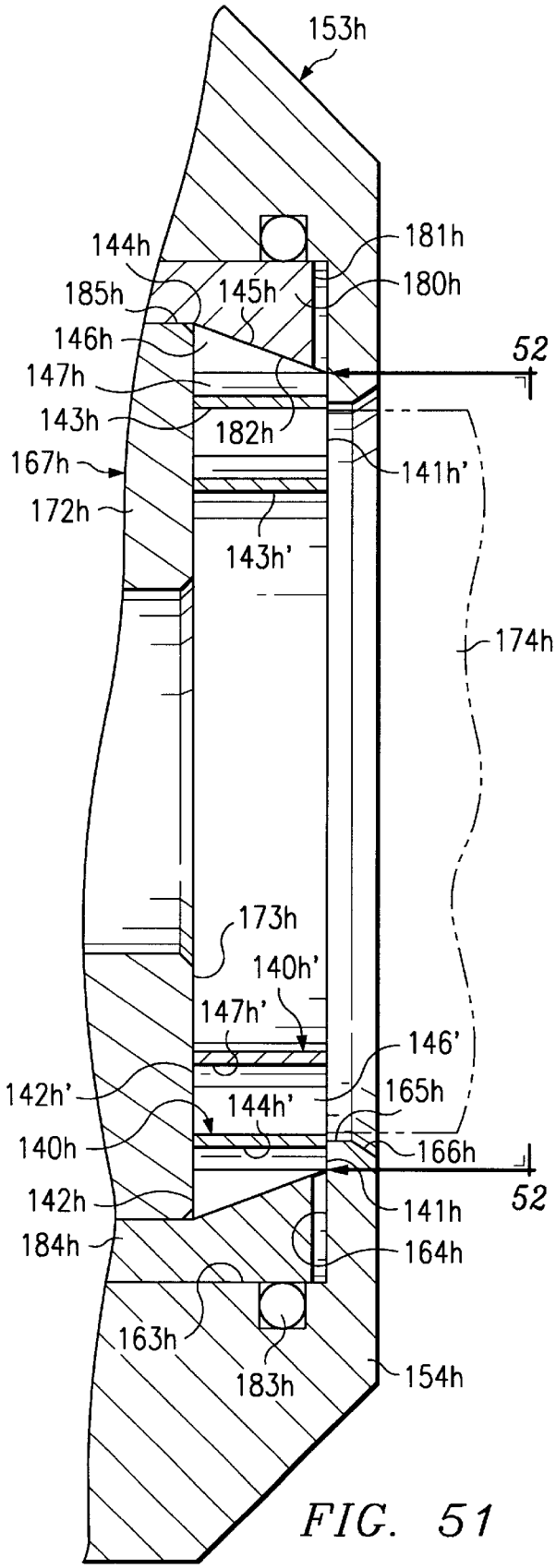
FIG. 51 is a fragmentary, longitudinal section view of a workpiece chuck, which is identical to the workpiece chuck shown in FIG. 12, but showing only a portion thereof, in an enlarged condition, and with an outer primary external collet which is constructed the same as the external collet shown in FIGS. 9 and 10, and within which is concentrically and telescopically disposed an inner secondary, size reducing external collet, and further wherein the two collets are in a position fully contracted, with the inner secondary external collet in an external gripping engagement with the periphery of a cylindrical workpiece.

FIG. 51 is a fragmentary, longitudinal section view of a workpiece chuck designated by the numeral 153h, which is identical to the workpiece chuck shown in FIG. 12, but showing only a portion thereof, in an enlarged condition. The parts of the workpiece chuck 153h which are the same as the parts of the workpiece chuck shown in FIG. 12 have been marked with the same reference numerals followed by the small letter "h".

Operatively mounted on the workpiece chuck 153h is an outer primary external collet which is constructed the same the external collet shown in FIGS. 9 and 10, and it has a collet body marked by the numeral 140h. The parts of the outer primary external collet shown in FIG. 51 have been marked with the same reference numerals as used in the description of the external collet shown in FIGS. 9 and 10, followed by the small letter "h". An inner secondary, size reducing external collet, which is constructed substantially like the external collet shown in FIGS. 9 and 10, is concentrically and telescopically disposed within the outer primary external collet and it has a collet body marked by the numeral 140h'. The parts of the inner secondary, size reducing external collet have been marked with the same reference numerals as used in the description of the external collet shown in FIGS. 9 and 10, followed by the small letter "h'". The two collet bodies 140h and 140h' are shown in FIG. 51 in a position fully contracted, with the inner secondary, size reducing external collet body 140h' in an external gripping engagement with the periphery of a cylindrical workpiece 174h.

Figure 52:
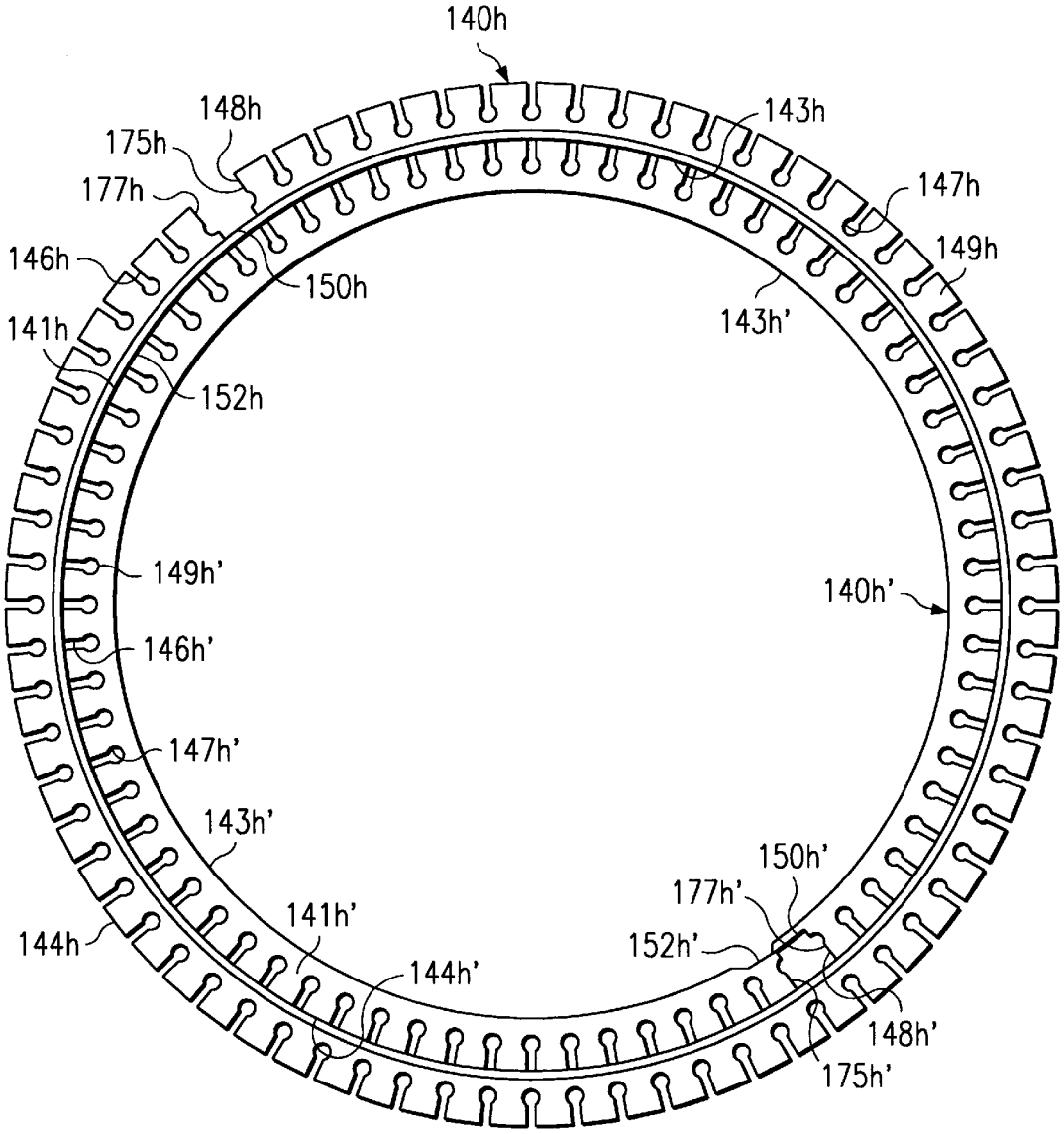
FIG. 52 is a top view of the combined structure of the outer primary external collet and the size reducing inner secondary external collet illustrated in FIG. 51, taken along the line 52—52 thereof, and looking in the direction of the arrows.

FIG. 52 is a top view of the combined collet structure, of the outer primary external collet body 140h and the inner secondary, size reducing external collet body 140h' illustrated in FIG. 51, taken along the line 52—52 thereof, and looking in the direction of the arrows.

The inner periphery surface 143h' and the outer peripheral surface 144h' of the collet body 140h' of the inner secondary, size reducing external collet are each machined with vertical, concentric surfaces which are also concentric with the vertical inner peripheral surface 143h of the outer primary external collet body 140h. The inner secondary, size reducing external collet body 140h' has a top end 141h' which is planar and parallel with the bottom end planar surface 142h' (FIG. 51), and it is provided with a plurality of radial slots 146h' which extend inward from the outer periphery 144h' and terminate at their inner ends with the holes 147h'. The parts of the inner secondary, size reducing external collet body 140h' which function in the same manner as the parts of the outer primary external collet body 140h have been marked with the same reference numerals followed by the small letter "h". The combination of the outer primary external collet body 140h and the inner secondary, size reducing external collet body 140h' would be employed to permit a workpiece chuck to be used for a plurality of cylindrical workpieces having difference size external diameters.

Figure 53:
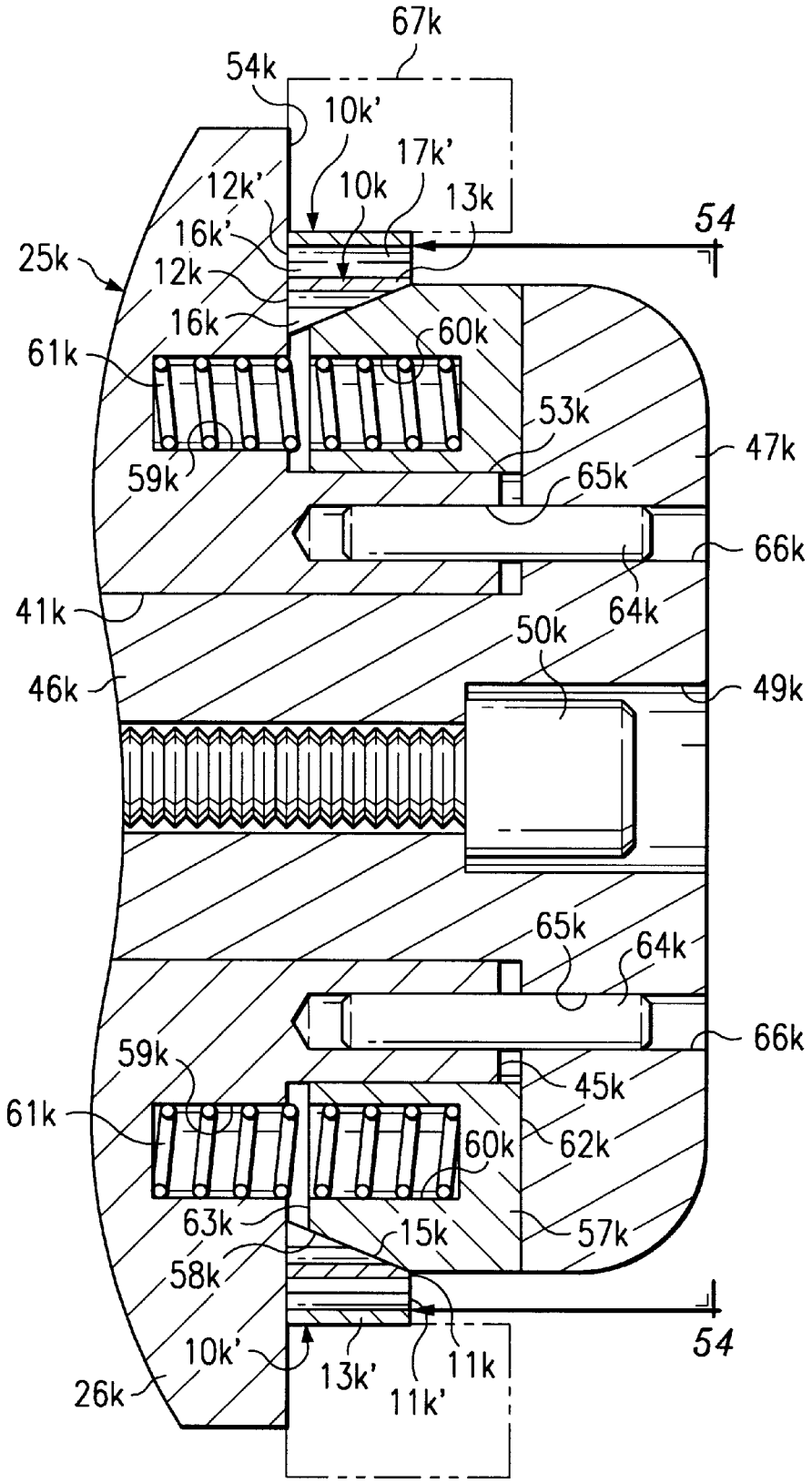
FIG. 53 is a fragmentary, longitudinal section view workpiece chuck, which is similar to the workpiece chuck shown in FIG. 4, but showing only a portion thereof, in an enlarged condition, and with an inner primary internal collet which is constructed the same as the internal collet shown in FIGS. 1 and 2, and around which is concentrically and telescopically disposed an outer secondary, size enlarging internal collet, and further wherein the two collets are in a position fully expanded, with the outer secondary internal collet in an internal gripping engagement with the internal bore in a cylindrical workpiece.

FIG. 53 is a fragmentary, longitudinal section view of a workpiece chuck designated by the numeral 25k which is similar to the workpiece chuck 25 shown in FIG. 4, but showing only a portion thereof, in an enlarged condition. The parts of the workpiece chuck 25k which are the same as the parts of the workpiece chuck 25 shown in FIG. 4 have been marked with the same reference numerals followed by the small letter "k".

Operatively mounted on the workpiece chuck 25k is an inner primary internal collet which is constructed the same as the internal collet shown in FIGS. 1 and 2, and it has a collet body marked by the numeral 10k. The parts of the inner primary internal collet shown in FIG. 53 have been marked with the same reference numerals as used in the description of the internal collet shown in FIGS. 1 and 2, followed by the small letter "k". An outer secondary, size enlarging internal collet, which is constructed substantially like the internal collet shown in FIGS. 1 and 2, is concentrically and telescopically disposed around the inner primary internal collet and it has a collet body marked by the numeral 10k'. The parts of the outer secondary, size enlarging internal collet have been marked with the same reference numerals as used in the description of the internal collet shown in FIGS. 1 and 2, followed by the small letter "k". The two collet bodies 10k and 10k' are shown in FIG. 53 in a position fully expanded, with the outer secondary, size enlarging internal collet body 10k' in an internal gripping engagement with the inner periphery of a cylindrical workpiece 67k.

Figure 54:
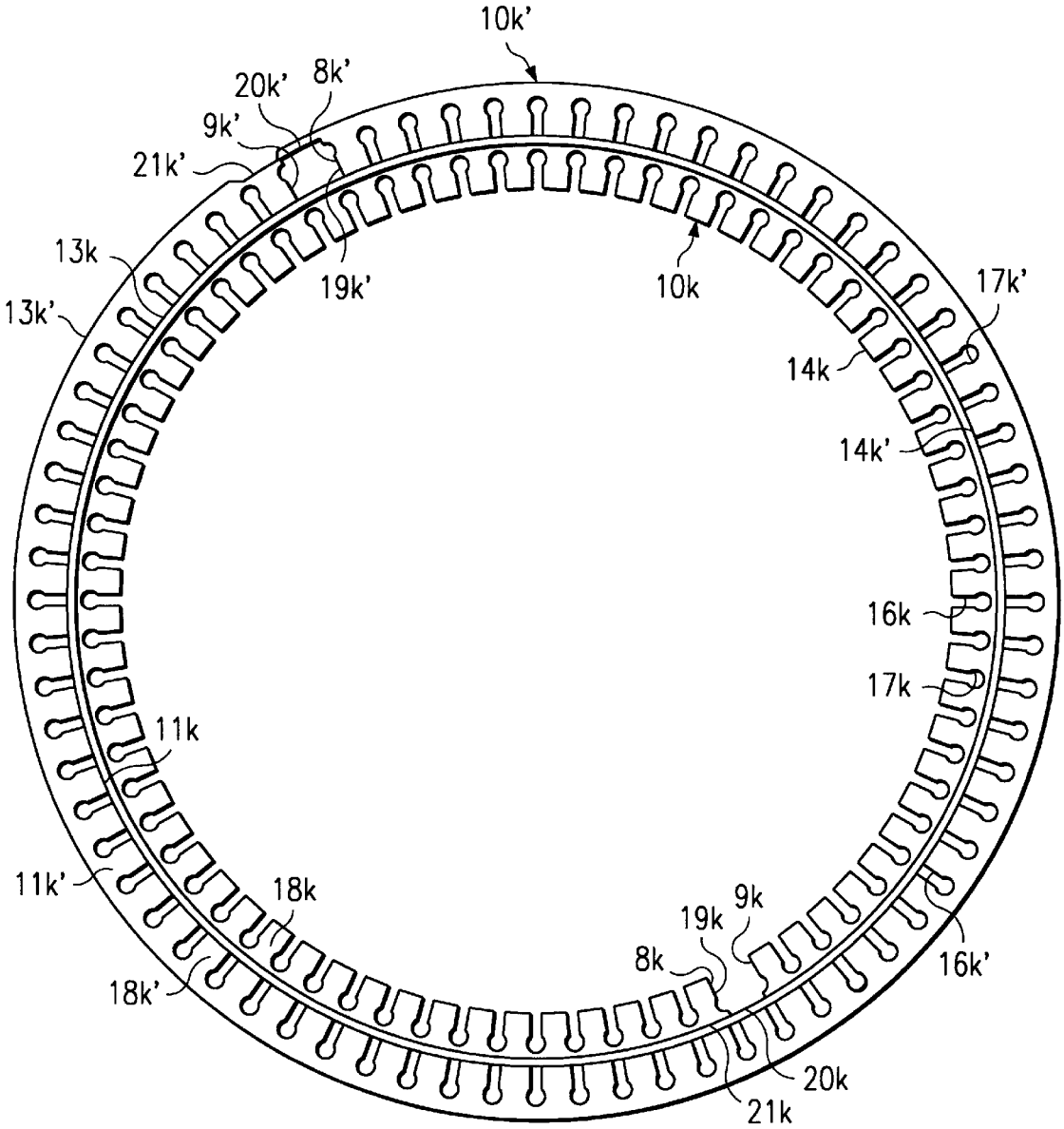
FIG. 54 is a top view of the combined structure of the inner primary internal collet and the size reducing outer secondary internal collet illustrated in FIG. 51, taken along the line 54—54 thereof, and looking in the direction of the arrows.

FIG. 54 is a top view of the combined expanded collet structure, of the inner primary internal collet body 10k and the outer secondary, internal collet body 10k' illustrated in FIG. 53, taken along the line 54—54 thereof, and looking in the direction of the arrows.

The outer peripheral surface 13k' and the inner peripheral surface 14k' of the collet body 10k', of the outer secondary, size enlarging internal collet are each machined with vertical, concentric surfaces, which are also concentric with the vertical outer peripheral surface 13k of the inner primary internal collet body 10k. The outer secondary, size enlarging internal collet body 10k' as a top end 11k' which is planar and parallel to the bottom end planar surface 12k' thereof (FIG. 53), and it is provided with a plurality of radial slots 16k' which each extend radially outward from the inner peripheral surface 14k' and terminate at an outer end with a hole 17k'. The parts of the outer secondary, size enlarging internal collet body 10k' which function in the same manner as the parts of the inner primary internal collet body 10k have been marked with the same reference numerals followed by the small "k'". The combination of the inner primary internal collet body 10k and the outer secondary, size enlarging internal collet body 10k' would be employed to permit a workpiece chuck to be used for a plurality of cylindrical workpieces having different size internal diameters.

It will be understood that the transverse annular shoulder or collet seat 54 of the workpiece chuck 25, shown in FIG. 4, functions as a positive stop for the internal collet actuator member 57 when it is actuated, to provide for safe use of the chuck 25 by unskilled users of the chuck 25. The positive stop 54 shown in FIG. 4, also functions to eliminate over expansion or contraction of a collet, for safe use by unskilled users of workpiece chucks employing a collet made in accordance with the present invention. The corresponding positive stop structures employed in the workpiece chucks shown in the other Figures of the application function the same manner as the positive stop 54.

The tapered outer periphery 58 on the collet actuator member 57 is formed at an angle commensurate with the angle of the cam surface 15 on the inner periphery of the collet body 10 shown in FIG. 4. The same relation would exist between the cam surfaces on both the internal and external collet bodies and the tapered peripheries on the collet actuator members for the collets shown in the other Figures of the application.

FIGS. 32 and 35 show external collets split into two parts to allow greater contraction. FIGS. 33 and 34 show two internal collets split into two parts to allow greater expansion. It will be understood that the external and internal collets made in accordance with the invention may be split into more than two parts to allow for greater expansion and contraction, as desired.

The following is an explanation of the procedure for making an internal collet as illustrated in FIGS. 1, 2 and 3. As previously stated herein, the collet body 10 may be made from a suitably spring steel hardened to a 44–46 Rockwell C scale hardness. An optimum spring steel is an S.A.E. spring steel No 6150. A cylindrical workpiece made of the last mentioned spring steel would be mounted in a suitable machine, such as a lathe, and the outer end of the workpiece would be cut off to provide a collet body thickness gripping area of a desired size, as for example, three-eights of an inch, plus a few thousandths of an inch additional stock for a final grinding finish on the top and bottom end faces of the collet body, as on the top and bottom end faces 11 and 12 of, respectively, of the collet body 10 shown in FIG. 2.

Assuming that the selected diameter of the outer periphery 11 of the collet body 10 is 2.5 inches and the selected diameter of the inner periphery 14 of the collet body 10 is 2 inches, an axial bore of 2 inches is then machined through the workpiece. The angle 22 for the inner cam face 15 is then machined to an angle selected from a range of from 1 degree to 45 degrees, depending on the holding force required for the collet, in accordance with the requirement of the ultimate user of the collet, and calculated as set forth hereinbefore to determine the angle 22. The plurality of vertical holes 17 are then radially located and drilled in accordance with the following formula. The holes 17 are drilled to a selective size of 3/32 inch diameter, and they are located on a 1.166 inch radius. The radius location for the 3/32 inch diameter holes is determined as follows. The collet body outer diameter of 2.5 inches has subtracted therefrom the inner diameter of 2.0 inches which equals 0.5 inches. The 0.5 inches is divided by 2, which equals 0.25 inches, the thickness of the body 10 at the lower end 12, between the inner periphery 14 and the outer periphery 13. The axis of each of the holes 17 is to be located outward from the inner periphery 14 at a point 2/3 of said thickness of the body 10. Accordingly the 0.25 inches is multiplied by 2/3 which equals 0.166 inches. The inner diameter radius is 1 inch, and it is added to the 0.166 inches to give a resultant 1.166 inches radius for locating the 3/32 inch diameter holes about the axis of the collet body 10.

The 3/32 diameter holes are then drilled at said 1.166 inches radius location around the axis of the collet body 10, at equally spaced apart circumferential points which are determined as follows.

The inner diameter radius of 1 inch is subtracted from the 3/32 inch diameter hole location radius of 1.166 inches, which results in a figure of 0.166 inches. One half of the dimension of a 3/32 inch diameter hole is 0.046 inches and it is subtracted from said 0.166 inches which equals 0.120 inches, and that is the web thickness from the outer periphery of a 3/32 inch diameter hole to the outer periphery 13 of the collet body 10. The diameter of a 3/32 inch hole, namely 0.093 inches, is added to said web thickness of 0.120 inches to provide a resultant dimension of 0.213 inches for the radial location spacing of the 3/32 inch diameter holes from the inner periphery 14.

The number of 3/32 inch diameter holes 17 is determined by multiplying the location radius of 1.166 for said holes by two, which equals 2.332 inches. The 2.332 inches is multiplied by 3.1416 (PI) which equals 7.326 inches, which is the circumference of the center points of the 3/32 inch diameter holes 17. The circumference of 7.326 inches is divided by 0.213 inches, which is the radial location spacing for the 3/32 inch diameter holes 17, which results in 34 holes. The angular spacing of the 3/32 inch holes 17 is determined by dividing 360 degrees by the number of holes 17, namely 34, which results in an angular spacing of 10 degrees for the 34 holes, on the 1.166 inch radius.

The following is an explanation of the procedure for mating an external collet as illustrated in FIGS. 9, 10 and 11. The external collet body 140 would be made from the same type steel as used for the internal collet body 10. The external collet body 140 would be machined from a workpiece in the same manner as described for the internal collet body 10.

Assuming that the selected diameter of the outer periphery 144 of the external collet body 140 is 2.5 inches and the selected diameter of the inner periphery 143 of the external collet body 140 is 2 inches, an axial bore of 2 inches is then machined through the workpiece. The angle 151 for the outer cam face 145 is then machined to an angle selected from a range of from 1 degree to 45 degrees, depending on the holding force required for the collet, in accordance with the requirement of the ultimate user of the collet, and calculated as set forth hereinbefore to determine the angle 151. The plurality of vertical holes 147 are then radially located and drilled in accordance with the following formula. The holes 147 are drilled to a selective size of 3/32 inch diameter, and they are located on a 1.129 inch radius. The radial location for the 3/32 inch diameter holes is determined as follows. The collet body outer diameter of 2.5 inches has subtracted therefrom the inner diameter of 2.0 inches which equals 0.5 inches. The 0.5 inches is divided by which equals 0.25 inches, the thickness of the collet body 140 at the lower end 142, between the inner periphery 143 and the outer periphery 144. The axis of each of the holes 147 is to be located outward from the inner periphery 143 at a point 1/3 of said thickness of the collet body 140. Accordingly the 0.25 inches is multiplied by 1/3 which equals 0.083 inches. The inner diameter radius is 1 inch, and it is added to the 0.083 inches, and to 1/2 of the diameter of the holes 147, namely 0.046 inches, to give a resultant 1.129 inches radial location for the 3/32 inch diameter holes 147 about the axis of the collet body 140.

The 3/32 diameter holes 147 are then drilled at said 1.129 inches radial location around the axis of the collet body 140, at equally spaced apart circumferential points which are determined as follows.

The inner diameter radius of 1 inch is subtracted from the 3/32 inch diameter hole location radius of 1.129 inches, which results in a figure of 0.129 inches. One half of the dimension of a 3/32 inch diameter hole 147 is 0.046 inches and it is subtracted from said 0.129 inches which equals 0.083 inches, and that is the web thickness from the inner periphery of a 3/32 inch diameter hole to the inner periphery 143 of the collet body 140. The diameter of a 3/32 inch hole, namely 0.093 inches, is added to said web thickness of 0.083 inches to provide a resultant dimension of 0.176 inches for the radial location of the 3/32 inch diameter holes 147 from the outer periphery 144.

The number of 3/32 inch diameter holes 147 is determined by multiplying the location radius of 1.129 inches for said holes 147 by two, which equals 2.258 inches. The 2.258 inches is multiplied by 3.1416 (PI) which equals 7.094 inches, which is the circumference of the center points of the 3/32 inch diameter holes 147. The circumference of 7.094 inches is divided by 0.176 inches, which is the radial location spacing for the 3/32 inch diameter holes 147, which results in 40 holes. The angular spacing of the 3/32 inch holes 147 is determined by dividing 360 degrees by the number of holes 147, namely 40, which results in an angular spacing of 9 degrees for the 40 holes, on the 1.129 inch radius.

The slots 16 in the internal collet body 10 illustrated in FIGS. 1, 2 and 3, and the slots 146 in the external collet body 140 illustrated in FIGS. 9, 10 and 11, may be machined to an optimum width of two-thirds of the diameter of the 3/32 holes 17 and 147, respectively. The machining of the slots 16 and 146 may be carried out by a suitable grinding wheel operation or by the use of an electrical discharge machine.

The internal collet body 10f as shown in FIGS. 42, 43 and 44, and the external collet body 140f as shown in FIGS. 39, 40 and 41, would have the slots 16f and 146f, respectively, formed by first locating and drilling holes, such as 3/32 inch diameter holes, in the same manner as described hereinbefore for the internal collet shown in FIGS. 1, 2 and 3, and the external collet shown in FIGS. 9, 10 and 11. The slots 16f and 146f would then be machined by either a grinding wheel or an electrical discharge machine to make the sides of the last mentioned slots tangent to the inner peripheries of the 3/32 holes.

It will be understood that the 3/32 inch diameter size hole was selected as an illustrative example for explaining the making of illustrative internal and external collets in accordance with the invention. However, other size holes could be used, as for example, a 1/16 inch diameter hole size. It will also be understood that internal and external collets made in accordance with the invention will vary in size in accordance to the size of workpieces to be held by a collet.

The term cylindrical workpiece used in the claims is defined as being any cylindrical-like workpiece, whether solid, hollow or tubular, and having an external circular periphery, or an internal circular periphery, or both an external and an internal circular periphery.

What is claimed is:

1. In a collet chuck having a chuck body provided with at least one circular collet seat, a circular collet mounted on said collet seat, a movable power operated actuator means slidably mounted on the chuck body for engagement with said collet to bias it into a gripping engagement with a circular periphery on a cylindrical-like workpiece when the actuator means is moved in one direction, a return means mounted on the chuck body in engagement with the actuator means for moving the actuator means in another direction to release the collet gripping engagement with the cylindrical-like workpiece, the improvement comprising:

(a) said circular collet having a flexible circular collet body which has an outer circular periphery and an inner circular periphery;

(b) said flexible circular collet body having a radial opening formed therethrough which extends between said outer and inner peripheries;

(c) one of said collet body circular peripheries having a workpiece gripping surface and the other of said collet body circular peripheries having a tapered cam surface engageable by said actuator means to bias the collet into said engagement with said workpiece; and, (d) said tapered cam surface having a plurality of circumferentially spaced apart slots, and each of said slots has an open outer end and an arcuate inner end.

2. A collet chuck as defined in claim 1, wherein:

(a) an elastomeric seal is mounted in the radial opening in said circular collet body.

3. A collet chuck as defined in claim 1, wherein:

(a) said circular collet body has a plurality of radial openings formed therethrough.

4. A collet chuck as defined in claim 3 wherein:

(a) an elastomeric seal is mounted each of said plurality of radial openings in said circular collet body.

5. A collet chuck as defined in claim 1, wherein:

(a) a closure tang is mounted on the collet body and extends over the radial opening.

6. A collet chuck as in any of claims 1–5, in which the collet body has a hole formed at an inner arcuate end of each of said plurality of slots in said tapered cam surface, and the axis of each hole is parallel to and spaced radially apart from the workpiece gripping surface.

7. A collet chuck as in any of claim 1–5, in which the workpiece gripping surface is formed on the outer circular periphery of the collet body for gripping an internal surface of a cylindrical-like workpiece, and the tapered cam surface is formed on the inner circular periphery of the collet body.

8. A collet as in any of claims 1–5, in which the workpiece gripping surface is formed on the inner circular periphery of the collet body for gripping an external surface of a cylindrical-like workpiece, and the tapered cam surface formed on the outer circular periphery of the collet body.

9. A collet chuck as defined in claim 1, wherein:

(a) said chuck is provided with two longitudinally spaced apart circular collet seats;

(b) a circular collet is mounted on each of said collet seats;

(c) the workpiece gripping surface on each of said circular collets is formed on the outer circular periphery of each of the collet bodies for gripping an internal surface of a cylindrical-like workpiece, and the tapered cam surface on each of the circular collets is formed on the inner circular periphery of each of the collet bodies; and, (d) one of said circular collets is disposed radially outward from the other circular collet to permit the circular collets to engage a stepped internal surface of a cylindrical-like workpiece when the tapered cam surface on each of the collets is engaged by the actuator means to expand the collets into a gripping engagement with a stepped internal surface of a cylindrical-like workpiece.

10. A collet chuck as defined in claim 1, wherein:

(a) said chuck is provided with two longitudinally spaced apart circular collet seats;

(b) a circular collet is mounted on each of said collet seats;

(c) the workpiece gripping surface on each of said circular collets is formed on the outer circular periphery of each of the collet bodies for gripping an internal surface of a cylindrical-like workpiece, and the tapered cam surface on each of the circular collets is formed on the inner circular periphery of each of the collet bodies; and, (d) said chuck has a pair of actuator means and the tapered cam surface on each of the collets is engaged by one of the actuator means to expand the collets into a gripping engagement with an internal surface of a cylindrical-like workpiece.

11. A collet chuck as defined in claim 1, wherein:

(a) said chuck is provided with two longitudinally spaced apart circular collet seats and a pair of actuator means;

(b) a circular collet is mounted on each of said collet seats;

(c) the workpiece gripping surface on each of said circular collets is formed on the outer circular periphery of each of the collet bodies for gripping an internal surface of a cylindrical-like workpiece, and the tapered cam surface on each of the circular collets is formed on the inner circular periphery of each of the collet bodies; and, (d) the workpiece gripping surfaces on said circular collets are provided with different tapered outer circular peripheries to permit the circular collets to engage a tapered internal surface of a cylindrical-like workpiece when the tapered cam surface on each of the collets is engaged by one of the actuator means to expand the collets into a gripping engagement with a tapered internal surface of a cylindrical-like workpiece.

12. A collet chuck as defined in claim 1, wherein:

(a) said chuck is provided with two longitudinally spaced apart circular, tapered collet seats, with one of said tapered collet seats being formed as a fixed tapered seat on the chuck body and the other tapered seat being formed on the actuator means;

(b) a circular collet is mounted on each of said tapered collet seats, and each of the circular collets has a top end and a bottom end;

(c) the workpiece gripping surface on each of said circular collets is formed on the outer circular periphery of each of the collet bodies for gripping an internal surface of a cylindrical-like workpiece, and the tapered cam surface on each of the circular collets is formed on the inner circular periphery of each of the collet bodies; and, (d) the circular collets are disposed with their bottom ends in abutting engagement with each other, and with the tapered cam surface on one circular collet seated on said fixed tapered collet seat on the chuck body to permit the circular collets to engage an internal surface of a cylindrical-like workpiece when the tapered cam surface on one of the collets is engaged by the tapered seat on the actuator means, and the tapered cam surface on the other collet is engaged by the fixed tapered collet seat, to bias both collets endwise and expand the collets into a gripping engagement with an internal surface of a cylindrical-like workpiece.

13. A collet chuck as defined in claim 1, wherein:

(a) said circular collet body has a top end and a bottom end, and a pair of diametrically opposite disposed radial openings formed therethrough, and a pair of diametrically opposite disposed anchor slots formed in the bottom end of the collet body on a diametrical axis perpendicular to a diametrical axis of the pair of radial openings;

(b) the collet body has a hole formed at an inner arcuate end of each of said plurality of slots in said tapered cam surface, and the axis of each hole is parallel to the workpiece gripping surface;

(c) the workpiece gripping surface is formed on the outer circular periphery of the collet body for a gripping engagement with the internal surface of a cylindrical-like workpiece, and the tapered cam surface is formed on the inner circular periphery of the collet body; and, (d) a pair of anchor pins are fixedly mounted in a pair of diametrically spaced apart, longitudinal bores in the chuck body with the outer ends of the anchor pins positioned inside of the anchor slots formed in the bottom of the collet body, whereby when the tapered cam surface on the collet body is engaged by the actuator means, the collet body is expanded into a gripping engagement with the internal surface of a cylindrical-like workpiece and the anchor pins coact with the anchor slots in the collet body to prevent rotational slippage of the collet body during machining operations on a cylindrical-like workpiece.

14. A collet chuck as defined in claim 1, wherein:

(a) said collet body comprises an inner primary internal collet, around which is concentrically and telescopically disposed an outer circular secondary, size enlarging internal collet;

(b) the collet body of said inner primary internal collet has a hole formed at an inner arcuate end at each of said plurality of slots in said tapered cam surface, and the axis of each hole is parallel to the workpiece gripping surface;

(c) the workpiece gripping surface of the inner primary internal collet body is formed on the outer circular periphery of the primary internal collet body for gripping engagement with the inner peripheral surface of the outer circular secondary, size enlarging internal collet, and the tapered cam surface is formed on the inner circular periphery of the collet body of the inner primary internal collet;

(d) the outer secondary, size enlarging internal collet has a collet body with atop end which is planar and parallel to a bottom end thereof which is also planar, and the collet body of the outer circular secondary, size enlarging internal collet body has an outer periphery surface, and an inner peripheral surface and each of the last mentioned surfaces are vertical, concentric surfaces which are also concentric with the outer peripheral workpiece engaging surface of the inner primary internal collet body; and, (e) the outer circular secondary, size enlarging internal collet body is provided with a plurality of slots which each extend radially outward from the inner peripheral surface thereof and terminate at an outer end with a hole, and the outer circular secondary, size enlarging internal collet body has a radial opening formed therethrough, whereby when the tapered cam surface on the collet body of the inner primary internal collet is engaged by the actuator means, the inner primary internal collet and the outer circular secondary, size enlarging internal collet are expanded into a gripping engagement with the internal surface of a cylindrical-like workpiece.

15. A collet chuck as defined in claim 1, wherein:

(a) said chuck is provided with two longitudinally spaced apart circular collet seats;

(b) a circular collet is mounted on each of said collet seats;

(c) the workpiece gripping surface on each of said circular collets is formed on the inner circular periphery of each of the collet bodies for gripping an external surface of a cylindrical-like workpiece, and the tapered cam surface on each of the circular collets is formed on the outer circular periphery of each of the collet bodies; and, (d) said chuck has a pair of actuator means and the tapered cam surface on each of the collets is engaged by one of the actuator means to contract the collets into a gripping engagement with an external surface of a cylindrical-like workpiece.

16. A collet chuck as defined in claim 1, wherein:

(a) said chuck is provided with two longitudinally spaced apart circular collet seats and a pair of actuator means;

(b) a circular collet is mounted on each of said collet seats;

(c) the workpiece gripping surface on each of said circular collets is formed on the inner circular periphery of each of the collet bodies for gripping an external surface of a cylindrical-like workpiece, and the tapered cam surface on each of the circular collets is formed on the outer circular periphery of each of the collet bodies; and, (d) the workpiece gripping surfaces on said circular collets are provided with different tapered inner circular peripheries to permit the circular collets to engage a tapered outer surface of a cylindrical-like workpiece when the tapered cam surface on each of the collets is engaged by one of the actuator means to contract the collets into a gripping engagement with a tapered external surface of a cylindrical-like workpiece.

17. A collet chuck as defined in claim 1, wherein:

(a) said chuck is provided with a plurality of longitudinally spaced apart, stepped circular collet seats;

(b) a circular collet is mounted on each of said collet seats;

(c) the workpiece gripping surface on each of said circular collets is formed on the inner circular periphery of each of the collet bodies for gripping a stepped external surface of a cylindrical-like workpiece, and the tapered cam surface on each of the circular collets is formed on the outer periphery of each of the collet bodies; and, (d) said chuck has a plurality of actuator means and the tapered cam surface on each of the circular collets is engaged by one of the actuator means to contract the collets into a gripping engagement with the stepped external surface of a cylindrical-like workpiece.

18. A collet chuck as defined in claim 1, wherein:

(a) said chuck is provided with two longitudinally spaced apart circular, tapered collet seats, with one of said tapered collet seats being formed as a fixed tapered seat on the chuck body and the other tapered seat being formed on the actuator means;

(b) a circular collet is mounted on each of said tapered collet seats, and each of the circular collets has a top end and a bottom end;

(c) the workpiece gripping surface on each of said circular collets is formed on the inner circular periphery of each of the collet bodies for gripping an external surface of a cylindrical-like workpiece, and the tapered cam surface on each of the circular collets is formed on the outer circular periphery of each of the collet bodies; and, (d) the circular collets are disposed with their bottom ends in abutting engagement with each other, and with the tapered cam surface on one circular collet seated on said fixed tapered collet seat on the chuck body to permit the circular collets to engage an external surface of a cylindrical-like workpiece when the tapered cam surface on one of the collets is engaged by the tapered seat on the actuator means, and the tapered cam surface on the other collet is engaged by the fixed tapered collet seat, to bias both collets endwise and contract the collets into a gripping engagement with an external surface of a cylindrical-like workpiece.

19. A collet chuck as defined in claim 1, wherein:

(a) said circular body has a top end and a bottom end, and a pair of diametrically opposite disposed radial openings formed therethrough, and a pair of diametrically opposite disposed anchor slots formed in the bottom end of the collet body on a diametrical axis perpendicular to a diametrical axis of the pair of radial openings;

(b) the collet body has a hole formed at an inner arcuate end of each of said plurality of slots in said tapered cam surface, and the axis of each hole is parallel to the workpiece gripping surface;

(c) the workpiece gripping surface is formed on the inner circular periphery of the collet body for a gripping engagement with the external surface of a cylindrical-like workpiece, and the tapered cam surface is formed on the outer circular periphery of the collet body; and, (d) a pair of anchor pins are fixed mounted in a pair of diametrically spaced apart, longitudinal bores in the chuck body with the outer ends of the anchor pins positioned inside of the anchor slots formed in the bottom of the collet body, whereby when the tapered cam surface on the collet body is engaged by the actuator means, the collet body is contracted into a gripping engagement with the external surface of a cylindrical-like workpiece and the anchor pins coact with the anchor slots in the collet body to prevent rotational slippage of the collet body during machining operations on a cylindrical-like workpiece.

20. A collet chuck as defined in claim 1, wherein:

(a) said collet body comprises an outer primary external collet, around which is concentrically and telescopically disposed an inner circular secondary, size reducing external collet;

(b) the collet body of said outer primary external collet has a hole formed at an inner arcuate end at each of said plurality of slots in said tapered cam surface, and the axis of each hole is parallel to the workpiece gripping surface;

(c) the workpiece gripping surface of the outer primary internal collet body is formed on the inner circular periphery of the primary external collet body for gripping engagement with the outer peripheral surface of the inner circular secondary, size reducing external collet, and the tapered cam surface is formed on the outer circular periphery of the collet body of the outer primary external collet;

(d) the inner secondary, size reducing external collet has a collet body with a top end which is planar and parallel to a bottom end thereof which is also planar, and the collet body of the inner circular secondary, size reducing external collet body has an inner periphery surface, and an outer peripheral surface and each of the last mentioned surfaces are vertical, concentric surfaces which are also concentric with the inner peripheral workpiece engaging surface of the outer primary external collet body; and, (e) the inner circular secondary, size reducing external collet body is provided with a plurality of slots which each extend radially inward from the outer peripheral surface thereof and terminate at an inner end with a hole, and the inner circular secondary, size reducing external collet body has a radial opening formed therethrough, whereby when the tapered cam surface on the collet body of the outer primary external collet is engaged by the actuator means, the outer primary external collet and the inner circular secondary, size reducing external collet are contracted into a gripping engagement with the external surface of a cylindrical-like workpiece.

*21. The improvement of claim 1, wherein the collet body further includes an annular base including the workpiece gripping surface and a plurality of radial arms appended to the annular base and arranged to extend in radial directions away from the workpiece gripping surface and each pair of adjacent radial arms cooperate to define one of the circumferentially spaced-apart slots therebetween.*

*22. The improvement of claim 21, wherein each radial arm includes a root appended to the annular base and a distal tip arranged to lie in spaced-apart relation to the annular base and the distal tips of the radial arms cooperate to define the cam surface.*

*23. The improvement of claim 22, wherein the collet body further includes a plurality of internal end walls and each internal end wall is arranged to define a boundary of one of the circumferentially spaced-apart slots and lie in a position between the workpiece gripping and cam surfaces.*

*24. The improvement of claim 21, wherein each pair of adjacent radial arms is configured to define a pair of spaced-apart flat slot surfaces and an arcuate slot surface interconnecting the pair of spaced-apart flat slot surfaces and the flat slot and arcuate slot surfaces cooperate to provide the slot defined between said the pair of adjacent radial arms with a keyhole shape in cross-section.*

*25. The improvement of claim 24, wherein each radial arm includes a root appended to the annular base and a distal tip arranged to lie in spaced-apart relation to the annular base and the distal tips of the radial arms cooperate to define the cam surface.*

*26. The improvement of claim 1, wherein the collet body includes a central axis and the cam surface is tapered relative to the central axis.*

*27. The improvement of claim 1, wherein the collet body includes a second collet body, the second collet body having a central axis and two peripheral surfaces parallel to the central axis.*

*28. A collet comprising*

*a flexible collet body having a workpiece gripping surface and a cam surface, the collet body being split to include a first end and a second end positioned to lie in spaced-apart relation to the first end to define a split space therebetween to permit relative movement of the second end toward and away from the first end, the collet body formed to include a plurality of circumferentially spaced slots, each slot having an opening in the cam surface and terminating at a terminus located in the collet body at a location between the workpiece gripping surface and the cam surface, and*

*a tang coupled to the collet body positioned to lie adjacent the end surfaces to cover the split space.*

*29. The improvement of claim 28, wherein the collet body includes a second collet body, the second collet body having a central axis and two peripheral surfaces parallel to the central axis.*

*30. A collet comprising*

*a flexible collet body having a workpiece gripping surface and a cam surface, the collet body being split to include a first end and a second end positioned to lie in spaced-apart relation to the first end to define a split space therebetween to permit relative movement of the second end toward and away from the first end, the collet body formed to include a plurality of circumferentially spaced slots, each slot having an opening in the cam surface and terminating at a terminus located in the collet body at a location between the workpiece gripping surface and the cam surface, and*

*wherein the flexible collet body is split into a plurality of collet pieces to include a plurality of first and second end surfaces to define a plurality of split spaces.*

*31. The collet of claim 30 further comprising a plurality of seals positioned to lie in the split spaces.*

*32. A chuck for holding a workpiece, the chuck comprising*

*an actuator,*

*a chuck body, and*

*a flexible collet positioned to lie on the chuck body, the flexible collet including a collet body having an outer periphery and an inner periphery, the collet body being split to include a first end and a second end positioned to lie in spaced-apart relation to the first end to define a split space therebetween to permit relative movement of the second end toward and away from the first end, one of the peripheries being adapted to be urged by the actuator to flex the flexible collet so that the other periphery moves into engagement with a workpiece to be held by the chuck, the collet body being formed to include a plurality of circumferentially spaced slots each slot, having an opening in one of the peripheries and terminating at a terminus located at a location between the peripheries, and*

*a pin positioned to lie adjacent the flexible collet to prevent rotational slippage of the flexible collet relative to the chuck body.*

*33. A chuck for holding a workpiece, the chuck comprising*

*an actuator,*

*a chuck body, and*

*a flexible collet positioned to lie on the chuck body, the flexible collet including a collet body having an outer periphery and an inner periphery the collet body being split to include a first end and a second end positioned to lie in spaced-apart relation to the first end to define a split space therebetween to permit relative movement of the second end toward and away from the first end, one of the peripheries being adapted to be urged by the actuator to flex the flexible collet so that the other periphery moves into engagement with a workpiece to be held by the chuck, the collet body being formed to include a plurality of circumferentially spaced slots, each slot having an opening in one of the peripheries and terminating at a terminus located at a location between the peripheries, and*

*a tang coupled to the collet body and positioned to lie adjacent to the end surfaces to cover the split space.*

*34. The chuck of claim 33, wherein the collet body is formed to include a notch sized to receive the tang.*

*35. A chuck for holding a workpiece, the chuck comprising*

*an actuator,*

*a chuck body, and*

*a flexible collet positioned to lie on the chuck body, the flexible collet including a collet body having an outer periphery and an inner periphery the collet body being split to include a first end and a second end positioned to lie in spaced-apart relation to the first end to define a split space therebetween to permit relative movement of the second end toward and away from the first end, one of the peripheries being adapted to be urged by the actuator to flex the flexible collet so that the other periphery moves into engagement with a workpiece to be held by the chuck, the collet body being formed to include a plurality of circumferentially spaced slots, each slot having an opening in one of the peripheries and terminating at a terminus located at a location between the peripheries, and*

*wherein the flexible collet body is split into a plurality of collet pieces to include a plurality of first and second end surfaces to define a plurality of split spaces.*

*36. A chuck for holding a workpiece, the chuck comprising*

*an actuator,*

*a chuck body,*

*a collet including a collet body formed to include means for circumferentially flexing the collet body to grip a workpiece upon engagement of the collet by the actuator, and*

*wherein the collet body is formed to include a plurality of split spaces providing a portion of the flexing means.*

*37. In a collet chuck having a chuck body provided with at least one collet seat, a collet positioned on the collet seat, an actuator positioned on the chuck body for engagement with the collet to urge the collet into a gripping engagement with a periphery on a workpiece when the actuator is moved in one direction relative to the collet, the improvement comprising:*

*the collet having a flexible collet body having an outer periphery, an inner periphery, and a plurality of circumferentially spaced-apart slots;*

*the flexible collet body being split to include a first end and a second end positioned in spaced-apart relation to the first end to define a split space therebetween to permit relative movement of the second end toward and away from the first end;*

*one of the peripheries having a workpiece gripping surface and the other of the peripheries having a cam surface engageable by the actuator urge the workpiece gripping surface into sliding engagement with the workpiece;*

*the cam surface being formed to include an inlet opening for each of the plurality of circumferentially spaced-apart slots formed in the flexible collet body, and wherein:*

*the collet body has a plurality of split spaces formed therein.*

*38. A collet chuck as defined in claim 37 wherein:*

*an elastomeric seal is positioned between each of the plurality of split spaces in the collet body.*

*39. In a collet chuck having a chuck body provided with at least one collet seat, a collet positioned on the collet seat, an actuator positioned on the chuck body for engagement with the collet to urge the collet into a gripping engagement with a periphery on a workpiece when the actuator is moved in one direction relative to the collet, the improvement comprising:*

*the collet having a flexible collet body having an outer periphery an inner periphery, and a plurality of circumferentially spaced-apart slots;*

*the flexible collet body being split to include a first end and a second end positioned in spaced-apart relation to the first end to define a split space therebetween to permit relative movement of the second end toward and away from the first end;*

*one of the peripheries having a workpiece gripping surface and the other of the peripheries having a cam surface engageable by the actuator urge the workpiece gripping surface into sliding engagement with the workpiece;*

*the cam surface being formed to include an inlet opening for each of the plurality of circumferentially spaced-apart slots formed in the flexible collet body, and wherein:*

*a closure tang is mounted on the collet body and extends over the split space.*

*40. A collet chuck as in any of claims 37, 38, or 39, in which the collet body has a hole formed at an inner end of each of the plurality of slots in the cam surface, and the axis of each hole is parallel to and spaced radially apart from the workpiece gripping surface.*

*41. A collet chuck as in any of claims 37, 38, or 39, in which the workpiece gripping surface is formed on the outer periphery of the collet body to grip an internal surface of a workpiece, and the cam surface is formed on the inner periphery of the collet body.*

*42. A collet as in any of claims 37, 38, or 39, in which the workpiece gripping surface is formed on the inner periphery of the collet body to grip an external surface of a workpiece and the cam surface is formed on the outer periphery of the collet body.*

*43. In a collet chuck having a chuck body provided with at least one collet seat, a collet positioned on the collet seat, an actuator positioned on the chuck body for engagement with the collet to urge the collet into a gripping engagement with a periphery on a workpiece when the actuator is moved in one direction relative to the collet, the improvement comprising:*

*the collet having a flexible collet body having an outer periphery, an inner periphery, and a plurality of circumferentially spaced-apart slots;*

*the flexible collet body being split to include a first end and a second end positioned in spaced-apart relation to the first end to define a split space therebetween to permit relative movement of the second end toward and away from the first end;*

*one of the peripheries having a workpiece gripping surface and the other of the peripheries having a cam surface engageable by the actuator urge the workpiece gripping surface into sliding engagement with the workpiece;*

*the cam surface being formed to include an inlet opening for each of the plurality of circumferentially spaced-apart slots formed in the flexible collet body, and wherein:*

*the collet body has a top end and a bottom end, and a pair of diametrically opposite disposed split spaces formed therethrough, and a pair of diametrically opposite disposed anchor slots formed in the bottom end of the collet body on a diametrical axis perpendicular to a diametrical axis of the pair of split spaces;*

*wherein the workpiece gripping surface is formed on the outer periphery of the collet body for a gripping engagement with the internal surface of a workpiece, and the cam surface is formed on the inner periphery of the collet body; and*

*a pair of anchor pins are fixedly mounted in a pair of diametrically spaced apart, longitudinal bores in the chuck body with the outer ends of the anchor pins positioned inside of the anchor slots formed in the bottom of the collet body, whereby when the cam surface on the collet body is engaged by the actuator, the collet body is expanded into a gripping engagement with the internal surface of a workpiece and the anchor pins coact with the anchor slots in the collet body to prevent rotational slippage of the collet body during machining operations on a workpiece.*

*44. In a collet chuck having a chuck body provided with at least one collet seat, a collet positioned on the collet seat, an actuator positioned on the chuck body for engagement with the collet to urge the collet into a gripping engagement with a periphery on a workpiece when the actuator is moved in one direction relative to the collet, the improvement comprising:*

*the collet having a flexible collet body having an outer periphery, an inner periphery, and a plurality of circumferentially spaced-apart slots;*

*the flexible collet body being split to include a first end and a second end positioned in spaced-apart relation to the first end to define a split space therebetween to permit relative movement of the second end toward and away from the first end;*

*one of the peripheries having a workpiece gripping surface and the other of the peripheries having a cam surface engageable by the actuator urge the workpiece gripping surface into sliding engagement with the workpiece;*

*the cam surface being formed to include an inlet opening for each of the plurality of circumferentially spaced-apart slots formed in the flexible collet body; and*

*wherein the collet body has a top end and a bottom end and a pair of diametrically opposite disposed split spaces formed therethrough, and a pair of diametrically opposite disposed anchor slots formed in the bottom end of the collet body on a diametrically axis perpendicular to a diametrical axis of the pair of split spaces.*

* * * * *